United States Patent
Kumar Agrawal et al.

(10) Patent No.: US 12,346,171 B2
(45) Date of Patent: *Jul. 1, 2025

(54) ELECTRONIC DEVICES WITH TRANSLATING FLEXIBLE DISPLAYS AND CORRESPONDING METHODS FOR AUTOMATIC TRANSITION TO PEEK POSITION

(71) Applicant: Motorola Mobility LLC, Chicago, IL (US)

(72) Inventors: Amit Kumar Agrawal, Bangalore (IN); Daniel P Groebe, Lake Zurich, IL (US); Marcello Zuffo, Chicago, IL (US); Jeffrey T Snow, Barrington, IL (US)

(73) Assignee: Motorola Mobility LLC, Chicago, IL (US)

( * ) Notice: Subject to any disclaimer, the term of this patent is extended or adjusted under 35 U.S.C. 154(b) by 416 days.

This patent is subject to a terminal disclaimer.

(21) Appl. No.: 18/088,704

(22) Filed: Dec. 26, 2022

(65) Prior Publication Data

US 2024/0126345 A1    Apr. 18, 2024

Related U.S. Application Data

(60) Provisional application No. 63/419,994, filed on Oct. 27, 2022, provisional application No. 63/416,925, filed on Oct. 17, 2022.

(51) Int. Cl.
*G06F 1/16*    (2006.01)

(52) U.S. Cl.
CPC .......... *G06F 1/166* (2013.01); *G06F 1/1652* (2013.01); *G06F 1/1686* (2013.01)

(58) Field of Classification Search
CPC ...... G06F 1/166; G06F 1/1652; G06F 1/1686; G06F 1/1637; G06F 1/1677; G06F 1/169;
(Continued)

(56) References Cited

U.S. PATENT DOCUMENTS 8,659,565 B2 *  2/2014  Sirpal ................... G06F 3/0488
                                                         715/788
9,473,190 B1 * 10/2016  Sandlofer ............ G03B 17/563
(Continued)

FOREIGN PATENT DOCUMENTS

DE   102020105074 A1 * 10/2020 ........... G06F 1/1616
EP       3547101           8/2020
(Continued)

OTHER PUBLICATIONS

Davies, Daniel , "GB Search Report", GB Application No. GB2315639.1; Mailed Apr. 22, 2024.
(Continued)

*Primary Examiner* — Mahendra R Patel
(74) *Attorney, Agent, or Firm* — Philip H. Burrus, IV

(57) ABSTRACT

An electronic device includes a device housing, a front-facing imager, one or more sensors, a blade assembly carrying a blade and slidably coupled to the device housing and operable to slidably transition between an extended position where the blade extends beyond an edge of the device housing a retracted position where a major surface of the blade abuts a major surface of the device housing and a peek position in which the blade reveals the front-facing imager. The electronic device includes one or more processors. The one or more processors cause the blade assembly to transition to the peek position in response to an application operating on the one or more processors invoking an
(Continued)

image capture operation and the one or more sensors determining the front-facing imager is oriented toward a user of the electronic device.

20 Claims, 19 Drawing Sheets

(58) Field of Classification Search
CPC .. G06F 1/1694; G06F 1/1624; H04M 1/0268; H04M 1/72454; H04M 2250/52; H04M 1/0235; H04M 1/0245; H04M 1/0264; H04N 23/57
USPC .......................................................... 455/566
See application file for complete search history.

(56) References Cited

U.S. PATENT DOCUMENTS

| | | | |
|---|---|---|---|
| 9,588,545 B2* | 3/2017 | Sirpal | G06F 3/0483 |
| 11,513,604 B2 | 11/2022 | Jain et al. | |
| 11,699,414 B2* | 7/2023 | Lee | G06F 1/1677 |
| | | | 345/173 |
| 11,838,433 B1 | 12/2023 | Agrawal | |
| 12,100,323 B1 | 9/2024 | Agrawal | |
| 12,160,540 B1 | 12/2024 | Chandran | |
| 2003/0144034 A1* | 7/2003 | Hack | H04M 1/72412 |
| | | | 455/344 |
| 2005/0219372 A1* | 10/2005 | Watanabe | H04M 1/0235 |
| | | | 348/E5.025 |
| 2006/0082518 A1* | 4/2006 | Ram | G06F 1/1675 |
| | | | 345/1.1 |
| 2007/0273752 A1 | 11/2007 | Chamber | |
| 2012/0220341 A1* | 8/2012 | Sirpal | G06F 3/1446 |
| | | | 455/566 |
| 2017/0034319 A1* | 2/2017 | Chenn | H04N 1/00103 |
| 2018/0198896 A1* | 7/2018 | Kang | G06F 1/1652 |
| 2020/0081227 A1* | 3/2020 | Huang | H04N 23/45 |
| 2020/0128124 A1* | 4/2020 | Lin | H04M 1/0264 |
| 2020/0301567 A1* | 9/2020 | Park | G06F 3/0488 |
| 2020/0326754 A1* | 10/2020 | Kim | G09F 9/301 |
| 2020/0336577 A1* | 10/2020 | Han | G09F 9/301 |
| 2021/0185237 A1* | 6/2021 | Wang | H04N 23/667 |
| 2021/0397264 A1 | 12/2021 | Jain et al. | |
| 2021/0397815 A1* | 12/2021 | Alameh | G06F 3/017 |
| 2022/0035412 A1 | 2/2022 | Agrawal et al. | |
| 2022/0038572 A1 | 2/2022 | Agrawal et al. | |
| 2022/0174198 A1 | 6/2022 | Wang | |
| 2023/0007149 A1* | 1/2023 | Ji | H04N 23/54 |
| 2024/0126333 A1 | 4/2024 | Link | |
| 2024/0126335 A1 | 4/2024 | Groebe | |
| 2024/0126345 A1 | 4/2024 | Agrawal | |
| 2024/0129393 A1 | 4/2024 | Vashist | |
| 2024/0129398 A1 | 4/2024 | Poluru | |

FOREIGN PATENT DOCUMENTS

| | | |
|---|---|---|
| EP | 3731502 | 10/2020 |
| WO | 2021117941 | 6/2021 |
| WO | 2022114836 | 6/2022 |

OTHER PUBLICATIONS

Morris, Euros, "GB Search Report", GB Application No. 2315512.0; Mailed Apr. 2, 2024.

Camargo, Marly, "Non-Final Office Action", U.S. Appl. No. 18/116,065, filed Mar. 1, 2023; Mailed Sep. 18, 2024.

Camargo, Marly S., "Notice of Allowance", U.S. Appl. No. 18/116,065, filed Mar. 1, 2023; Mailed Dec. 13, 2024.

West, Lewis G., "Notice of Allowance", U.S. Appl. No. 18/088,705, filed Dec. 26, 2022; Mailed Sep. 5, 2023,.

West, Lewis G., "Non-Final Office Action", U.S. Appl. No. 18/088,705, filed Dec. 26, 2022; Mailed May 24, 2023.

* cited by examiner

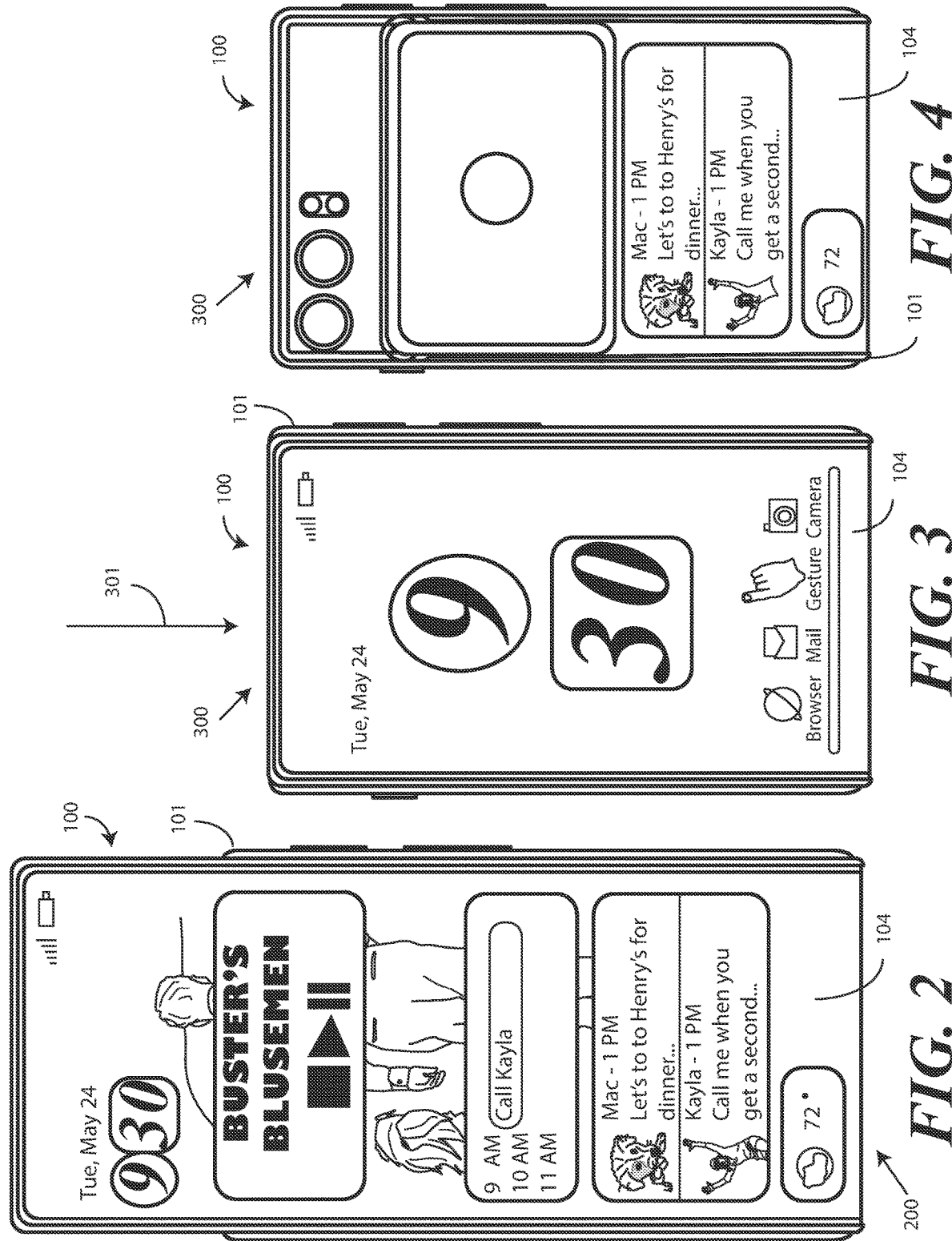

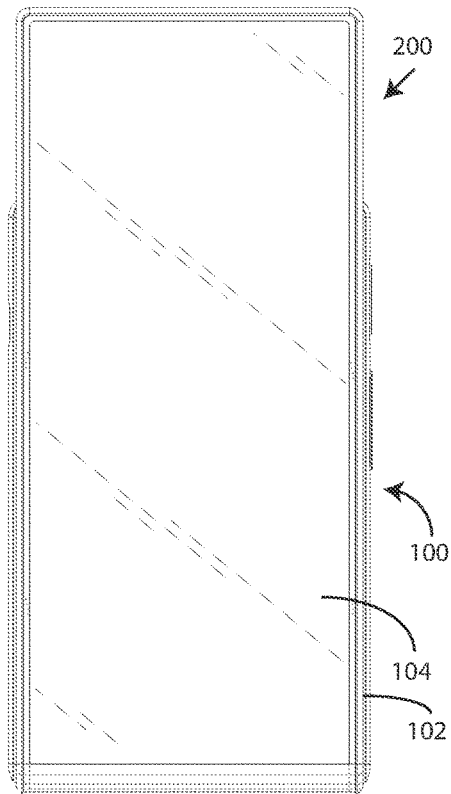 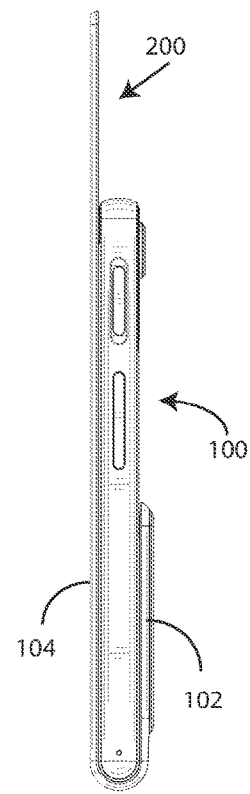 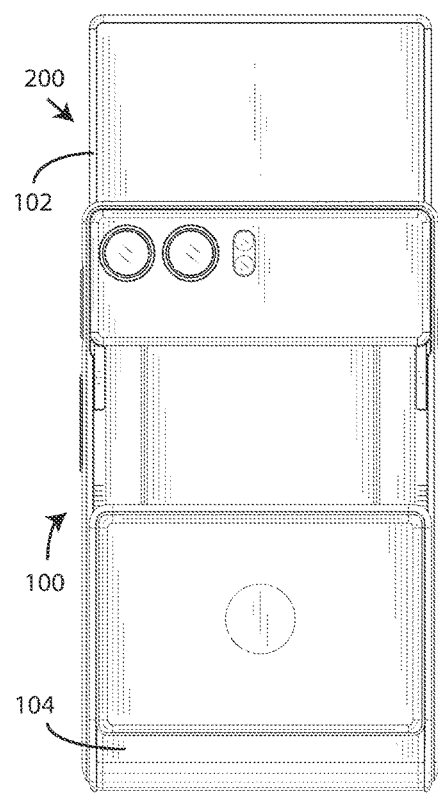
*FIG. 15*  *FIG. 16*  *FIG. 17*
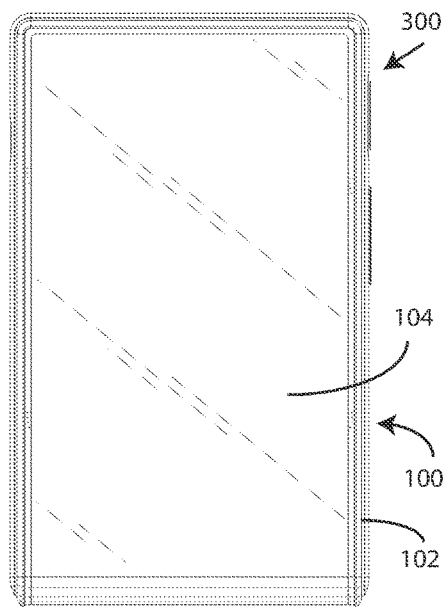 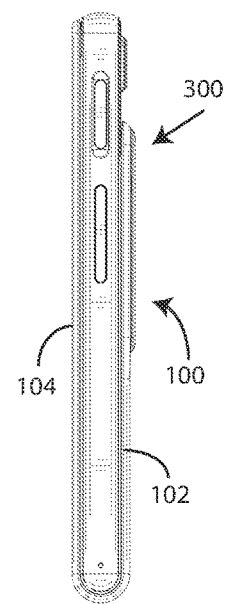 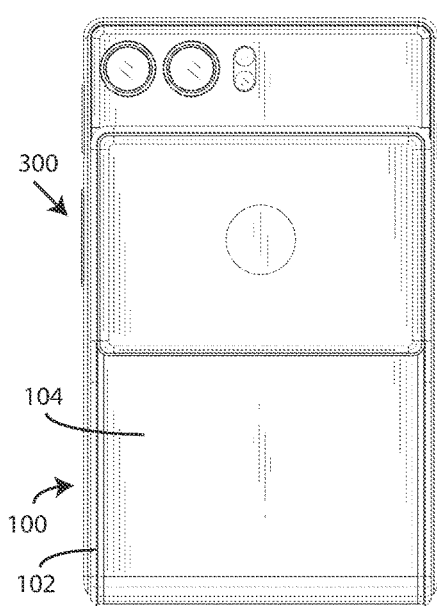
*FIG. 18*  *FIG. 19*  *FIG. 20*

ELECTRONIC DEVICES WITH TRANSLATING FLEXIBLE DISPLAYS AND CORRESPONDING METHODS FOR AUTOMATIC TRANSITION TO PEEK POSITION

CROSS REFERENCE TO PRIOR APPLICATIONS

This application claims priority and benefit under 35 U.S.C. § 119(e) from the following U.S. Provisional Applications, each of which incorporated by reference for all purposes: U.S. Ser. No. 63/416,925, filed Oct. 17, 2022, and U.S. Ser. No. 63/419,994, filed Oct. 27, 2022.

BACKGROUND

Technical Field

This disclosure relates generally to electronic devices, and more particularly to electronic devices having flexible displays.

Background Art

Portable electronic communication devices, especially smartphones, have become ubiquitous. People all over the world use such devices to stay connected. These devices have been designed in various mechanical configurations. A first configuration, known as a "candy bar," is generally rectangular in shape, has a rigid form factor, and has a display disposed along a major face of the electronic device. By contrast, a "clamshell" device has a mechanical hinge that allows one housing to pivot relative to the other. A third type of electronic device is a "slider" where two different device housings slide, with one device housing sliding relative to the other.

Some consumers prefer candy bar devices, while others prefer clamshell devices. Still others prefer sliders. The latter two types of devices are convenient in that they are smaller in a closed position than in an open position, thereby fitting more easily in a pocket. While clamshell and slider devices are relatively straight forward mechanically, they can tend to still be bulky when in the closed position due to the fact that two device housings are required. It would thus be desirable to have an improved electronic device that not only provides a compact geometric form factor but that allows for the use of a larger display surface area as well.

BRIEF DESCRIPTION OF THE DRAWINGS

FIG. 2 illustrates one explanatory electronic device having a translating display moved to a first sliding position where portions of the translating display extend distally away from the device housing of the electronic device.

FIG. 3 illustrates the explanatory electronic device of FIG. 2 with the translating display moved to a second sliding position where the translating display wraps around, and abuts, the device housing of the electronic device.

FIG. 4 illustrates the electronic device of FIG. 3 from the rear.

FIG. 15 illustrates a front elevation view of one explanatory electronic device in accordance with one or more embodiments of the disclosure with the blade assembly in an extended position.

FIG. 16 illustrates a left side elevation view of one explanatory electronic device in accordance with one or more embodiments of the disclosure with the blade assembly in an extended position.

FIG. 17 illustrates a rear elevation view of one explanatory electronic device in accordance with one or more embodiments of the disclosure with the blade assembly in an extended position.

FIG. 18 illustrates a front elevation view of one explanatory electronic device in accordance with one or more embodiments of the disclosure with the blade assembly in a retracted position.

FIG. 19 illustrates a left elevation view of one explanatory electronic device in accordance with one or more embodiments of the disclosure with the blade assembly in a retracted position.

FIG. 20 illustrates a rear elevation view of one explanatory electronic device in accordance with one or more embodiments of the disclosure with the blade assembly in a retracted position.

Figure 1:
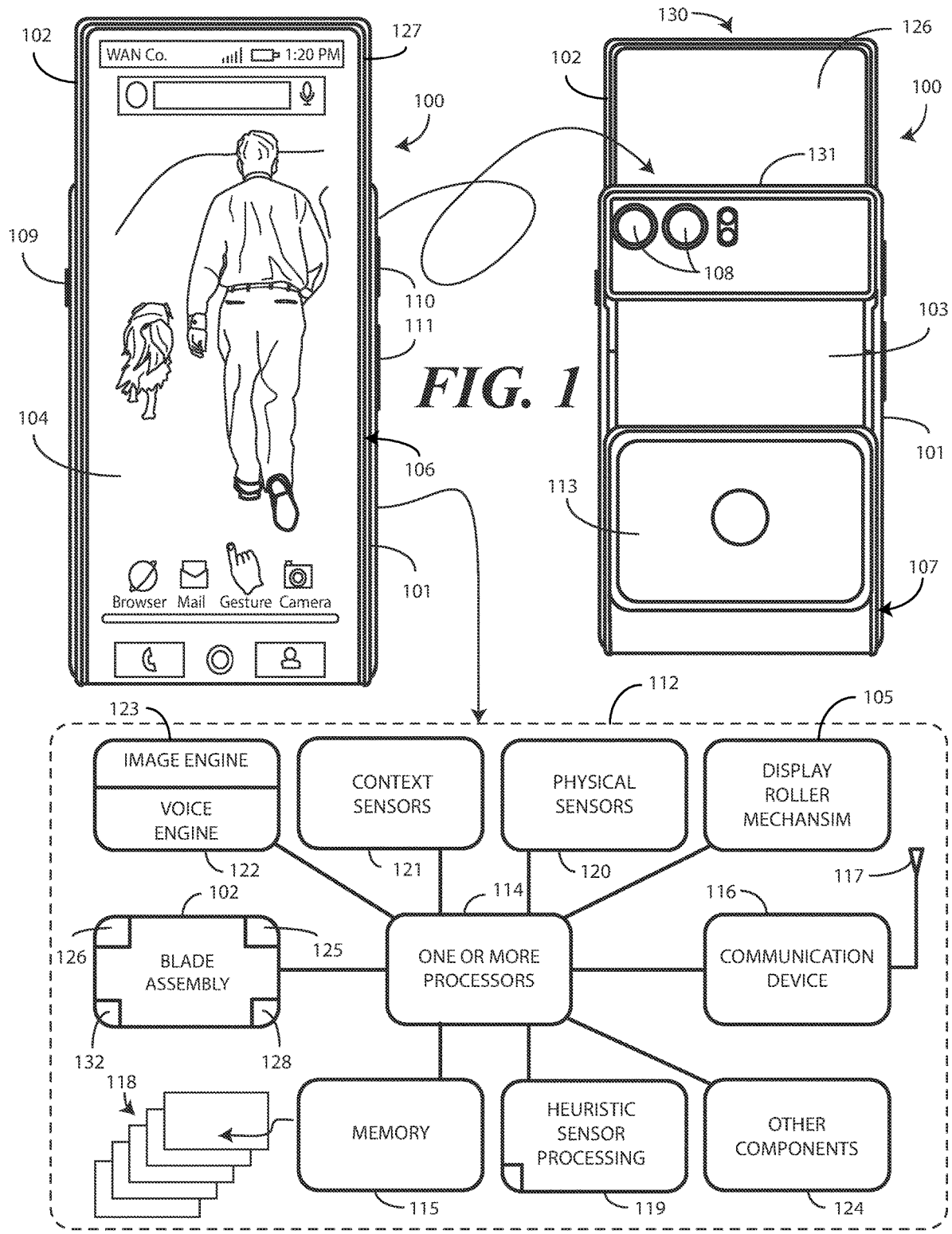
FIG. 1 illustrates one explanatory electronic device in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to automatically translating a flexible display between that is movable between an extended position, a retracted position, and a peek position to the peek position when a front-facing imager is required. Any process descriptions or blocks in flow charts should be understood as representing modules, segments, or portions of code that include one or more executable instructions for implementing specific logical functions or steps in the process.

Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, it is expected that one of ordinary skill, notwithstanding possibly significant effort and many design choices motivated by, for example, available time, current technology, and economic considerations, when guided by the concepts and principles disclosed herein will be readily capable of generating methods and devices with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on."

Relational terms such as first and second, top and bottom, and the like may be used solely to distinguish one entity or action from another entity or action without necessarily requiring or implying any actual such relationship or order between such entities or actions. As used herein, components may be "operatively coupled" when information can be sent between such components, even though there may be one or more intermediate or intervening components between, or along the connection path.

The terms "substantially," "essentially," "approximately," "about," or any other version thereof, are defined as being close to as understood by one of ordinary skill in the art, and in one non-limiting embodiment the term is defined to be within ten percent, in another embodiment within five percent, in another embodiment within one percent and in another embodiment within one-half percent. The term "coupled" as used herein is defined as connected, although not necessarily directly and not necessarily mechanically. Also, reference designators shown herein in parenthesis indicate components shown in a figure other than the one in discussion. For example, talking about a device (10) while discussing figure A would refer to an element, 10, shown in figure other than figure A.

Embodiments of the disclosure provide an electronic device that includes a single device housing. In one or more embodiments, a flexible display is then incorporated into a "blade" assembly that wraps around this single device housing. In one or more embodiments, the blade assembly does this by coupling to a translation mechanism attached to the single device housing.

The translation mechanism is operable to transition the blade assembly around the surfaces of the device housing between an extended position where a blade of the blade assembly extends distally from the device housing, a retracted position where the blade assembly abuts the device housing with the flexible display wrapping around the surfaces of the device housing, a "peek" position where movement of the translation mechanism causes the blade assembly to reveal an image capture device situated beneath the blade assembly on the front of the single device housing, and positions in between.

Illustrating by example, in one explanatory embodiment, the blade assembly slides around the single device housing such that the blade slides away from the single device housing to change an overall length of the flexible display appearing on the front of the electronic device. In other embodiments, the blade assembly can slide in an opposite direction around the single device housing to a retracted position with similar amounts of the flexible display visible on the front side of the electronic device and the rear side of the electronic device. Accordingly, in one or more embodiments an electronic device includes a single device housing with a blade assembly coupled to two major surfaces of the single device housing and wrapping around at least one minor surface of the electronic device where the translation mechanism is positioned such that the blade assembly can slide around, and relative to, the single device housing between a retracted position, an extended position, and a peek position revealing a front-facing image capture device.

In one or more embodiments, the flexible display is coupled to the blade assembly. In one or more embodiments, the flexible display is also surrounded by a silicone border that is co-molded onto a blade substrate and that protects the side edges of the flexible display. In one or more embodiments, the blade assembly engages at least one rotor of the translation mechanism that is situated at an end of the single device housing. When a translation mechanism situated in the single device housing drives elements coupled to the blade assembly, the flexible display wraps around the rotor and moves to extend the blade of the blade assembly further from, or back toward, the single device housing.

In one or more embodiments, one end of the flexible display is fixedly coupled to the blade assembly. Meanwhile, the other end of the flexible display is coupled to the tensioner via a flexible substrate that extends beyond the terminal edges of the flexible display. In one or more embodiments, this flexible substrate is a stainless-steel substrate, although other materials can be used.

Illustrating by example, in one or more embodiments the flexible substrate of the flexible display is longer along its major axis than is the flexible display in at least one dimension. Accordingly, at least a first end of the flexible substrate extends distally beyond at least one terminal end of the flexible display. This allows the first end of the flexible substrate to be rigidly coupled to a tensioner. In one or more embodiments, adhesive is used to couple one end of the flexible display to the blade assembly, while one or more fasteners are used to couple the second end of the flexible display to the tensioner, which is carried by the blade assembly.

In one or more embodiments, the translation mechanism comprises an actuator that causes a portion of the blade assembly abutting a first major surface of the single device housing and another portion of the blade assembly abutting a second major surface of the single device housing to slide symmetrically in opposite directions along the single device housing when the blade assembly transitions between the extended position, the retracted position, and the peek position.

In one or more embodiments, one or more processors of the electronic device cause the blade assembly to automatically transition to the peek position in response to two input conditions: an application operating on the one or more processors invoking an image capture operation and one or more sensors of the electronic device determining that the front-facing imager is oriented toward the user of the electronic device. Since transitioning the blade assembly to the peek position is the only way to expose the front-facing imager in one or more embodiments, the automatic transitioning as a function of front-facing imager invocation by an application and sensor determination that the front-facing portion of the electronic device is facing a user saves the user time and effort by eliminating the need to manually transition the blade assembly to the peek position. Moreover, the automatic transition allows front-facing images to be captured more expeditiously.

In one or more embodiments, a front-facing imager is hidden beneath the blade assembly when the blade assembly is in the retracted position, the extended position, or in any position therebetween. Only when the blade assembly transitions to the peek position is the front-facing imager exposed. In one or more embodiments, one or more processors determine a trigger causing the front-facing imager to be invoked in a service mode. A "service mode" invocation means that an application invokes the front-facing imager rather than the user manually actuating the front-facing imager. Illustrating by example, if a video call is received, a videoconference application may invoke the front-facing imager. Similarly, if a user is engaging a social media application that invokes the front-facing imager, this would be a service mode invocation as well. Embodiments of the disclosure presume that if a user manually actuates a front-facing imager to simply take a picture or capture video they are aware of which imager—the front-facing imager or rear-facing imager—to utilize and will then hold the device accordingly. However, when service mode invocations occur embodiments of the disclosure automatically transition the blade assembly to the peek position if the front side of the electronic device is oriented toward a user.

Once the trigger is determined, one or more sensors of the electronic device can determine which major surface of the electronic device—the front-facing major surface or the rear-facing major surface—is oriented toward the user. The one or more sensors used for this task can include passive imager operation of exposed imagers, grip detection, finger detection, touch detection, and other techniques. When the one or more processors of the electronic device determine that the user is facing the front major surface of the electronic device when the trigger is detected, in one or more embodiments the one or more processors automatically cause the blade assembly to transition to the peek position.

In one or more embodiments, an electronic device comprises a device housing, a front-facing imager, one or more sensors, and one or more processors. The electronic device also includes a blade assembly carrying a blade, with the blade assembly being slidably coupled to the device housing and operable to slidably transition between an extended position where the blade extends beyond an edge of the device housing, a retracted position where a major surface of the blade abuts a major surface of the device housing, and a peek position where the blade reveals the front-facing imager. In one or more embodiments, the one or more processors cause the blade assembly to automatically transition to the peek position in response to an application operating on the one or more processors invoking an image capture operation and the one or more sensors determining that the front-facing imager is oriented toward a user of the electronic device.

Advantageously, embodiments of the disclosure provide an improved sliding mechanism for a flexible display integrated into a blade assembly in a sliding electronic device having a single device housing that eliminates the need to manually transition the blade assembly to the peek position in response to an application presenting a prompt that says something like, "this application needs to use the front-facing imager—would you please enable it by transitioning the blade assembly to the peek position?" In one or more embodiments. A method for an electronic device comprises detecting, by one or more processors, an application operating on the one or more processors requesting invocation of an imager for service mode use by the application. In one or more embodiments, one or more sensors of the electronic device determine whether a front side or a rear side of a device housing of the electronic device is facing a user of the electronic device. In one or more embodiments, when the front side of the device housing is facing the user of the electronic device, the one or more processors cause a translation mechanism to translate a blade assembly slidably coupled to the electronic device from a retracted position to a peek position revealing a front-facing imager covered by the blade assembly when the blade assembly is in the retracted position.

The actuator of the translation mechanism can take a variety of forms. In some embodiments, the actuator can comprise a dual-shaft motor. The dual shaft motor can be threaded to move translators of the translation mechanism in equal and opposite directions in one or more embodiments. In other embodiments, the dual-shaft motor can be coupled to at least one timing belt.

In another embodiment, the actuator comprises a first drive screw and a second drive screw. These drive screws can be coupled together by a gear assembly. When a first portion of the blade assembly is coupled to a translator positioned around the first drive screw, and a second portion of the blade assembly is coupled to another translator positioned around the second drive screw, actuation of either causes the first portion of the blade assembly abutting a first major surface of the single device housing and the second portion of the blade assembly abutting a second major surface of the single device housing to move symmetrically in opposite directions as the first drive screw and the second drive screw rotate.

In still other embodiments, the actuator comprises a first rack, a second rack, and a pinion. The first rack can be coupled to the first portion of the blade assembly while the second rack can be coupled to the second portion of the blade assembly. When the pinion engages both the first rack or the second rack, actuation of either causes the first portion of the blade assembly abutting a first major surface of the single device housing and the second portion of the blade assembly abutting a second major surface of the single device housing to move symmetrically in opposite directions as the first rack and second rack do the same. Other configurations of the actuator will be described below. Still others will be obvious to those of ordinary skill in the art having the benefit of this disclosure.

In one or more embodiments, the blade assembly is coupled to the translator of the translation mechanism. When the translator is actuated, a first portion of the blade assembly abutting a first major surface of the single device housing and a second portion of the blade assembly abutting a second major surface of the single device housing move symmetrically in opposite directions.

Advantageously, embodiments of the disclosure provide an improved sliding mechanism for a flexible display in an electronic device. Flexible display and rotor sliding assemblies configured in accordance with embodiments of the disclosure maintain a flat upper portion of a J-shape defined by a flexible display and/or blade assembly while preserving the operability and functionality of the flexible display during sliding operations.

Embodiments of the disclosure contemplate that in such an electronic device having a translating display, the user generally needs to manually select whether the display is transitioned to the extended position, the retracted position, or the peek position. Illustrating by example, the user might have to press a button once to cause the translating display to transition to the extended position and twice to cause the translating display to transition to the retracted position. A "long press" of the button may be required to cause the translating display to transition to the peek position, and so forth.

This manual actuation requires the user to take a manual action to change the state of the electronic device. Additionally, this requirement potentially delays the usability of the electronic device in the new state due to the time taken to manually "inject" the trigger causing transition of the translating display by pressing the button.

Advantageously, embodiments of the disclosure provide systems and methods that automatically and pre-emptively move the translating display to the peek position based upon imager invocation and device orientation relative to a user. Illustrating by example, in one or more embodiments one or more processors of the electronic device can transition the translating display to the peek position when an imager invocation request is received from an application operating on the one or more processors and one or more sensors of the electronic device determine that the front-facing imager is oriented toward a user of the electronic device. As noted above, in one or more embodiments the imager invocation request is a service mode invocation request. Examples of service mode invocations include a social media application requesting to use an image capture device, a videoconference application requesting to use an image capture device, and so forth. Other such service mode invocations will be obvious to those of ordinary skill in the art having the benefit of this disclosure.

In one or more embodiments, the artificial intelligence classifier can be used to determine the device orientation causing automatic transition to the peek position as well. This can be based upon a particular user preference that are identified from operating contexts when an imager invocation request is received. In one or more embodiments, an artificial intelligence model is trained using the following inputs entered as weighted variables: the current foreground application, the device orientation in three-dimensional space, the application type operating on the one or more processors, e.g., whether the application is a gaming application, a video productivity application, a media application, and so forth), the application display mode, e.g., whether the display is being used in an immersive mode or a non-immersive mode, and when the imager invocation request is received to cause the translating display to transition to the peek position.

In one or more embodiments, the artificial intelligence classifier can continually learn the user's preferences for the extended position based upon user actions. In one or more embodiments, the artificial intelligence classifier can automatically trigger the movement of the translating display to the peek position in response to imager invocation requests. Other advantages will be described below. Still others will be obvious to those of ordinary skill in the art having the benefit of this disclosure.

Turning now to FIG. 1, illustrated therein is one explanatory electronic device 100 configured in accordance with one or more embodiments of the disclosure. The electronic device 100 of FIG. 1 is a portable electronic device. For illustrative purposes, the electronic device 100 is shown as a smartphone. However, the electronic device 100 could be any number of other devices as well, including tablet computers, gaming devices, multimedia players, and so forth. Still other types of electronic devices can be configured in accordance with one or more embodiments of the disclosure as will be readily appreciated by those of ordinary skill in the art having the benefit of this disclosure.

The electronic device 100 includes a single device housing 101. In one or more embodiments, a blade assembly 102 carrying a flexible display 104 wraps around the single device housing 101. As will be described in more detail below, in one or more embodiments the blade assembly 102 is configured to "slide" along the first major surface (covered by the flexible display in the front view of the electronic device 100 on the left side of FIG. 1) of the single device housing 101 and second major surface 103 situated on the rear side of the single device housing 101.

In one or more embodiments the single device housing 101 is manufactured from a rigid material such as a rigid thermoplastic, metal, or composite material, although other materials can be used. Illustrating by example, in one illustrative embodiment the single device housing 101 is manufactured from aluminum. Still other constructs will be obvious to those of ordinary skill in the art having the benefit of this disclosure.

In the illustrative embodiment of FIG. 1, the blade assembly 102 carries the flexible display 104. The flexible display 104 can optionally be touch-sensitive. Users can deliver user input to the flexible display 104 of such an embodiment by delivering touch input from a finger, stylus, or other objects disposed proximately with the flexible display 104.

In one embodiment, the flexible display 104 is configured as an organic light emitting diode (OLED) display fabricated on a flexible plastic substrate. The blade assembly 102 is fabricated on a flexible substrate as well. This allows the blade assembly 102 and flexible display 104 to deform around a display roller mechanism 105 when a first portion 106 of the blade assembly 102 abutting a first major surface of the single device housing 101 and a second portion 107 of the blade assembly 102 abutting a second major surface 103 of the single device housing 101 move symmetrically in opposite directions around the single device housing 101. In one or more embodiments, the blade assembly 102 and flexible display 104 are both constructed on flexible metal substrates can allow each to bend with various bending radii around the display roller mechanism 105.

In one or more embodiments the flexible display 104 may be formed from multiple layers of flexible material such as flexible sheets of polymer or other materials. In this illustrative embodiment, the flexible display 104 is fixedly coupled to the blade assembly 102, which wraps around the display roller mechanism 105.

Features can be incorporated into the single device housing 101. Examples of such features include one or more cameras or image capture devices 108 or an optional speaker port. In this illustrative embodiment, user interface components 109, 110, 111, which may be buttons, fingerprint sensors, or touch sensitive surfaces, can also be disposed along the surfaces of the single device housing 101. Any of these features are shown being disposed on the side surfaces of the electronic device 100 could be located elsewhere. In other embodiments, these features may be omitted.

A block diagram schematic 112 of the electronic device 100 is also shown in FIG. 1. The block diagram schematic 112 includes one or more electronic components that can be coupled to a printed circuit board assembly disposed within the single device housing 101. Alternatively, the electronic components may be carried by the blade assembly 102. Illustrating by example, in one or more embodiments electronic components can be positioned beneath a "backpack" 113 carried by the blade assembly 102.

The components of the block diagram schematic 112 can be electrically coupled together by conductors or a bus disposed along one or more printed circuit boards. For example, some components of the block diagram schematic 112 can be configured as a first electronic circuit fixedly situated within the single device housing 101, while other components of the block diagram schematic 112 can be configured as a second electronic circuit carried by the blade assembly 102 in the backpack 113. A flexible substrate can then extend from the first electronic circuit in the single device housing 101 to the second electronic circuit carried by the blade assembly 102 in the backpack 113 to electrically couple the first electronic circuit to the second electronic circuit.

The illustrative block diagram schematic 112 of FIG. 1 includes many different components. Embodiments of the disclosure contemplate that the number and arrangement of such components can change depending on the particular application. Accordingly, electronic devices configured in accordance with embodiments of the disclosure can include some components that are not shown in FIG. 1, and other components that are shown may not be needed and can therefore be omitted.

In one or more embodiments, the electronic device 100 includes one or more processors 114. In one embodiment, the one or more processors 114 can include an application processor and, optionally, one or more auxiliary processors. One or both of the application processor or the auxiliary processor(s) can include one or more processors. One or both of the application processor or the auxiliary processor(s) can be a microprocessor, a group of processing components, one or more ASICs, programmable logic, or other type of processing device.

The application processor and the auxiliary processor(s) can be operable with the various components of the electronic device 100. Each of the application processor and the auxiliary processor(s) can be configured to process and execute executable software code to perform the various functions of the electronic device 100. A storage device, such as memory 115, can optionally store the executable software code used by the one or more processors 114 during operation.

In one embodiment, the one or more processors 114 are responsible for running the operating system environment of the electronic device 100. The operating system environment can include a kernel and one or more drivers, and an application service layer, and an application layer. The operating system environment can be configured as executable code operating on one or more processors or control circuits of the electronic device 100. The application layer can be responsible for executing application service modules. The application service modules may support one or more applications or "apps." The applications of the application layer can be configured as clients of the application service layer to communicate with services through application program interfaces (APIs), messages, events, or other inter-process communication interfaces. Where auxiliary processors are used, they can be used to execute input/output functions, actuate user feedback devices, and so forth.

In this illustrative embodiment, the electronic device 100 also includes a communication device 116 that can be configured for wired or wireless communication with one or more other devices or networks. The networks can include a wide area network, a local area network, and/or personal area network. The communication device 116 may also utilize wireless technology for communication, such as, but are not limited to, peer-to-peer or ad hoc communications such as HomeRF, Bluetooth and IEEE 802.11, and other forms of wireless communication such as infrared technology. The communication device 116 can include wireless communication circuitry, one of a receiver, a transmitter, or transceiver, and one or more antennas 117.

In one embodiment, the one or more processors 114 can be responsible for performing the primary functions of the electronic device 100. For example, in one embodiment the one or more processors 114 comprise one or more circuits operable with one or more user interface devices, which can include the flexible display 104, to present, images, video, or other presentation information to a user. The executable software code used by the one or more processors 114 can be configured as one or more modules 118 that are operable with the one or more processors 114. Such modules 118 can store instructions, control algorithms, logic steps, and so forth.

In one embodiment, the one or more processors 114 are responsible for running the operating system environment of the electronic device 100. The operating system environment can include a kernel and one or more drivers, and an application service layer, and an application layer. The operating system environment can be configured as executable code operating on one or more processors or control circuits of the electronic device 100. The application layer can be responsible for executing application service modules. The application service modules may support one or more applications or "apps." The applications of the application layer can be configured as clients of the application service layer to communicate with services through application program interfaces (APIs), messages, events, or other inter-process communication interfaces. Where auxiliary processors are used, they can be used to execute input/output functions, actuate user feedback devices, and so forth.

In one embodiment, the one or more processors 114 may generate commands or execute control operations based on information received from the various sensors of the electronic device 100. As shown in FIG. 1, these sensors can be categorized into physical sensors 120 and context sensors 121.

Generally speaking, physical sensors 120 include sensors configured to sense or determine physical parameters indicative of conditions in an environment about the electronic device 100. Illustrating by example, the physical sensors 120 can include devices for determining information such as motion, acceleration, orientation, proximity to people and other objects, lighting, capturing images, and so forth. The physical sensors 120 can include various combinations of microphones, location detectors, temperature sensors, barometers, proximity sensor components, proximity detector components, wellness sensors, touch sensors, cameras, audio capture devices, and so forth. Many examples of physical sensors 120 will be described below with reference to FIG. 6. Others will be obvious to those of ordinary skill in the art having the benefit of this disclosure.

By contrast, the context sensors 121 do not measure physical conditions or parameters. Instead, they infer context from data of the electronic device. Illustrating by example, when a physical sensor 120 includes a camera or intelligent imager, the context sensors 121 can use data captured in images to infer contextual cues. An emotional detector may be operable to analyze data from a captured image to determine an emotional state. The emotional detector may identify facial gestures such as a smile or raised eyebrow to infer a person's silently communicated emotional state, e.g., joy, anger, frustration, and so forth. Other context sensors 121 may analyze other data to infer context, including calendar events, user profiles, device operating states, energy storage within a battery, application data, data from third parties such as web services and social media servers, alarms, time of day, behaviors a user repeats, and other factors.

The context sensors 121 can be configured as either hardware components, or alternatively as combinations of hardware components and software components. The context sensors 121 can be configured to collect and analyze non-physical parametric data.

Figure 6:
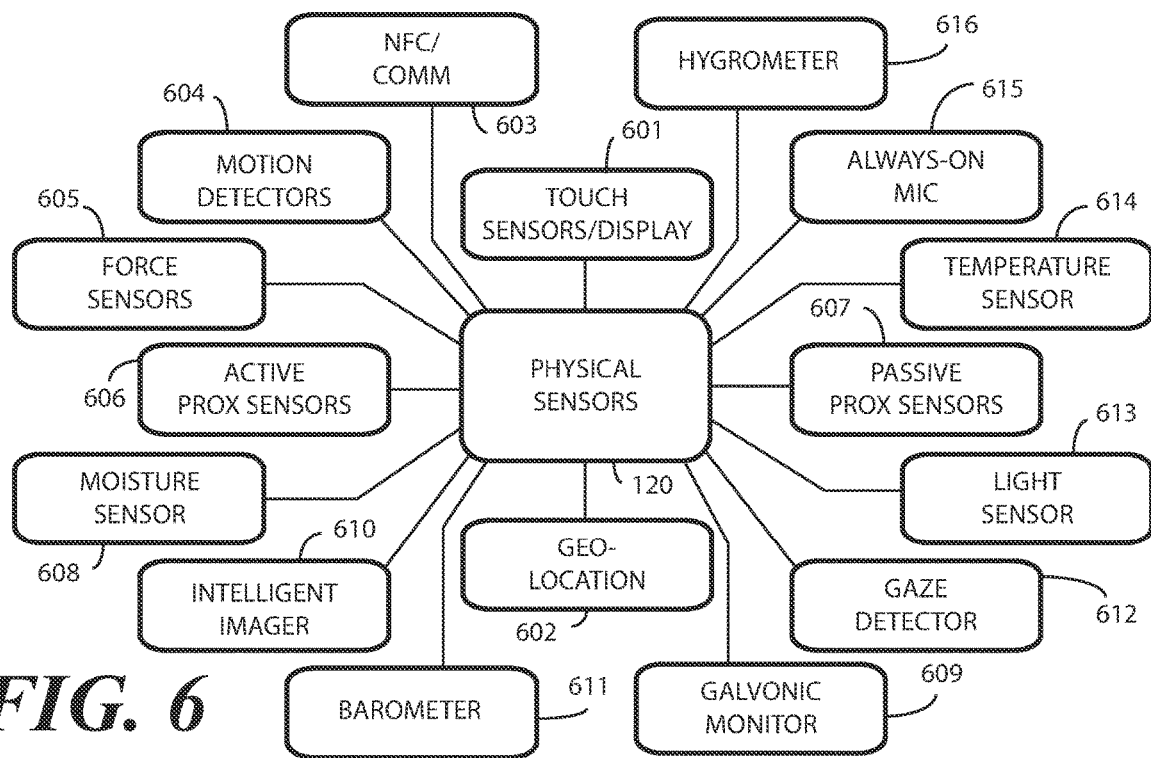
FIG. 6 illustrates one or more explanatory physical sensors suitable for use, alone or in combination, in an electronic device in accordance with one or more embodiments of the disclosure.
Figure 7:
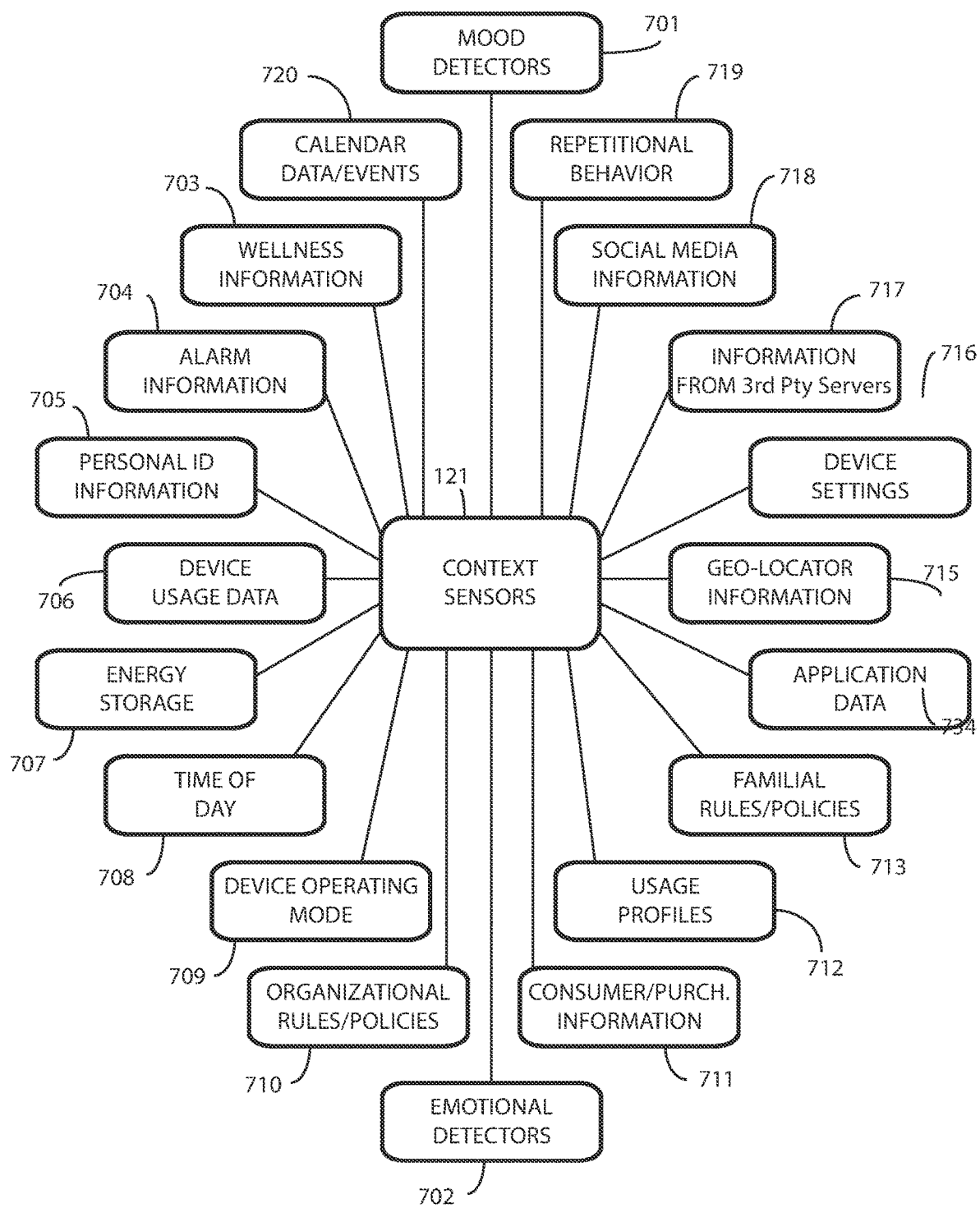
FIG. 7 illustrates one or more explanatory context sensors suitable for use, alone or in combination, in an electronic device in accordance with one or more embodiments of the disclosure.

Examples of the physical sensors 120 and the context sensors 121 are shown in FIGS. 6 and 7. These examples are illustrative only, as other physical sensors 120 and context sensors 121 will be obvious to those of ordinary skill in the art having the benefit of this disclosure.

Turning briefly to FIG. 6, illustrated therein are various examples of the physical sensors 120. In one or more embodiments, the physical sensors 120 sense or determine physical parameters indicative of conditions in an environment about an electronic device. FIG. 6 illustrates several examples physical sensors 120. It should be noted that those shown in FIG. 6 are not comprehensive, as others will be obvious to those of ordinary skill in the art having the benefit of this disclosure. Additionally, it should be noted that the various physical sensors 120 shown in FIG. 6 could be used alone or in combination. Accordingly, many electronic devices will employ only subsets of the physical sensors 120 shown in FIG. 6, with the particular subset chosen being defined by device application.

A first example of a physical sensor is a touch sensor 601. The touch sensor 601 can include a capacitive touch sensor, an infrared touch sensor, resistive touch sensors, or another touch-sensitive technology. Capacitive touch-sensitive devices include a plurality of capacitive sensors, e.g., electrodes, which are disposed along a substrate. Each capacitive sensor is configured, in conjunction with associated control circuitry, e.g., the one or more processors (114), to detect an object in close proximity with—or touching—the surface of the display or the housing of an electronic device by establishing electric field lines between pairs of capacitive sensors and then detecting perturbations of those field lines.

The electric field lines can be established in accordance with a periodic waveform, such as a square wave, sine wave, triangle wave, or other periodic waveform that is emitted by one sensor and detected by another. The capacitive sensors can be formed, for example, by disposing indium tin oxide patterned as electrodes on the substrate. Indium tin oxide is useful for such systems because it is transparent and conductive. Further, it is capable of being deposited in thin layers by way of a printing process. The capacitive sensors may also be deposited on the substrate by electron beam evaporation, physical vapor deposition, or other various sputter deposition techniques.

Another example of a physical sensor 120 is a geo-locator that serves as a location detector 602. In one embodiment, location detector 602 is operable to determine location data when an image is captured from a constellation of one or more earth orbiting satellites, or from a network of terrestrial base stations to determine an approximate location. Examples of satellite positioning systems suitable for use with embodiments of the present invention include, among others, the Navigation System with Time and Range (NAVSTAR) Global Positioning Systems (GPS) in the United States of America, and other similar satellite positioning systems. The location detector 602 can make location determinations autonomously or with assistance from terrestrial base stations, for example those associated with a cellular communication network or other ground-based network, or as part of a Differential Global Positioning System (DGPS), as is well known by those having ordinary skill in the art. The location detector 602 may also be able to determine location by locating or triangulating terrestrial base stations of a traditional cellular network, or from other local area networks, such as Wi-Fi networks.

Another physical sensor 120 is a near field communication circuit 603. The near field communication circuit 603 can be included for communication with local area networks to receive information regarding the context of the environment in which an electronic device is located. Illustrating by example, the near field communication circuit 603 may obtain information such as weather information and location information. If, for example, a user is at a museum, they may be standing near an exhibit that can be identified with near field communication. This identification can indicate that the electronic device is both indoors and at a museum. Accordingly, if the user requests additional information about an artist or a painting, there is a higher probability that the question is a device command asking the one or more processors (114) to search for than information with a web browser. Alternatively, the near field communication circuit 603 can be used to receive contextual information from kiosks and other electronic devices. The near field communication circuit 603 can also be used to obtain image or other data from social media networks. Examples of suitable near field communication circuits include Bluetooth communication circuits, IEEE 801.11 communication circuits, infrared communication circuits, magnetic field modulation circuits, and Wi-Fi circuits.

Another example of a physical sensor 120 is the motion detector 604. Illustrating by example, an accelerometer, gyroscopes, or other device can be used as a motion detector 604 in an electronic device. Using an accelerometer as an example, an accelerometer can be included to detect motion of the electronic device. Additionally, the accelerometer can be used to sense some of the gestures of the user, such as one talking with their hands, running, or walking.

The motion detector 604 can also be used to determine the spatial orientation of an electronic device as well in three-dimensional space by detecting a gravitational direction. In addition to, or instead of, an accelerometer, an electronic compass can be included to detect the spatial orientation of the electronic device relative to the earth's magnetic field. Similarly, one or more gyroscopes can be included to detect rotational motion of the electronic device.

Another example of a physical sensor 120 is a force sensor 605. The force sensor can take various forms. For example, in one embodiment, the force sensor comprises resistive switches or a force switch array configured to detect contact with either the display or the housing of an electronic device. The array of resistive switches can function as a force-sensing layer, in that when contact is made with either the surface of the display or the housing of the electronic device, changes in impedance of any of the switches may be detected. The array of switches may be any of resistance sensing switches, membrane switches, force-sensing switches such as piezoelectric switches, or other equivalent types of technology. In another embodiment, the force sensor can be capacitive. In yet another embodiment, piezoelectric sensors can be configured to sense force as well. For example, where coupled with the lens of the display, the piezoelectric sensors can be configured to detect an amount of displacement of the lens to determine force. The piezoelectric sensors can also be configured to determine force of contact against the housing of the electronic device rather than the display.

Another example of physical sensors 120 includes proximity sensors. The proximity sensors fall in to one of two camps: active proximity sensors and "passive" proximity sensors. These are shown as proximity detector components 606 and proximity sensor components 607 in FIG. 6. Either the proximity detector components 606 or the proximity sensor components 607 can be generally used for gesture control and other user interface protocols, some examples of which will be described in more detail below.

As used herein, a "proximity sensor component" comprises a signal receiver only that does not include a corresponding transmitter to emit signals for reflection off an object to the signal receiver. A signal receiver only can be used due to the fact that a user's body or other heat generating object external to device, such as a wearable electronic device worn by user, serves as the transmitter. Illustrating by example, in one the proximity sensor components 607 comprise a signal receiver to receive signals from objects external to the housing of an electronic device. In one embodiment, the signal receiver is an infrared signal receiver to receive an infrared emission from an object such as a human being when the human is proximately located with the electronic device. In one or more embodiments, the proximity sensor component is configured to receive infrared wavelengths of about four to about ten micrometers. This wavelength range is advantageous in one or more embodiments in that it corresponds to the wavelength of heat emitted by the body of a human being.

Additionally, detection of wavelengths in this range is possible from farther distances than, for example, would be the detection of reflected signals from the transmitter of a proximity detector component. In one embodiment, the proximity sensor components 607 have a relatively long detection range so as to detect heat emanating from a person's body when that person is within a predefined thermal reception radius. For example, the proximity sensor component may be able to detect a person's body heat from a distance of about ten feet in one or more embodiments. The ten-foot dimension can be extended as a function of designed optics, sensor active area, gain, lensing gain, and so forth.

Proximity sensor components 607 are sometimes referred to as a "passive IR system" due to the fact that the person is the active transmitter. Accordingly, the proximity sensor component 607 requires no transmitter since objects disposed external to the housing deliver emissions that are received by the infrared receiver. As no transmitter is required, each proximity sensor component 607 can operate at a very low power level.

In one embodiment, the signal receiver of each proximity sensor component 607 can operate at various sensitivity levels so as to cause the at least one proximity sensor component 607 to be operable to receive the infrared emissions from different distances. For example, the one or more processors (114) can cause each proximity sensor component 607 to operate at a first "effective" sensitivity so as to receive infrared emissions from a first distance. Similarly, the one or more processors (114) can cause each proximity sensor component 607 to operate at a second sensitivity, which is less than the first sensitivity, so as to receive infrared emissions from a second distance, which is less than the first distance. The sensitivity change can be made by causing the one or more processors (114) to interpret readings from the proximity sensor component 607 differently.

By contrast, proximity detector components 606 include a signal emitter and a corresponding signal receiver. While each proximity detector component 606 can be any one of various types of proximity sensors, such as but not limited to, capacitive, magnetic, inductive, optical/photoelectric, imager, laser, acoustic/sonic, radar-based, Doppler-based, thermal, and radiation-based proximity sensors, in one or more embodiments the proximity detector components 606 comprise infrared transmitters and receivers. The infrared transmitters are configured, in one embodiment, to transmit infrared signals having wavelengths of about 860 nanometers, which is one to two orders of magnitude shorter than the wavelengths received by the proximity sensor components. The proximity detector components can have signal receivers that receive similar wavelengths, i.e., about 860 nanometers.

In one or more embodiments, each proximity detector component 606 can be an infrared proximity sensor set that uses a signal emitter that transmits a beam of infrared light that reflects from a nearby object and is received by a corresponding signal receiver. Proximity detector components 606 can be used, for example, to compute the distance to any nearby object from characteristics associated with the reflected signals. The reflected signals are detected by the corresponding signal receiver, which may be an infrared photodiode used to detect reflected light emitting diode (LED) light, respond to modulated infrared signals, and/or perform triangulation of received infrared signals.

Another example of a physical sensor is a moisture detector 608. A moisture detector 608 can be configured to detect the amount of moisture on or about the display or the housing of the electronic device. This can indicate various forms of context. Sometimes, it can indicate rain or drizzle in the environment about the electronic device. Accordingly, if a user is frantically asking "Call a cab!" the fact that moisture is present may increase the likelihood that this ask is a device command. The moisture detector 608 can be realized in the form of an impedance sensor that measures impedance between electrodes. As moisture can be due to external conditions, e.g., rain, or user conditions, perspiration, the moisture detector 608 can function in tandem with ISFETS configured to measure pH or amounts of NaOH in the moisture or a galvanic sensor 609 to determine not only the amount of moisture, but whether the moisture is due to external factors, perspiration, or combinations thereof.

An intelligent imager 610, configured as an imager or image capture device, can be configured to capture an image of an object and determine whether the object matches predetermined criteria. For example, the intelligent imager 610 operate as an identification module configured with optical recognition such as include image recognition, character recognition, visual recognition, facial recognition, color recognition, shape recognition and the like. Advantageously, the intelligent imager 610 can be used as a facial recognition device to determine the identity of one or more persons detected about an electronic device.

For example, in one embodiment when the one or more proximity sensor components 607 detect a person, the intelligent imager 610 can capture a photograph of that person. The intelligent imager 610 can then compare the image to a reference file stored in memory (115), to confirm beyond a threshold authenticity probability that the person's face sufficiently matches the reference file. Beneficially, optical recognition allows the one or more processors (114) to execute control operations only when one of the persons detected about the electronic device are sufficiently identified as the owner of the electronic device.

In addition to capturing photographs, the intelligent imager 610 can function in other ways as well. For example, in some embodiments the intelligent imager 610 can capture multiple successive pictures to capture more information that can be used to determine social cues. Alternatively, the intelligent imager 610 can capture or video frames, with or without accompanying metadata such as motion vectors. This additional information captured by the intelligent imager 610 can be used to detect richer social cues that may be inferred from the captured data.

A barometer 611 can sense changes in air pressure due to environmental and/or weather changes. In one embodiment, the barometer 611 includes a cantilevered mechanism made from a piezoelectric material and disposed within a chamber. The cantilevered mechanism functions as a pressure sensitive valve, bending as the pressure differential between the chamber and the environment changes. Deflection of the cantilever ceases when the pressure differential between the chamber and the environment is zero. As the cantilevered material is piezoelectric, deflection of the material can be measured with an electrical current.

A gaze detector 612 can comprise sensors for detecting the user's gaze point. The gaze detector 612 can optionally include sensors for detecting the alignment of a user's head in three-dimensional space. Electronic signals can then be delivered from the sensors to the gaze detection processing for computing the direction of user's gaze in three-dimensional space. The gaze detector 612 can further be configured to detect a gaze cone corresponding to the detected gaze direction, which is a field of view within which the user may easily see without diverting their eyes or head from the detected gaze direction. The gaze detector 612 can be configured to alternately estimate gaze direction by inputting to the gaze detection processing images representing a photograph of a selected area near or around the eyes. It will be clear to those of ordinary skill in the art having the benefit of this disclosure that these techniques are explanatory only, as other modes of detecting gaze direction can be substituted in the gaze detector 612 of FIG. 6.

A light sensor 613 can detect changes in optical intensity, color, light, or shadow in the environment of an electronic device. This can be used to make inferences about context such as weather or other cues. For example, if the light sensor 613 detects low-light conditions in the middle of the day when the location detector 602 indicates that the electronic device is outside, this can be due to cloudy conditions, fog, or haze. An infrared sensor can be used in conjunction with, or in place of, the light sensor 613. The infrared sensor can be configured to detect thermal emissions from an environment about an electronic device. Where, for example, the infrared sensor detects heat on a warm day, but the light sensor detects low-light conditions, this can indicate that the electronic device is in a room where the air conditioning is not properly set. Similarly, a temperature sensor 614 can be configured to monitor temperature about an electronic device.

The physical sensors 120 can also include an audio capture device 615. In one embodiment, the audio capture device 615 includes one or more microphones to receive acoustic input. While the one or more microphones can be used to sense voice input, voice commands, and other audio input, in some embodiments they can be used as environmental sensors to sense environmental sounds such as rain, wind, and so forth.

In one embodiment, the one or more microphones include a single microphone. However, in other embodiments, the one or more microphones can include two or more microphones. Where multiple microphones are included, they can be used for selective beam steering to, for instance, determine from which direction a sound emanated. Illustrating by example, a first microphone can be located on a first side of the electronic device for receiving audio input from a first direction, while a second microphone can be placed on a second side of the electronic device for receiving audio input from a second direction. The one or more processors (114) can then select between the first microphone and the second microphone to beam steer audio reception toward the user. Alternatively, the one or more processors (114) can process and combine the signals from two or more microphones to perform beam steering.

In one embodiment, the audio capture device 615 comprises an "always ON" audio capture device. As such, the audio capture device 615 is able to capture audio input at any time that an electronic device is operational. As noted above, in one or more embodiments, the one or more processors, which can include a digital signal processor, can identify whether one or more device commands are present in the audio input captured by the audio capture device 615.

One further example of the physical sensors 120 is a hygrometer 616. The hygrometer 616 can be used to detect humidity, which can indicate that a user is outdoors or is perspiring. As noted above, the illustrative physical sensors of FIG. 6 are not comprehensive. Numerous others could be added. For example, a wind-speed monitor could be included to detect wind. Accordingly, the physical sensors 120 of FIG. 6 are illustrative only, as numerous others will be obvious to those of ordinary skill in the art having the benefit of this disclosure.

Turning briefly now to FIG. 7, illustrated therein are various examples of context sensors 121. As with FIG. 6, the examples shown in FIG. 7 do not constitute a comprehensive list. Numerous other context sensors 121 will be obvious to those of ordinary skill in the art having the benefit of this disclosure.

In one embodiment, a mood detector 701 can infer a person's mood based upon contextual information received from the physical sensors (120). For example, if the intelligent imager (501) captures a picture, multiple successive pictures, video, or other information from which a person can be identified as the owner of the electronic device, and she is crying in the picture, multiple successive pictures, video, or other information, the mood detector 701 can infer that she is either happy or sad. Similarly, if the audio capture device captures a user's voice and the user is yelling or cursing, the mood detector 701 can infer that the user is likely angry or upset.

The emotional detector 702 can function in a similar manner to infer a person's emotional state from contextual information received from the physical sensors (120). Illustrating by example, if the intelligent imager (501) captures a picture, multiple successive pictures, video, or other information relating to of the owner of an electronic device, the emotional detector 702 can infer their silently communicated emotional state, e.g., joy, anger, frustration, and so forth. This can be inferred from, for example, facial gestures such as a raised eyebrow, grin, or other feature. In one or more embodiments, such emotional cues can indicate the user is intending to issue a command to the electronic device. Alternatively, emotion can be detected from voice inflections, or words used. If someone screams, "I am mad at you," there are likely negative emotional issues involved, for example.

Calendar information and events 720 can be used to detect social cues. If, for example, a calendar event indicates that a birthday party is occurring, this can imply festive and jovial social cues. However, if a funeral is occurring, it is unlikely that a user will be issuing device commands to an electronic device as funerals tend to be quiet affairs.

Wellness information 703 can be used to detect social cues. If, for example, wellness information 703 indicates that a person's heart rate is high, and they are perspiring, and the location information 715 indicates that a person is in an alley of a city, and the time-of-day information 708 indicates that its 3 AM, the person may be under duress. Accordingly, the command "Call 911" is highly likely to be a device command.

Alarm information 704 can be used to detect social cues. If an alarm has just sounded at 6:00 AM, the command "snooze" is likely to be a device command. Personal identification information 705 can be used to detect social cues as well. If a person is a diabetic, and wellness sensors show them to be clammy and sweaty, this could be due to low insulin. Accordingly, the command "Call 911" is highly likely to be a device command.

Device usage data 706 can indicate social cues. If a person is searching the web, and an incoming call is received, the command "decline" is likely to be a device command. Energy storage 707 within an electronic device can be used to indicate a social cue. Device operating mode information 709 can be used in a similar fashion. When energy storage drops to, for example, ten percent, the command "shut down all non-critical apps" is likely to be a device command.

Consumer purchase information 711 can certainly indicate social cues. If, for example, a person is a sommelier and frequently purchases wine, when viewing a web browser and finding a bottle of '82 Lafite for under $1000, the command "buy that wine now" is likely to be a device command.

Device usage profiles 712 can be used to infer social cues as well. If, for example, a person never uses an electronic device between 10:00 PM and 6:00 AM due to the fact that they are sleeping, if they happen to talk in their sleep and say, "order a pizza—I'm starving," this is not likely to be a device command.

Organizations can have formal rules and policies 710, such as meetings cannot last more than an hour without a break, one must take a lunch break between noon and 2:00 PM, and brainstorming sessions occur every morning between 9:00 and 10:00 AM. Similarly, families can have similar rules and policies 713, such as dinner occurs between 6:00 and 7:00 PM. This information can be used to infer social cues such as whether a person is likely to be in conversation with other people. When this is the case, spoken questions are less likely to be device commands. By contrast, when a user is likely to be alone, spoken commands are more likely to be device commands.

Application data 734 can indicate social cues. If a person frequently interacts with word processing applications during the day, the commands "cut", and "paste" are more likely to be device commands that they would for someone who instead plays video games with flying birds. Device settings 716 can indicate social cues as well. If a user sets their electronic device to alarm clock mode, it may be likely that they are sleeping and are not issuing device commands.

Social media 718 in formation can indicate social cues. For example, in one embodiment information relating to multi-modal social cues from an environment about the electronic device can be inferred from retrieving information from a social media server. For example, real time searches, which may be a keyword search, image search, or other search, of social media services can find images, posts, and comments relating to a location determined by the location information 715. Images posted on a social media service server that were taken at the same location may reveal multi-modal social cues. Alternatively, commentary regarding the location may imply social cues. Information from third party servers 717 can be used in this manner as well.

One further example of the context sensors 121 is repetitive behavior information 719. If, for example, a person always stops at a coffee shop between 8:00 and 8:15 AM on their way to work, the command, "Pay for the coffee," is likely to be a device command. As with FIG. 6 above, the physical sensors of FIG. 6 do not constitute a comprehensive list. Context sensors 121 can be any type of device that infers context from data of the electronic device. The context sensors 121 can be configured as either hardware components, or alternatively as combinations of hardware components and software components. The context sensors 121 can analyze information to, for example, not only detect the user, but also to determine the social cues and emotional effect of other people in the vicinity of the electronic device, thereby further informing inferences about the user's intent and what executable control commands are appropriate given this composite social context.

The context sensors 121 can be configured to collect and analyze non-physical parametric data. While some are shown in FIG. 7, numerous others could be added. Accordingly, the context sensors 121 of FIG. 7 are illustrative only, as numerous others will be obvious to those of ordinary skill in the art having the benefit of this disclosure. It should be noted that one or both of the physical sensors (120) or the context sensors 121, when used in combination, can be cascaded in a predefined order to detect a plurality of multi-modal social cues to determine whether the device command is intended for the electronic device.

Turning now back to FIG. 1, in one or more embodiments a heuristic sensor processor 119 can be operable with both the physical sensors 120 and the context sensors 121 to detect, infer, capture, and otherwise determine when multi-modal social cues are occurring in an environment about an electronic device. In one embodiment, the heuristic sensor processor 119 determines, from one or both of the physical sensors 120 or the context sensors 121, assessed contexts and frameworks using adjustable algorithms of context assessment employing information, data, and events. These assessments may be learned through repetitive data analysis. Alternatively, a user may employ the user interface of the electronic device 100 to enter various parameters, constructs, rules, and/or paradigms that instruct or otherwise guide the heuristic sensor processor 119 in detecting multi-modal social cues, emotional states, moods, and other contextual information. The heuristic sensor processor 119 can comprise an artificial neural network or other similar technology in one or more embodiments.

In one or more embodiments, the heuristic sensor processor 119 is operable with the one or more processors 114. In some embodiments, the one or more processors 114 can control the heuristic sensor processor 119. In other embodiments, the heuristic sensor processor 119 can operate independently, delivering information gleaned from detecting multi-modal social cues, emotional states, moods, and other contextual information to the one or more processors 114. The heuristic sensor processor 119 can receive data from one or both of the physical sensors 120 or the context sensors 121. In one or more embodiments, the one or more processors 114 are configured to perform the operations of the heuristic sensor processor 119.

In one or more embodiments, the block diagram schematic 112 includes a voice interface engine 122. The voice interface engine 122 can include hardware, executable code, and speech monitor executable code in one embodiment. The voice interface engine 122 can include, stored in memory 115, basic speech models, trained speech models, or other modules that are used by the voice interface engine 122 to receive and identify voice commands that are received with audio input captured by an audio capture device. In one embodiment, the voice interface engine 122 can include a voice recognition engine. Regardless of the specific implementation utilized in the various embodiments, the voice interface engine 122 can access various speech models to identify speech commands.

In one embodiment, the voice interface engine 122 is configured to implement a voice control feature that allows a user to speak a specific device command to cause the one or more processors 114 to execute a control operation. For example, the user may say, "How tall is the Willis Tower?" This question comprises a device command requesting the one or more processors to retrieve, with the communication device 116, information from a remote server, perhaps across the Internet, to answer the question. Consequently, this device command can cause the one or more processors 114 to access an application module, such as a web browser, to search for the answer and then deliver the answer as audible output via an audio output of the other components 124. In short, in one embodiment the voice interface engine 122 listens for voice commands, processes the commands and, in conjunction with the one or more processors 114, returns an output that is the result of the user's intent.

The block diagram schematic 112 can also include an image/gaze detection-processing engine 123. The image/gaze detection-processing engine 123 can be operable with the physical sensors 120, such as a camera or intelligent imager, to process information to detect a user's gaze point. The image/gaze detection-processing engine 123 can optionally include sensors for detecting the alignment of a user's head in three-dimensional space. Electronic signals can then be delivered from the sensors to the image/gaze detection-processing engine 123 for computing the direction of user's gaze in three-dimensional space. In one or more embodiments, the one or more processors 114 can cause the blade assembly 102 to transition to the peek position when an imager invocation request is received and the image/gaze detection-processing engine 123 determines that ta user is gazing at the front surface of the electronic device 100. The image/gaze detection-processing engine 123 can further be configured to detect a gaze cone corresponding to the detected gaze direction, which is a field of view within which the user may easily see without diverting their eyes or head from the detected gaze direction. This information can also be used to automatically transition the blade assembly 102 to the peek position. The image/gaze detection-processing engine 123 can be configured to alternately estimate gaze direction by inputting images representing a photograph of a selected area near or around the eyes.

The one or more processors 114 may also generate commands or execute control operations based upon information received from a combination of the physical sensors 120, the context sensors 121, the flexible display 104, the other components 124, and/or the other input devices. Alternatively, the one or more processors 114 can generate commands or execute control operations based upon information received from the one or more sensors or the flexible display 104 alone. Moreover, the one or more processors 114 may process the received information alone or in combination with other data, such as the information stored in the memory 115. As will be explained in more detail below with reference to FIGS. 23-28, this information can be used to automatically transition the blade assembly 102 to the peek position.

Other components 124 operable with the one or more processors 114 can include output components such as video outputs, audio outputs, and/or mechanical outputs. Examples of output components include audio outputs such as speaker port, earpiece speaker, or other alarms and/or buzzers and/or a mechanical output component such as vibrating or motion-based mechanisms. Still other components will be obvious to those of ordinary skill in the art having the benefit of this disclosure.

As noted above, in one or more embodiments a blade assembly 102 is coupled to the flexible display 104. In contrast to sliding devices that include multiple device housings, the electronic device 100 of FIG. 1 includes a single device housing 101 to which the blade assembly 102 is coupled. The blade assembly 102 is configured as a mechanical chassis that allows the flexible display 104 to translate along a translation surface defined by major and minor surfaces of the single device housing 101. In one or more embodiments, the blade assembly 102 also provides a mechanical support for portions 130 of the flexible display 104 that extend beyond the top edge 131 of the single device housing 101 when the blade assembly 102 and flexible display 104 are in the extended position shown in FIG. 1. When the display roller mechanism 105 actuates, it causes the blade assembly 102 and the flexible display 104 to translate 301 along the rear major surface 103, the bottom minor surface, and the front major surface between the extended position shown in FIG. 1, the retracted position shown in FIG. 3, and the peek position shown in FIG. 5.

The blade assembly 102 can include a blade substrate 125 that includes both flexible portions and rigid portions, and that is positioned between the flexible display 104 and the translation surface defined by the single device housing 101. The blade substrate 125 can also comprise a silicone border 127 that surrounds and protects the edges of the flexible display 104. In one or more embodiments, the blade substrate 125 comprises a steel backer plate with the silicone border 127 co-molded around the perimeter of the steel backer plate. In one or more embodiments, a low-friction dynamic bending laminate stack 128 and blade 126 are positioned between the blade assembly 102 and the translation surfaces defined by the single device housing 101.

In one or more embodiments, the blade substrate 125 is partially rigid and partially flexible. Illustrating by example, portions of the blade substrate 125 that slide along the major surfaces of the single device housing 101 are configured to be substantially rigid, while portions of the blade substrate 125 that pass around the minor surfaces of the single device housing 101 are configured to be flexible so that they can curl around those minor surfaces. In one or more embodiments, some portions of the blade substrate 125 abut the translation surfaces defined by the single device housing 101 while other portions abut the display roller mechanism 105, which is positioned at the bottom minor surface of the single device housing 101 in this illustrative embodiment.

In one or more embodiments, the blade 126 and the low-friction dynamic bending laminate stack 128 are positioned between the blade assembly 102 and the translation surfaces defined by the single device housing 101. The blade 126 supports portions of the blade assembly 102 and flexible display 104 that extend beyond the top edge 131 of the single device housing 101 when the blade assembly 102 is transitioned to the extended position shown in FIG. 1. Since this blade 126 needs to be rigid to support those portions of the blade assembly 102 and the flexible display 104, it is not able to bend around the display roller mechanism 105. To prevent gaps or steps from occurring where the blade 126 terminates, in one or more embodiments a low-friction dynamic bending laminate stack 128 spans the remainder of the blade assembly 102 and abuts the transition surfaces defined by the single device housing 101.

The blade assembly 102 can be fixedly coupled to the flexible display 104 by an adhesive or other coupling mechanisms. Where the blade substrate 132 defines both rigid and flexible portions. The blade substrate 132 can define a first rigid section extending along the major surfaces of the single device housing 101 and a second flexible section extending configured to wrap around the minor surfaces of the single device housing 101 where the display roller mechanism 105 is positioned.

Figure 5:
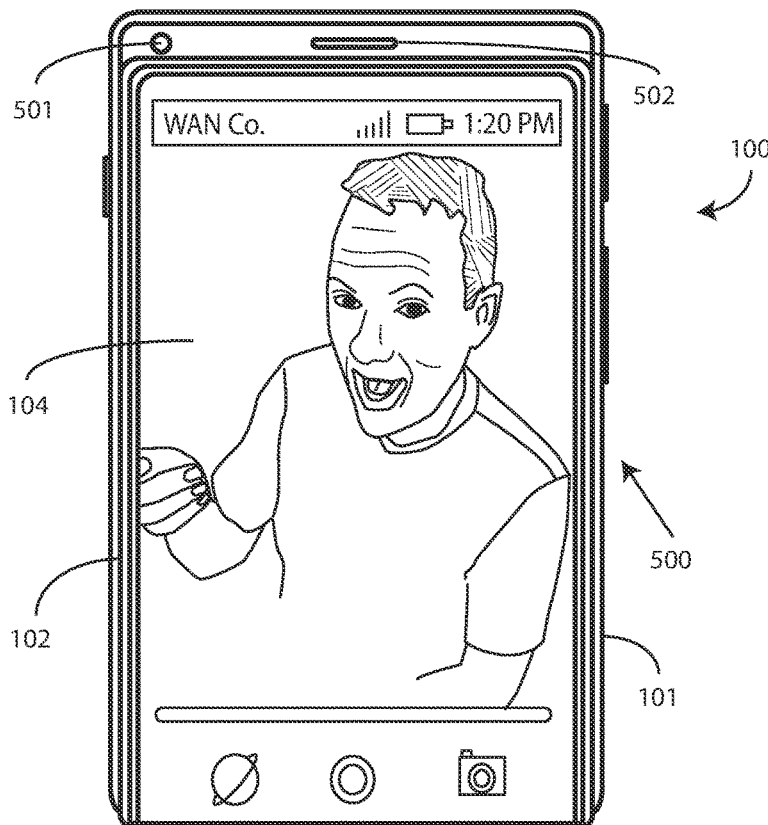
FIG. 5 illustrates the explanatory electronic device of FIG. 2 with the translating display moved to a third sliding position known as the "peek" position that exposes an image capture device positioned under the translating display when the translating display is in the first sliding position or second sliding position.

In one or more embodiments, the blade assembly 102 defines a mechanical assembly providing a slider framework that allows the flexible display 104 to move between the extended position of FIG. 1, the retracted position of FIG. 3, and the peek position of FIG. 5. As used herein, the term "framework" takes the ordinary English definition of a mechanical support structure supporting the other components coupled to the slider framework. These components can include the blade 126, the silicone border 127, and the low-friction dynamic bending laminate stack 128. Other components can be included as well. Illustrating by example, this can include electronic circuits for powering the flexible display 104. In one or more embodiments, it can further include a tensioner that ensures that the flexible display 104 remains flat against the single device housing 101 when translating.

In one or more embodiments, the display roller mechanism 105 that causes a first portion of the blade assembly 102 and the flexible display 104 display (shown on the rear side of the electronic device 100 in FIG. 1) and a second portion of the blade assembly 102 and the flexible display 104 (positioned on the front side of the electronic device 100 in FIG. 1) to slide symmetrically in opposite directions along the translation surfaces defined by the single device housing 101.

Thus, the electronic device 100 of FIG. 1 includes a single device housing 101 with a flexible display 104 incorporated into a blade assembly 102. The blade assembly 102 is then coupled to a translation mechanism defined by the display roller mechanism 105 and situated within the single device housing 101. In the explanatory embodiment of FIG. 1, the display roller mechanism 105 is situated at the bottom edge of the single device housing 101.

In one or more embodiments, the one or more processors 114 cause the blade assembly 102 to transition to the peek position in response to an application operating on the one or more processors 114 invoking an image capture operation and the one or more sensors 120,121 determining that the front-facing imager is oriented toward a user of the electronic device 100.

In one or more embodiments, the electronic device 100 includes a front-facing imager (shown below in FIG. 5) and a rear-facing imager 108. In one or more embodiments, the rear-facing imager 108 is exposed regardless of whether the blade assembly 102 is in the extended position, the retracted position, or the peek position, as shown in FIG. 1. By contrast, the front-facing imager is exposed only when the blade assembly 102 is in the peek position. It is instead concealed when the blade assembly 102 is in the retracted position, the extended position, or positions therebetween, as also shown in FIG. 1.

The one or more sensors 120,121 can determine that the front-facing imager is oriented toward the user in a variety of ways. Illustrating by example, in one or more embodiments the one or more processors 114 cause the rear-facing imager 108 to capture at least one image in response to an application operating on the one or more processors 114 invoking an image capture operation. If that at least one image fails to match a predefined criterion, the one or more processors 114 determine that the front-facing imager is oriented toward the user in one or more embodiments.

The predefined criterion can vary as well. In one or more embodiments, the predefined criterion comprises the at least one image depicting the user looking at the rear-facing imager. In other embodiments, the predefined criterion comprises the at least one depicting a face having a size exceeding a predefined image area threshold. Other predefined criteria will be described below. Still others will be obvious to those of ordinary skill in the art having the benefit of this disclosure.

In other embodiments, the one or more sensors 120,121 determine the front-facing imager is oriented toward the user of the electronic device 100 when the one or more processors 114 cause the rear-facing imager 108 to capture at least one image in response to the application operating on the one or more processors invoking the image capture operation and that at least one image matches a predefined criterion. In one or more embodiments, the predefined criterion comprises the at least one image depicting one or more of a hand, a finger, or an inanimate object. Other predefined criteria will be described below. Still others will be obvious to those of ordinary skill in the art having the benefit of this disclosure.

In other embodiments, as will be described below, translation of the blade assembly 102 can be initiated by the operation of a user interface component 110. Embodiments of the disclosure contemplate that in such an electronic device 100, manual actuation of the user interface component 110 potentially delays the usability of the electronic device 100 in the new state due to the time taken to manually "inject" the trigger causing transition of the blade assembly 102 and flexible display 104 by requiring the actuation of the user interface component 110.

Advantageously, embodiments of the disclosure provide systems and methods that automatically and pre-emptively move the flexible display 104 to the optimal state based upon service mode invocation of an image capture device and device orientation, rather than requiring the operation of user interface components 110. Illustrating by example, in one or more embodiments the one or more processors 114 of the electronic device 100 detect an application operating on the one or more processors 114 requesting invocation of an imager for service mode use by the application. One or more sensors 120,121 of the electronic device determine whether a front side or a rear side of the device housing 101 of the electronic device 100 is facing a user of the electronic device 100. When the front side of the device housing 101 is facing the user of the electronic device 100, the one or more processors 114 cause a translation mechanism to translate the blade assembly 102 to a peek position revealing a front-facing imager that is covered by the blade assembly 102 when the blade assembly 102 is in the retracted position, the extended position, or in positions between the retracted position and the extended position.

Advantageously, embodiments of the disclosure provide intuitive operation of a translating display in an electronic device 100. In cases where automatic translation of the translating display is triggered, the only user action is required for the translating display to move to the peek position is a service mode invocation of an imager and the front-facing imager of the electronic device 100 being oriented toward a user of the electronic device 100. Thereafter, the device automatically changes to the position potentially desired by the user.

As shown in FIG. 1, the blade assembly 102 is able to slide around the single device housing 101 such that the blade 126 slides away from the single device housing 101 to change the apparent overall length of the flexible display 104 as viewed from the front of the electronic device 100. By contrast, in other states (such as the one shown in FIG. 3) the blade assembly 102 can slide in an opposite direction around the single device housing 101 to a retracted position with similar amounts of the flexible display 104 visible on the front side of the electronic device 100 and the rear side of the electronic device 100.

In FIG. 1, the electronic device 100 includes a single device housing 101 with a blade assembly 102 coupled to two major surfaces of the single device housing 101 and wrapping around at least one minor surface of the electronic device 100 where the display roller mechanism 105 is situated. This allows the blade assembly 102 to slide relative to the single device housing 101 between a retracted position of FIG. 3, the extended position of FIG. 1, and the peek position of FIG. 5 revealing a front-facing image capture device.

It is to be understood that FIG. 1 is provided for illustrative purposes only and for illustrating components of one electronic device 100 in accordance with embodiments of the disclosure and is not intended to be a complete schematic diagram of the various components required for an electronic device. Therefore, other electronic devices in accordance with embodiments of the disclosure may include various other components not shown in FIG. 1 or may include a combination of two or more components or a division of a particular component into two or more separate components, and still be within the scope of the present disclosure.

Turning now to FIG. 2, illustrated therein is the electronic device 100 in the extended position 200 that was also shown in FIG. 1. In the extended position 200, the blade (126) slides outward and away from the single device housing 101, thereby revealing more and more portions of the flexible display 104. In such a configuration, the portions of flexible display 104 passing around the display roller mechanism (105) elongated into a flat position as they pass along the translation surface defined by the front of the single device housing 101.

Turning now to FIGS. 3-4, illustrated therein is the electronic device 100 with the flexible display 104 in the retracted position 300. FIG. 3 illustrates the front side of the electronic device 100, while FIG. 4 illustrates the rear side.

In this state, blade (126) slides back toward, and then along, the translation surface defined by the single device housing 101. This causes the apparent overall length of the flexible display 104 to get shorter as more and more portions of the flexible display 104 pass around the display roller mechanism (105) positioned at the bottom of the single device housing 101 and across the translation surface defined by the rear side of the single device housing 101.

Turning now to FIG. 5, illustrated therein is the electronic device 100 with the flexible display in the peek position 500. When in the peek position, the blade assembly 102 and the flexible display 104 translate past the retracted position (300) of FIG. 3. In one or more embodiments, when this occurs, the blade assembly 102 and the flexible display 104 reveal an image capture device 501 or front-facing imager that is situated beneath, and concealed by, the blade assembly 102 and the flexible display 104 when they are in the retracted position (300) of FIG. 3. In this illustrative embodiment, a loudspeaker 502 is also revealed.

Advantageously, by positioning the image capture device 501 beneath the blade assembly 102 and the flexible display 104 when these components are in either the retracted position (300) of FIGS. 3-4 or the extended position (200) of FIG. 2, a user of the electronic device 100 is assured of privacy due to the fact that the image capture device 501 is not able to see through the blade (126) of the blade assembly 102. Accordingly, even if the electronic device 100 is accessed by a hacker or other nefarious actor, the user can be assured that the image capture device 501 cannot capture images or videos while the blade assembly 102 and flexible display 104 are in the retracted position (300), the extended position (200), or in positions therebetween. Only when the blade assembly 102 and the flexible display 104 transition to the peek position 500, thereby revealing the image capture device 501, can the image capture device 501 capture front-facing images or front-facing videos.

Referring collectively to FIGS. 2-5, it can be seen that the electronic device 100 includes a single device housing with a flexible display 104 incorporated into a blade assembly 102. The blade assembly 102 is coupled to a translation mechanism situated within the single device housing 101.

In response to actuation of a user interface device, one example of which is a button positioned on a side of the single device housing 101, or alternatively automatically in response to a service mode invocation of an image capture device and device orientation as described below with reference to FIGS. 23-28, the translation mechanism is operable to transition the blade assembly 102 around the surfaces of the single device housing 101 between the extended position 200 where the blade (126) of the blade assembly 102 extends distally from the single device housing 101, the retracted position 300 where the blade assembly 102 abuts the single device housing 101 with the flexible display 104 and blade assembly 102 wrapping around the surfaces of the single device housing 101, the peek position 500 where movement of the translation mechanism causes the blade assembly 102 to reveal the image capture device 501 (and loudspeaker 502 in this example) situated beneath the blade assembly 102 on the front side of the single device housing 101, or even positions therebetween.

Another feature that can be seen in reviewing FIGS. 2-5 collectively is the how the presentation of content changes as a function of the position of the blade assembly 102. Embodiments of the disclosure contemplate that the position of the blade assembly 102 and flexible display 104 relative to the single device housing 101 change the amount of the flexible display 104 that is visible from the front, visible from the rear, and visible in the curved end portions. Said differently, the viewable size of the flexible display 104 from each side of the electronic device 100 will vary as a function of the position of the blade assembly 102 relative to the single device housing 101. Advantageously, embodiments of the disclosure provide applications, methods, and systems that dynamically resize and adjust the interface layouts and content presentations.

This can be accomplished by resizing a primary visible portion, e.g., the front-facing portion shown in FIGS. 2, 3, and 5, of the flexible display 104. Applications can be windowed on this primary area of the flexible display 104, which will resize as the flexible display 104 as it transitions between the extended position 200 of FIG. 2, the retracted position 300 of FIGS. 3-4, and the peek position 500 of FIG. 5.

In FIGS. 2-5, the one or more processors (114) of the electronic device 100 segment the flexible display 104 into three, individual, usable parts. These include the front-facing portion of the flexible display 104 shown in FIGS. 2, 3, and 5, the rear-facing portion of the flexible display 104 shown in FIG. 5, and the curvilinear portion of the flexible display 104 situated at the bottom of the electronic device 100 and wrapping around the rotor, shown in FIGS. 2-5. This curvilinear portion of the flexible display 104 is sometimes referred to as the "roll edge" portion of the display.

In one or more embodiments, each of these usable parts are dynamically remapped as the flexible display 104 changes position relative to the single device housing 101. In one or more embodiments, applications can request a window on the usable portion upon which it intends to present content.

In one or more embodiments, the orientation of the rear-facing portion and the roll edge portion is not the same as that of the front-facing portion when the flexible display 104 translates along the single device housing 101 from the extended position 200 shown in FIG. 2 to the retracted position 300 shown in FIGS. 3-4 or the peek position 500 of FIG. 5. To address this, as can be seen by comparing FIGS. 3-4, in one or more embodiments content presented on the rear-facing portion is rotated by 180-degrees so that its "up" side is the same as the "up" side on the front-facing portion.

In one or more embodiments, the orientation of content presented on the roll edge portion can change based upon the orientation of the electronic device 100. If, for example, the front-facing side is up the orientation of content presented on the roll edge will have a first orientation. By contrast, if the rear-facing side is up, the orientation of that same content presented on the roll edge will have a second orientation that is rotated 180-degrees relative to the first orientation.

In one or more embodiments, any content presented on the front-facing portion of the flexible display 104 is oriented in accordance with user preferences. In one or more embodiments, this front-facing portion is oriented in accordance with the orientation of the electronic device 100 in three-dimensional space.

On the roll edge portion of the translating display, in one or more embodiments this segment is oriented in the same orientation as the front-facing portion when the electronic device 100 is not oriented with the front-facing side facing the negative z-direction in three-dimensional space (it is rotated by 180-degrees when this is the case). In one or more embodiments, the roll edge portion does not obey user preferences for display orientation and auto rotate/device orientation.

In one or more embodiments, content presented on the rear-facing portion of the flexible display 104 is always rotated by 180-degrees relative to content presented on the front-facing portion when the electronic device 100 is being held vertically, as is the case, and as can be seen, in FIGS. 3-4. In one or more embodiments, the rear-facing portion does not obey user preferences for display orientation and auto-rotate/device orientation.

Accordingly, in one or more embodiments one or more processors (114) of the electronic device (100) dynamically remap multiple translating display root segments based upon the position of the flexible display 104 relative to the single device housing 101. The one or more processors 114 can independently manage orientation and rotation on each of the root segments of the flexible display 104, be they the front-facing portion, the rear-facing portion, or the roll edge portion. In one or more embodiments, this management occurs independently based upon which side of the electronic device 100 the segment is currently positioned upon, combined with sensor inputs to identify if the electronic device 100 is face down or face up.

As shown in FIG. 2, the blade assembly 102 is operable to slide around the single device housing 101 such that the blade 126 slides away from the single device housing 101 to change an overall length of the flexible display 104 as viewed from the front of the electronic device 100. As shown in FIGS. 3-4, the blade assembly 102 can slide in an opposite direction around the single device housing 101 to a retracted position 300, optionally in response to another swipe gesture, with similar amounts of the flexible display 104 being visible on the front side of the electronic device 100 and the rear side of the electronic device 100.

Accordingly, in one or more embodiments the electronic device 100 includes a single device housing 101 with a blade assembly 102 coupled to two major surfaces of the single device housing 101 and wrapping around at least one minor surface of the electronic device 100 such that the blade assembly 102 can slide relative to the single device housing 101 between the retracted position 300, the extended position 200, and the peek position 500 revealing a front-facing image capture device 501.

Figure 8:
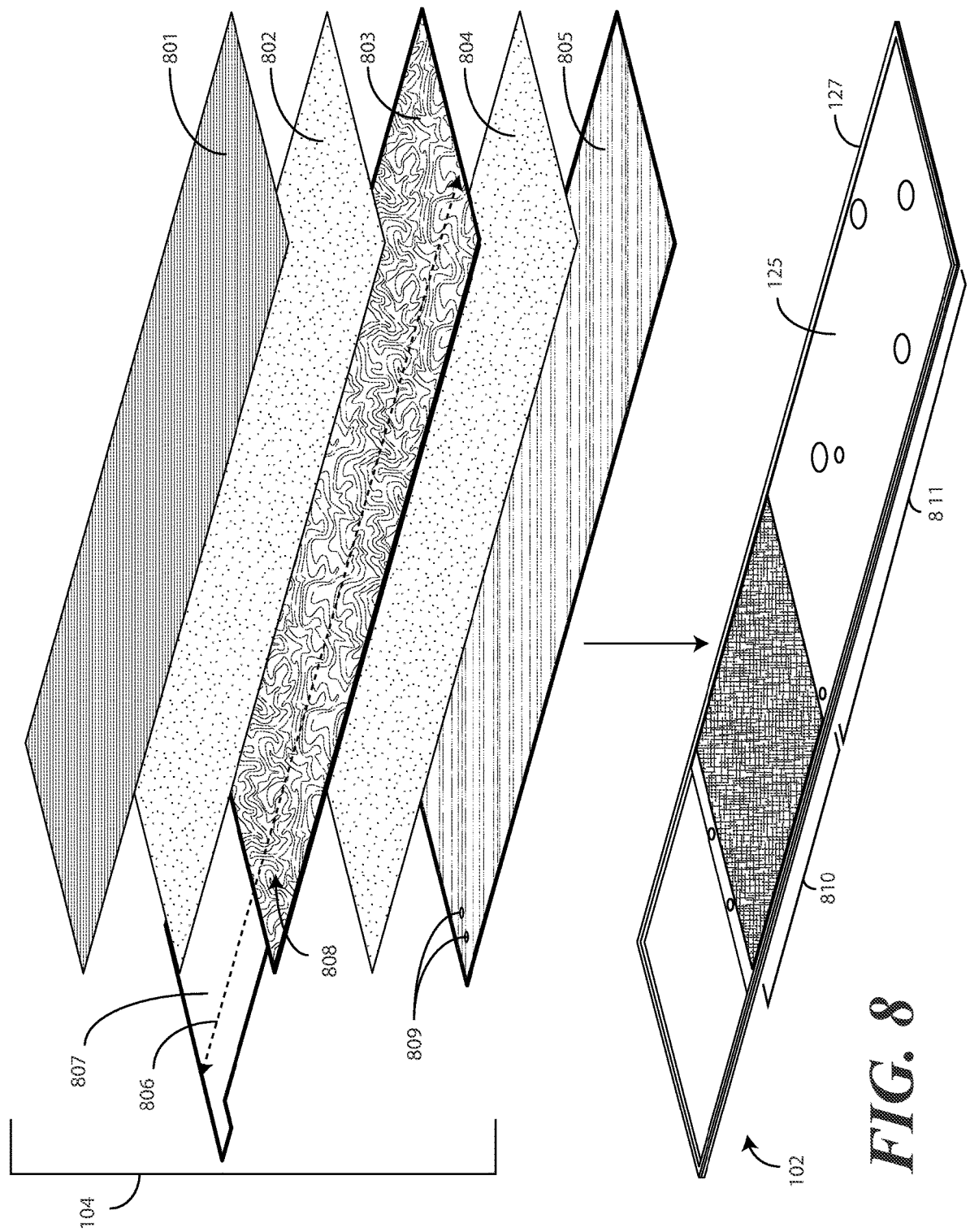
FIG. 8 illustrates portions of one explanatory display assembly in an exploded view in accordance with one or more embodiments of the disclosure.

Turning now to FIG. 8, illustrated therein is the flexible display 104 shown in an exploded view, along with the blade assembly 102. As shown in FIG. 8, in one or more embodiments the flexible display 104 comprises one or more layers that are coupled or laminated together to complete the flexible display 104. In one or more embodiments, these layers comprise a flexible protective cover 801, a first adhesive layer 802, a flexible display layer 803, a second adhesive layer 804, and a flexible substrate 805. Other configurations of layers suitable for manufacturing the flexible display 104 will be obvious to those of ordinary skill in the art having the benefit of this disclosure.

Beginning from the top of the layer stack, in one or more embodiments the flexible protective cover 801 comprises an optically transparent substrate. In one or more embodiments the flexible protective cover 801 may be manufactured from an optically transparent material such a thin film sheet of a thermoplastic material. Illustrating by example, in one embodiment the flexible protective cover 801 is manufactured from a layer of optically transparent polyamide having a thickness of about eighty microns. In another embodiment, the flexible protective cover 801 is manufactured from a layer of optically transparent polycarbonate having a thickness of about eighty microns. Other materials suitable for manufacturing the flexible protective cover 801 will be obvious to those of ordinary skill in the art having the benefit of this disclosure.

In one or more embodiments the flexible protective cover 801 functions as a fascia by defining a cover for the flexible display layer 803. In one or more embodiments the flexible protective cover 801 is optically transparent, in that light can pass through the flexible protective cover 801 so that objects behind the flexible protective cover 801 can be distinctly seen. The flexible protective cover 801 may optionally include an ultra-violet barrier. Such a barrier can be useful in improving the visibility of flexible display layer 803 in one or more embodiments.

Beneath the flexible protective cover 801 is a first adhesive layer 802. In one or more embodiments, the first adhesive layer 802 comprises an optically transparent adhesive. The optically transparent adhesive can be applied to two sides of a thin, optically transparent substrate such that the first adhesive layer 802 functions as an optically transparent layer having optically transparent adhesive on both sides. Where so configured, in one or more embodiments the first adhesive layer 802 has a thickness of about fifty microns. This optically transparent version of "double-sided tape" can then be spooled and applied between the flexible protective cover 801 and the flexible display layer 803 to couple the two together.

In other embodiments the first adhesive layer 802 will instead be applied between the flexible protective cover 801 and the flexible display layer 803 as an optically transparent liquid, gel, as a homogeneous adhesive layer, or in the form of another medium. Where so configured, the first adhesive layer 802 can optionally be cured by heat, ultraviolet light, or other techniques. Other examples of materials suitable for use as the first adhesive layer 802 will be obvious to those of ordinary skill in the art having the benefit of this disclosure. In one or more embodiments, the first adhesive layer 802 mechanically couples the flexible display layer 803 to the flexible protective cover 801.

In one or more embodiments, the flexible display layer 803 is situated between the flexible substrate 805 and the flexible protective cover 801. In one or more embodiments, the flexible display layer 803 is longer along a major axis 806 of the flexible display layer 803, and thus the flexible display 104 itself, than is the image producing portion 808 of the flexible display 104. For instance, as shown in FIG. 8 the flexible display layer 803 includes a T-shaped tongue 807 that extends beyond the image producing portion 808 of the flexible display layer 803. As will be shown in FIG. 10 below, in one or more embodiments electronic circuit components configured to operate the image producing portion 808 of the flexible display layer 803, connectors, and other components can be coupled to this T-shaped tongue 807 in one or more embodiments. Thus, in this illustrative embodiment the T-shaped tongue 807 extends distally beyond terminal ends of the other layers of the flexible display 104. While the T-shaped tongue 807 is T-shaped in this illustrative embodiment, it can take other shapes as well as will be obvious to those of ordinary skill in the art having the benefit of this disclosure.

The flexible display layer 803 can optionally be touch-sensitive. In one or more embodiments, the flexible display layer 803 is configured as an organic light emitting diode (OLED) display layer. When coupled to the flexible substrate 805, the flexible display layer 803 can bend in accordance with various bending radii. For example, some embodiments allow bending radii of between thirty and six hundred millimeters. Other substrates allow bending radii of around five millimeters to provide a display that is foldable through active bending. Other displays can be configured to accommodate both bends and folds.

In one or more embodiments the flexible display layer 803 may be formed from multiple layers of flexible material such as flexible sheets of polymer or other materials. Illustrating by example, the flexible display layer 803 can include a layer of optically pellucid electrical conductors, a polarizer layer, one or more optically transparent substrates, and layers of electronic control circuitry such as thin film transistors to actuate pixels and one or more capacitors for energy storage. In one or more embodiments, the flexible display layer 803 has a thickness of about 130 microns.

In one or more embodiments, to be touch sensitive the flexible display layer 803 includes a layer including one or more optically transparent electrodes. In one or more embodiments, the flexible display layer 803 includes an organic light emitting diode layer configured to images and other information to a user. The organic light emitting diode layer can include one or more pixel structures arranged in an array, with each pixel structure comprising a plurality of electroluminescent elements such as organic light emitting diodes. These various layers can be coupled to one or more optically transparent substrates of the flexible display layer 803. Other layers suitable for inclusion with the flexible display layer 803 will be obvious to those of ordinary skill in the art having the benefit of this disclosure.

In one or more embodiments, the flexible display layer 803 is coupled to a flexible substrate 805 by a second adhesive layer 804. In other embodiments, a layer above the flexible display layer 803 can be configured with enough stiffness to make the flexible substrate 805 unnecessary. For example, in an embodiment where the flexible protective cover 801 is configured with enough stiffness to provide sufficient protection for the flexible display 104 during bending, the flexible substrate 805 may be omitted.

In one or more embodiments, the flexible substrate 805 comprises a thin layer of steel. Illustrating by example, in one or more embodiments the flexible substrate 805 comprises a steel layer with a thickness of about thirty microns. While thin, flexible steel works well in practice, it will be obvious to those of ordinary skill in the art having the benefit of this disclosure that other materials can be used for the flexible substrate 805 as well. For instance, in another embodiment the flexible substrate 805 is manufactured from a thin layer of thermoplastic material.

In one or more embodiments, to simplify manufacture, the second adhesive layer 804 is identical to the first adhesive layer 802 and comprises an optically transparent adhesive. However, since the second adhesive layer 804 is coupled between the flexible display layer 803 and the flexible substrate 805, i.e., under the flexible display layer 803, an optically transparent adhesive is not a requirement. The second adhesive layer 804 could be partially optically transparent or not optically transparent at all in other embodiments.

Regardless of whether the second adhesive layer 804 is optically transparent, in one or more embodiments the adhesive of the second adhesive layer 804 is applied to two sides of a thin, flexible substrate. Where so configured, in one or more embodiments the second adhesive layer 804 has a thickness of about fifty microns. This extremely thin version of "double-sided tape" can then be spooled and applied between the flexible display layer 803 and the flexible substrate 805 to couple the two together.

In other embodiments, as with the first adhesive layer 802, the second adhesive layer 804 will instead be applied between the flexible display layer 803 and the flexible substrate as a liquid, gel, as a homogeneous layer, or in the form of another medium. Where so configured, the second adhesive layer 804 can optionally be cured by heat, ultraviolet light, or other techniques. Other examples of materials suitable for use as the second adhesive layer 804 will be obvious to those of ordinary skill in the art having the benefit of this disclosure.

In this illustrative embodiment, the flexible display 104 is supported by not only the flexible substrate 805, but by the blade assembly 102 as well. As previously described, in one or more embodiments the blade assembly 102 includes a blade substrate 125. In one or more embodiments, the blade substrate 125 comprises a layer of steel. In one or more embodiments, the blade substrate 125 is thicker than the flexible substrate 805. Illustrating by example, in one or more embodiments when the flexible substrate 805 comprises a steel layer with a thickness of about thirty microns, the blade substrate 125 comprises a layer of steel having a thickness of about one hundred microns.

In one or more embodiments, the blade substrate 125 comprises a rigid, substantially planar support layer. Illustrating by example, the blade substrate 125 can be manufactured from stainless steel in one or more embodiments. In another embodiment, the blade substrate 125 is manufactured from a thin, rigid thermoplastic sheet. Other materials can be used in manufacturing the blade substrate 125 as well. For example, the material nitinol, which is a nickel-titanium alloy, can be used to manufacture the blade substrate 125. Other rigid, substantially planar materials will be obvious to those of ordinary skill in the art having the benefit of this disclosure.

Accordingly, the blade substrate 125 defines another mechanical support for the flexible display 104. In one or more embodiments, the blade substrate 125 is the stiffest layer of the overall assembly of FIG. 8. In one or more embodiments the blade substrate 125 is manufactured from stainless steel with a thickness of about one hundred microns. In another embodiment, the blade substrate 125 is manufactured from a flexible plastic. Other materials from which the blade substrate 125 can be manufactured will be obvious to those of ordinary skill in the art having the benefit of this disclosure. For instance, in another embodiment the blade substrate 125 is manufactured from carbon fiber, and so forth. In one or more embodiments, the blade substrate 125 includes a reinforcing border comprising a thicker layer of material to further protect the flexible display 104 when the blade assembly 102 is in the extended position (200).

In one or more embodiments, the flexible substrate 805 is slightly longer along a major axis of the flexible substrate 805 than is the image producing portion 808 of the flexible display 104. Since the T-shaped tongue 807 is T-shaped, this allows one or more apertures 809 to be exposed on either side of the base of the T of the T-shaped tongue 807. In one or more embodiments, this extra length along the major axis provided by the flexible substrate 805 allows one or more fasteners to rigidly couple the first end of the flexible substrate 805 to a tensioner.

Embodiments of the disclosure contemplate that some of the layers comprising the flexible display 104 are stiffer than others. Similarly, other layers of the flexible display 104 are softer than others. For example, where the flexible substrate 805 is manufactured from a metal, one example of which is stainless steel, this layer is stiffer than either the first adhesive layer 802 or the second adhesive layer 804. In one or more embodiments, the stainless steel is stiffer than the flexible display layer 803 as well. In one or more embodiments, the flexible substrate 805 is the stiffest layer in the flexible display 104 while the first adhesive layer and the second adhesive layer 804 are the softest layers of the flexible display 104. The flexible protective cover 801 and the flexible display layer 803 have a stiffness that falls between that of the flexible substrate 805 and the adhesive layers in one or more embodiments.

In one or more embodiments, the various layers of the flexible display 104 are laminated together in a substantially planar configuration. Said differently, in one or more embodiments the flexible substrate 805 is configured as a substantially planar substrate. The second adhesive layer 804 can be attached to this substantially planar substrate, with the flexible display layer 803 then attached to the second adhesive layer 804. The first adhesive layer 802 can be attached to the flexible display layer 803, with the flexible protective cover 801 attached to the first adhesive layer 802.

To ensure proper coupling, the resulting flexible display layer 803 can be cured, such as in an autoclave at a predefined temperature for a predefined duration. Where employed, such curing allows any air bubbles or other imperfections in the various layers to be corrected. In one or more embodiments, since the flexible substrate 805 is configured as a substantially planar substrate, the resulting flexible display 104 is substantially planar as well.

In one or more embodiments, the blade substrate 125 of the blade assembly 102 includes both a flexible portion 810 and a rigid portion 811. Since the blade substrate 125 is manufactured from a metal in one or more embodiments, one example of which is steel having a thickness of one hundred microns, the rigid portion 811 gets its rigidity from the material from which it is manufactured. If, for example, the blade substrate 125 were manufactured from a thermoplastic material, in one or more embodiments this thermoplastic material would have enough rigidity that the rigid portion 811 would be rigid. Since the rigid portion 811 only slides along flat major surfaces of the translation surfaces defined by the single device housing (101), it does not need to bend. Moreover, rigidity helps to protect portions of the flexible display 104 that extend beyond ends of the single device housing (101).

By contrast, the flexible portion 810 need to wrap around minor faces of the single device housing (101) where the display roller mechanism (105) is situated. Since the flexible portion 810 is manufactured from the same material as the rigid portion 811 when the blade substrate 125 is manufactured as a single unitary part, in one or more embodiments it includes a plurality of apertures cut through the blade substrate 125 allowing the material to bend. Illustrating by example, in one or more embodiments where the blade substrate 125 is manufactured from steel, a plurality of chemically or laser etched apertures can allow the flexible portion 810 to tightly wrap around minor faces of the single device housing (101) where the display roller mechanism (105) is situated.

Thus, in one or more embodiments the blade substrate 125 is partially rigid and partially flexible. Portions of the blade substrate 125 that slide along the major surfaces of the single device housing (101) are configured to be substantially rigid, while portions of the blade substrate 125 that pass around the minor surfaces of the single device housing (101) are configured to be flexible so that they can curl around those minor surfaces.

In one or more embodiments, the blade assembly 102 also includes a silicone border 127 positioned around a perimeter of the blade substrate 125. In one or more embodiments, the silicone border 127 surrounds and protects the edges of the flexible display 104 when the flexible display 104 is attached to the blade substrate 125 of the blade assembly 102. In one or more embodiments, the silicone border 127 is co-molded around the perimeter of the blade substrate 125.

In one or more embodiments, the rigid portion 811 of the blade substrate 125 can define one or more apertures. These apertures can be used for a variety of purposes. Illustrating by example, some of the apertures can be used to rigidly fasten the blade assembly 102 to a translation mechanism, one example of which was the display roller mechanism (105) of FIG. 1. Additionally, some of the apertures can contain magnets. Hall-effect sensors positioned in the single device housing (101) to which the blade assembly 102 is coupled can then detect the positions of these magnets such that the one or more processors (114) can determine whether the blade assembly 102 and flexible display 104 are in the extended position (200), the retracted position (300), the peek position (500), or somewhere in between.

In one or more embodiments, the flexible display 104 coupled to the blade substrate 125 of the blade assembly 102 within the confines of the silicone border 127. Illustrating by example, in one or more embodiments a first end of the flexible display 104 is adhesively coupled to the rigid portion 811 of the blade substrate 125 of the blade assembly 102. The other end of the flexible display 104 can then be rigidly coupled to a tensioner by passing fasteners through the apertures 809 of the flexible substrate.

Figure 9:
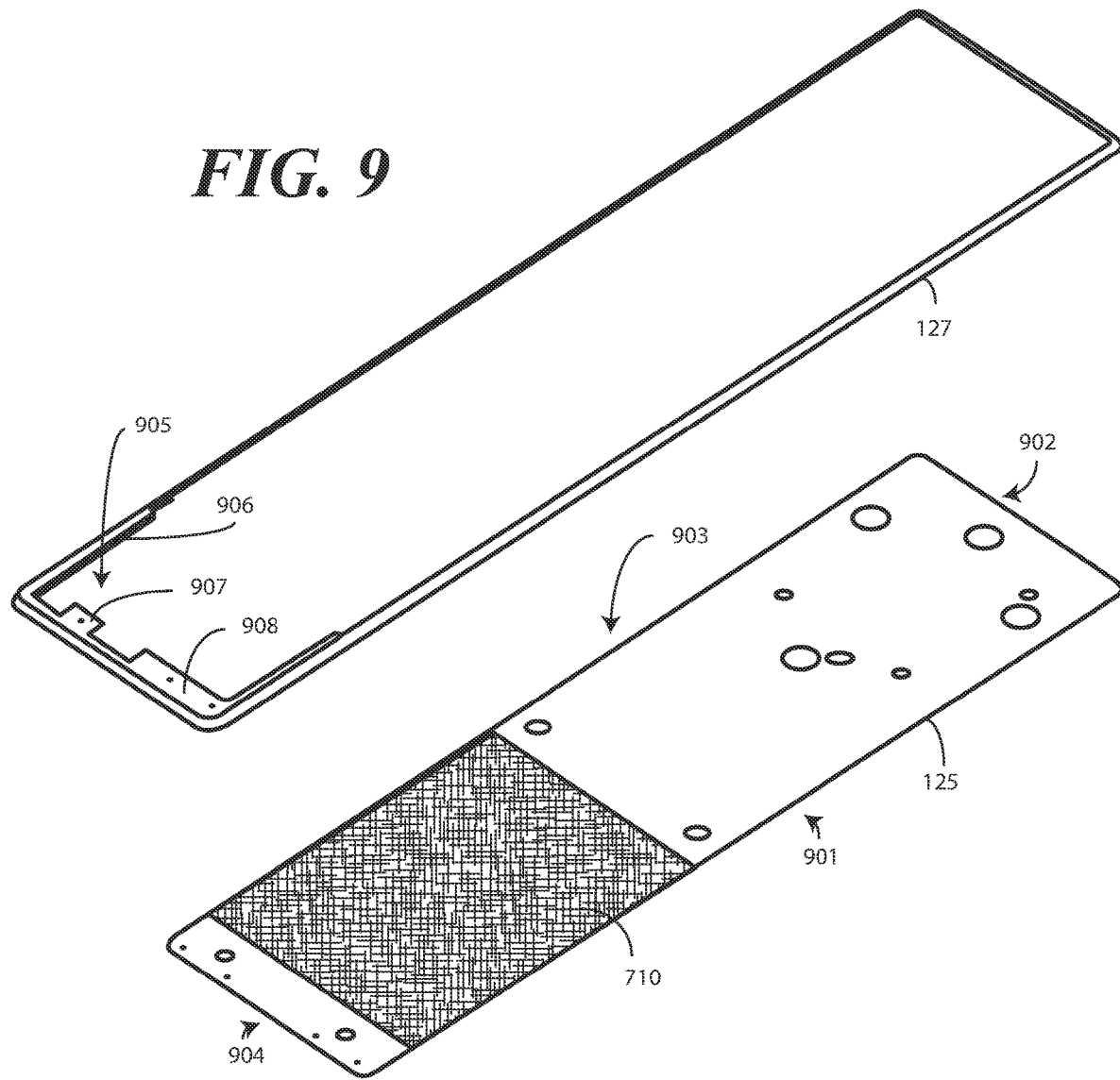
FIG. 9 illustrates portions of one explanatory display assembly in an exploded view in accordance with one or more embodiments of the disclosure.

Turning now to FIG. 9, illustrated therein is the blade substrate 125 and silicone border 127 shown in an exploded view. A shown, the silicone border 127 defines a singular, contiguous, unitary piece of silicone. In the illustrative embodiment of FIG. 9, the silicone border 127 surrounds three sides 901,902,903 of the blade substrate 125, and extends beyond minor side 904 to define a receiving recess 905 that can accommodate mechanical and electrical components such as electronic circuit components to power and control the flexible display (104) that will situate within the perimeter defined by the silicone border 127, a tensioner to keep the flexible display (104) flat across the flexible portion 810 of the blade substrate 125, flexible circuits, and other components.

In this illustrative embodiment, the portions 906,907,908 of the silicone border 127 extending beyond the minor side 904 of the blade substrate 125 surrounding the receiving recess 905 are thicker than are the other portions of the silicone border 127 that will surround the flexible display (104). This allows for components to be placed within the receiving recess 905.

Figure 10:
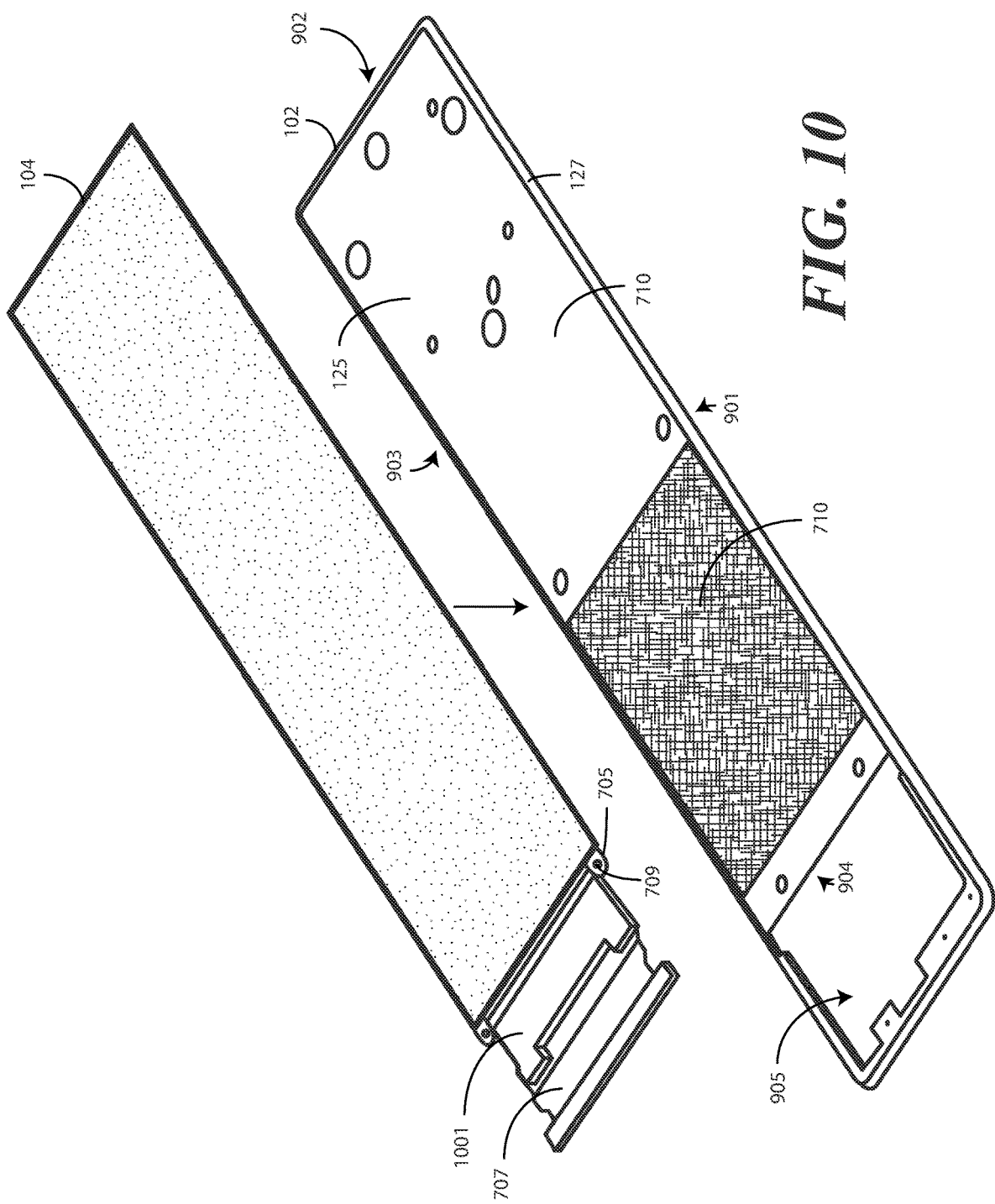
FIG. 10 illustrates one explanatory display assembly in an exploded view in accordance with one or more embodiments of the disclosure.

Turning now to FIG. 10, illustrated therein is the flexible display 104 and the blade assembly 102 with the silicone border 127 over-molded on the blade substrate 125. As shown, the silicone border 127 surrounds three sides 901, 902,903 of the blade substrate 125 and extends beyond minor side 904 to define a receiving recess 905 that can accommodate mechanical and electrical components.

Electronic circuits 1001 operable to power and control the flexible display 104 have been coupled to the T-shaped tongue 807 of the flexible display layer (803). Additionally, a mechanical connector 1002 has been connected to the top of the T on the T-shaped tongue 807. In this illustrative embodiment, the flexible substrate 805 extends beyond a distal end of the flexible display layer (803) so that the apertures 809 defined therein can be coupled to a tensioner to ensure that the flexible display 104 stays flat around the flexible portion 810 of the blade substrate 125 when the flexible portion 810 of the blade substrate 125 passes around a rotor positioned at the end of a single device housing (101).

The blade assembly 102 can be fixedly coupled to the flexible display 104 in one or more embodiments. Illustrating by example, where the blade substrate 125 defines both a rigid portion 811 and a flexible portion 810, in one or more embodiments the flexible display 104 is coupled to the rigid portion 811 by an adhesive or other coupling mechanism. A tensioner can then be positioned in the receiving recess 905. In one or more embodiments, the tensioner rigidly couples with fasteners to the apertures 809 of the flexible substrate 805 to keep the flexible display 104 flat across the flexible portion 810, regardless of how the flexible portion 810 is being bent around the minor surface of a single device housing or its corresponding rotor.

Figure 11:
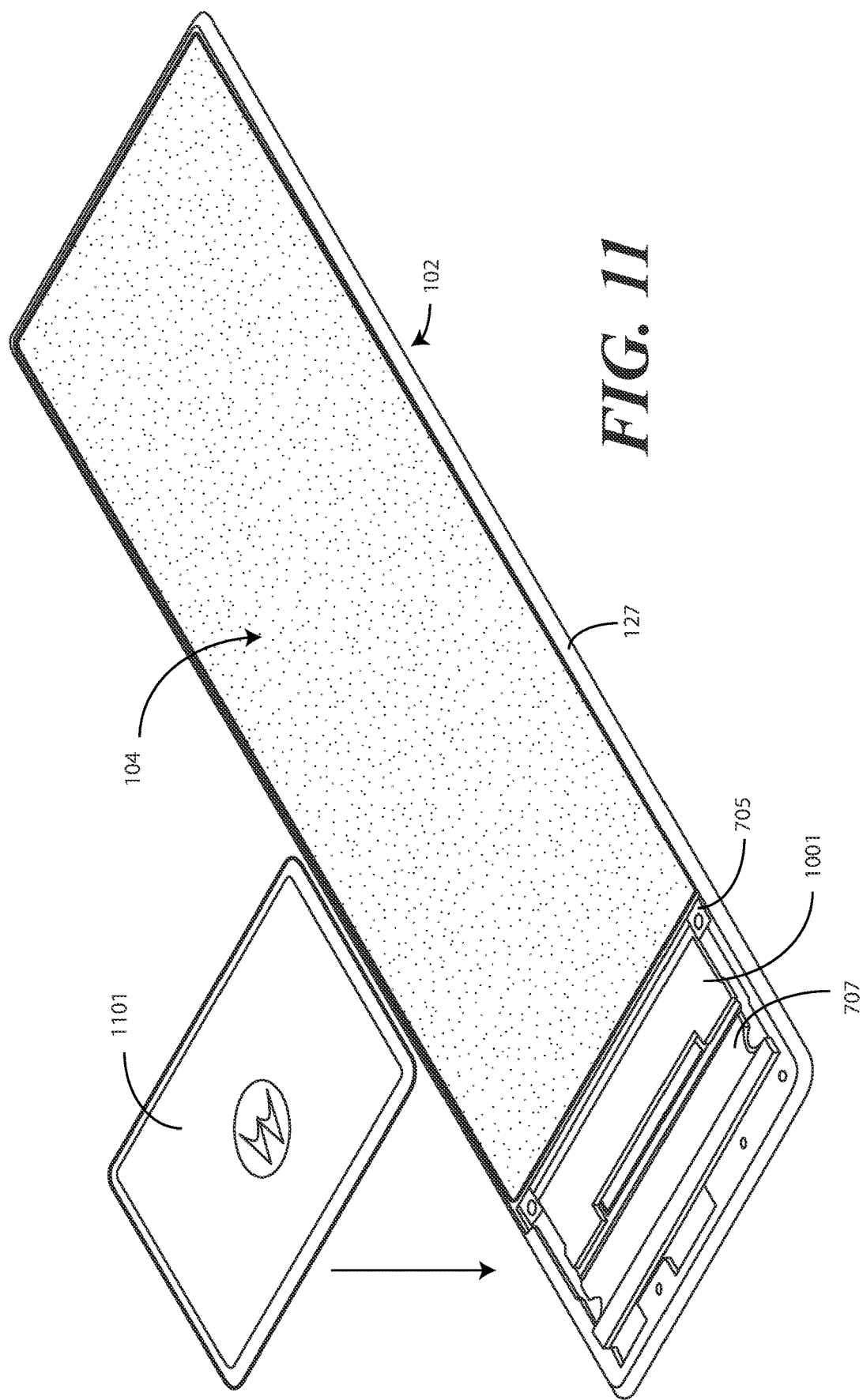
FIG. 11 illustrates explanatory display components in accordance with one or more embodiments of the disclosure.

Turning now to FIG. 11, illustrated therein is the flexible display 104 after being coupled to the blade assembly 102. As shown, the silicone border 127 surrounds the flexible display 104, with the silicone border 127 surrounding and abutting three sides of the flexible display layer (803).

Figure 12:
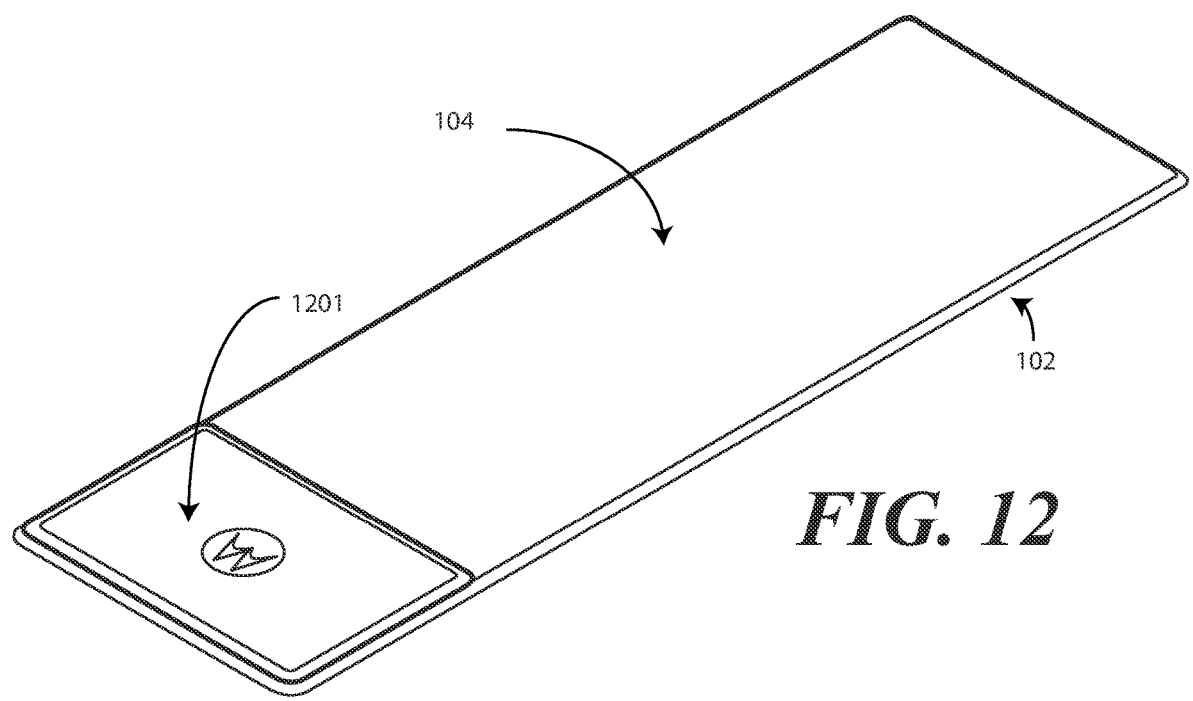
FIG. 12 illustrates one explanatory display assembly in an undeformed state.

A flexible substrate is then connected to the electronic circuits 1001 carried by the T-shaped tongue 807. Additionally, a tensioner can be coupled to the flexible substrate 805. Thereafter, a cover 1101 is attached to the silicone border 127 atop the electronic circuits 1001 and other components situated on or around the T-shaped tongue. This portion the blade assembly 102 where the components are stored beneath the cover 1101 is affectionately known as the "backpack." Turning to FIG. 12, illustrated therein is the blade assembly 102 with its backpack 1201 completely configured.

In one or more embodiments, the flexible display 104 and blade assembly 102 are configured to wrap around a minor surface of a device housing where a display roller mechanism is situated. In one or more embodiments, the display roller mechanism includes a rotor that is positioned within a curvilinear section of the flexible display 104 and blade assembly 102. When placed within a device housing of an electronic device, translation of a translation mechanism causes translation of the blade assembly 102, which in turn causes rotation of the rotor. The result is a linear translation of the flexible display 104 and blade assembly 102 across a translation surface of the device housing by drawing the flexible display 104 and the blade assembly 102 around the rotor.

Figure 13:
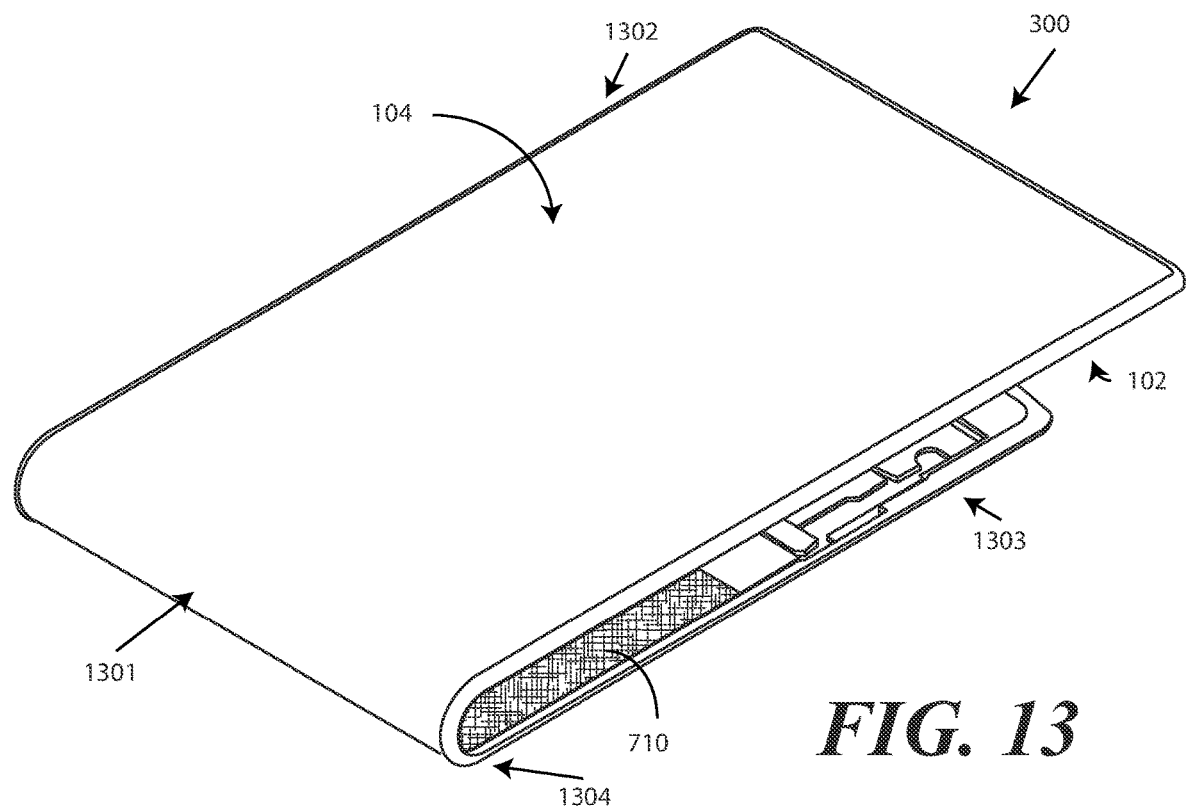
FIG. 13 illustrates the explanatory display assembly of FIG. 12 in a deformed state.
Figure 14:
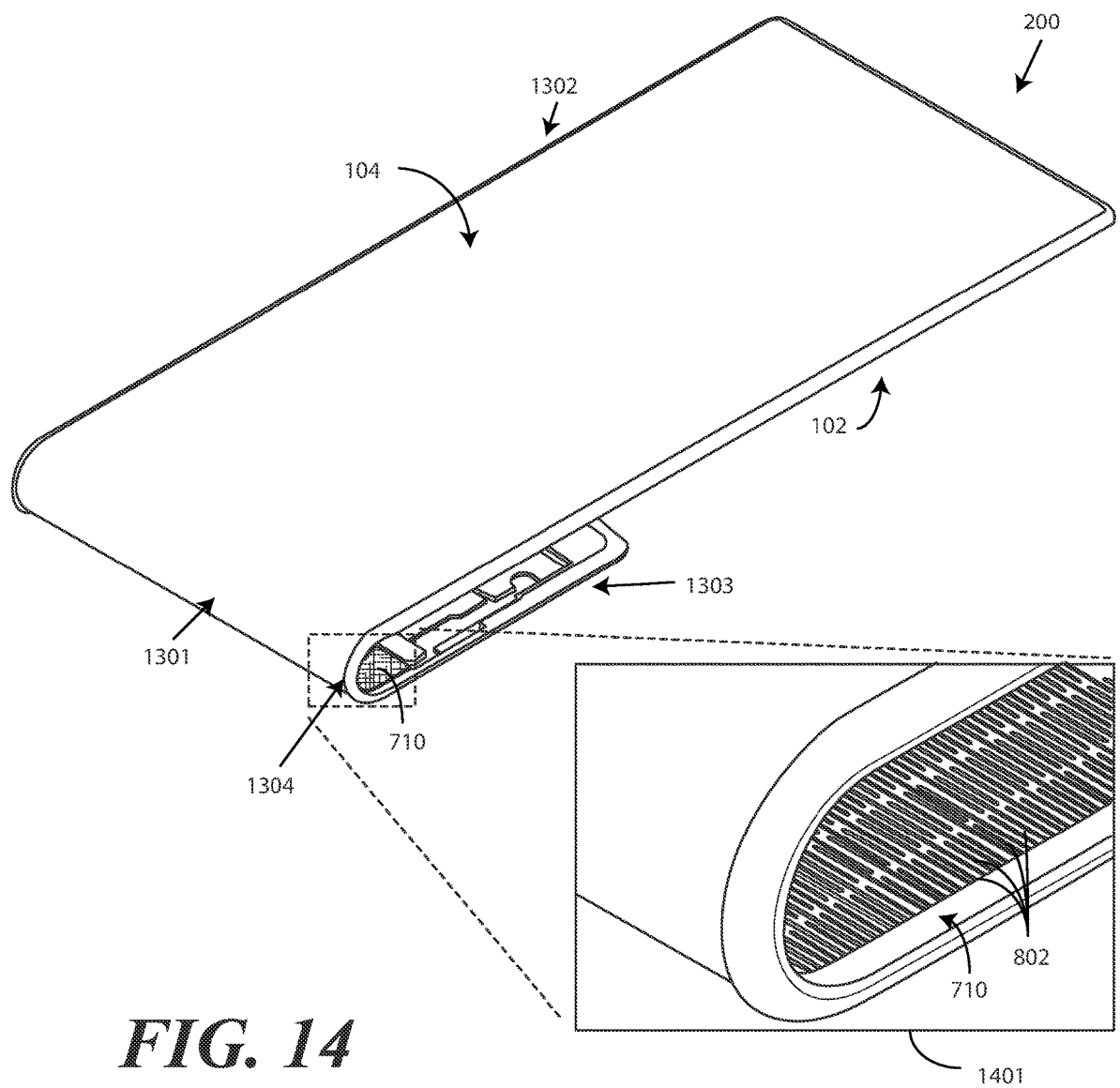
FIG. 14 illustrates the explanatory display assembly of FIG. 12 in another deformed state with an exploded view of a deformable portion of the display assembly shown in a magnified view.

That the blade substrate (125) of the blade assembly 102 includes a flexible portion (810) allows the blade assembly 102 and flexible display 104 to deform around a device housing, one example of which is the single device housing (101) of FIG. 1. Illustrating by example, turning now to FIGS. 13-14, illustrated therein is the blade assembly 102 and flexible display deformed to create a curvilinear section 1301 and two linear sections 1302,1303. The flexible display 104 and blade assembly 102 are shown as they would be in the retracted position 300 in FIG. 13. The flexible display 104 and the blade assembly 102 are shown as they would be in the extended position 200 in FIG. 14. The enlarged view 1401 of FIG. 14 shows how the apertures defined by the chemical etching of the blade substrate 125 easily allow the blade substrate 125 to bend around the curvilinear section 1301 while maintaining a rigid support structure beneath the flexible display 104 in the two linear sections 1302,1303.

In one or more embodiments, the first linear section 1302 and the second linear section 1303 are configured to slide between the retracted position 300 of FIG. 13 and the extended position 200 of FIG. 14. The flexible display 104 is coupled to the blade assembly 102 and therefore translates with the blade assembly 102 along a translation surface defined by a device housing of an electronic device.

In one or more embodiments, the linear sections 1302, 1303 of the blade assembly 102 are positioned between the flexible display 104 and the translation surface. A rotor is then positioned within a curvilinear section 1301 of the blade assembly 102. When a translation mechanism causes the linear sections 1302,1303 of the blade assembly 102 to move across the translation surface defined by the device housing, the rotor rotates with the flexible portion 810 passing along the rotor while the rotor rotates.

As shown in FIGS. 13-14, in one or more embodiments a cross section of both the blade assembly 102 and the flexible display 104 defines a J-shape with a curved portion of the J-shape, defined by the curvilinear section 1301, configured to wrap around a rotor and an upper portion of the J-shape, defined by linear section 1302, passing across a translation surface defined by a device housing. When the translators of a translation mechanism drive the blade assembly 102, the upper portion of the J-shape becomes longer as the flexible display 104 translates around the rotor with the blade assembly 102 extending further from of the device housing. This can be seen in FIGS. 13-14 by comparing the extended position 200 of FIG. 14 to the retracted position 300 of FIG. 13.

When the translators of the translation mechanism drive the blade assembly 102 in the opposite direction, e.g., driving the blade assembly 102 from the extended position 200 of FIG. 14 to the retracted position 300 of FIG. 13, the upper portion of the J-shape becomes shorter as the reverse operation occurs. Thus, when the translation mechanism drives the blade assembly 102 carrying the flexible display 104, the flexible display 104 deforms at different locations as it wraps and passes around the rotor.

It should be understood that a more traditional "J-shape" is principally defined when the blade assembly 102 is transitioned to the extended position 200 of FIG. 14. Depending upon the length of the blade assembly 102 and flexible display 104, combined with the amount the translation mechanism can cause the blade assembly 102 to slide around the rotor, the J-shape may transition to other shapes as well, including a U-shape where the upper and lower portions of the blade assembly 102 and/or flexible display 104 are substantially symmetrical. Such a U-shape forms when the blade assembly is in the peek position but is substantially formed in the retracted position 300 of FIG. 3. In other embodiments, depending upon construction, the blade assembly 102 may even transition to an inverted J-shape where the upper portion of the blade assembly 102 and/or flexible display 104 is shorter than the lower portion of the blade assembly 102 and/or flexible display 104, and so forth.

In one or more embodiments, the translators and rotor of the translation mechanism not only facilitate the "extension" of the flexible display 104 that occurs during an extending or "rising" operation, but also works to improve the reliability and usability of the flexible display 104 as well. This is true because the rotor defines a service loop 1304 in the curvilinear section 1301 with a relatively large radius compared to the minimum bending radius of the flexible display 104. The service loop 1304 prevents the flexible display 104 from being damaged or developing memory in the curved state occurring as the flexible display 104 defines the curvilinear section 1301 wrapping around the rotor in the extended position 200, retracted position 300, and peek position (500).

Using such a mechanical assembly, the flexible display 104 maintains a flat upper portion of the J-shape defined by the first linear section 1302 when sliding. Additionally, the flexible display 104 wraps tightly around the rotor with the lower portion of the J-shape defined by the second linear section 1303 remaining flat against the lower surface of a device housing as well. The blade assembly 102 and tensioner combination, which are rigidly affixed to the translation mechanism, precludes the flexible display 104 from crumpling or bunching when sliding around the device housing between the extended position 200, the retracted position 300, and the peek position (500). This rigid coupling combined with moving tensioner ensures a straight and true translation of the flexible display 104 across a first major surface of an electronic device, around the rotor of the electronic device positioned at a minor surface of the device housing, and across a second major surface of the electronic device.

In one or more embodiments additional support components can be attached to the blade assembly 102 to one or more of provide additional support for the flexible display 104, ease translation of the blade assembly 102 around a device housing, or combinations thereof.

As noted above, in one or more embodiments a blade assembly 102 is coupled to the flexible display 104. In contrast to sliding devices that include multiple device housings, embodiments of the disclosure provide an electronic device with a sliding display that includes only on device housing. The blade assembly 102 is configured as a mechanical chassis that allows the flexible display 104 to translate along a translation surface defined by major and minor surfaces of the single device housing.

In one or more embodiments, the blade assembly 102 also provides a mechanical support for portions of the flexible display 104 that extend beyond the top edge of the single device housing when the blade assembly 102 and flexible display 104 are in the extended position. The blade assembly 102 can include a blade substrate (125) that is unitary, but that defines both flexible portions and rigid portions. The blade substrate (125) can comprise the silicone border 127 that surrounds and protects the edges of the flexible display 104.

A low-friction dynamic bending laminate stack (128) and blade (126) can be positioned between the blade assembly 102 and the translation surfaces defined by the single device housing (101). In one or more embodiments, the blade (126) and the low-friction dynamic bending laminate stack (128) are positioned between the blade assembly 102 and the translation surfaces defined a device housing to which the blade assembly 102 is attached.

The blade (126) supports portions of the blade assembly 102 and flexible display 104 that extend beyond the top edge of the device housing when the blade assembly 102 is transitioned to the extended position. Since this blade (126) needs to be rigid to support those portions of the blade assembly 102 and the flexible display 104, it is not able to bend around the flexible portions of the blade substrate (125) of the blade assembly 102. To prevent gaps or steps from occurring where the blade (126) terminates, in one or more embodiments a low-friction dynamic bending laminate stack (128) spans the remainder of the blade assembly 102 and abuts the transition surfaces defined by the single device housing.

In one or more embodiments, the blade (126) comprises a layer of steel. In one or more embodiments, the blade (126) has a thickness that is greater than the thickness of either the blade substrate (125) of the blade assembly 102 or the flexible substrate (805) of the flexible display 104. Illustrating by example, in one or more embodiments the blade (126) comprises a layer of steel having a thickness of five hundred microns or 0.5 mils.

In one or more embodiments, the blade (126) comprises a rigid, substantially planar support layer. Illustrating by example, the blade (126) can be manufactured from aluminum, steel, or stainless steel in one or more embodiments. In another embodiment, the blade (126) is manufactured from a rigid thermoplastic sheet. Other materials can be used in manufacturing the blade substrate (125) as well. For example, nitinol can be used to manufacture the blade (126) as well.

In one or more embodiments, the blade (126) is the stiffest layer of the overall assembly. In one or more embodiments the blade (126) is manufactured from stainless steel with a thickness of about five hundred microns. In another embodiment, the blade (126) is manufactured from carbon fiber. Other materials from which the blade (126) can be manufactured will be obvious to those of ordinary skill in the art having the benefit of this disclosure.

In one or more embodiments, the low-friction dynamic bending laminate stack (128) comprises a plurality of layers. When assembled, the low-friction dynamic bending laminate stack (128) adds a layer to the blade assembly 102 that improves the lubricity of the overall assembly to allow for smooth motion of the blade assembly 102 and flexible display 104 across the translation surfaces of a device housing. Moreover, when abutting a blade (126), the low-friction dynamic bending laminate stack (128) prevents features on other layers of the assembly from degrading the ability of the blade assembly 102 and flexible display 104 to translate across those translation surfaces.

In one or more embodiments, the low-friction dynamic bending laminate stack (128) allows for "low-friction" sliding across a stationary surface combined with the ability to cyclically bend and/or roll around a rotor. In one or more embodiments, the low-friction dynamic bending laminate stack (128) interfaces and abuts the blade (126) to improve lubricity.

In one or more embodiments, the uppermost layer of the low-friction dynamic bending laminate stack (128) is a pressure sensitive adhesive layer. This pressure sensitive adhesive layer allows the low-friction dynamic bending laminate stack (128) to adhere to the underside of the blade assembly 102.

Beneath this pressure sensitive adhesive layer is a strain tolerant foam layer in one or more embodiments. Examples of strain tolerant foams suitable for use as the strain tolerant foam layer include silicone, low-density polyethylene, or other materials that provide sufficient thickness so as to allow the low-friction dynamic bending laminate stack (128) to match the thickness of the blade (126) while reducing internal stresses and allowing bending.

Beneath the strain tolerant foam layer is another pressure sensitive adhesive layer in one or more embodiments. This pressure sensitive adhesive layer couples a flexible substrate having a strain relief cutout pattern formed therein. The flexible substrate can be manufactured from metal or plastic or other materials. Illustrating by example, in one or more embodiments the flexible substrate comprises a steel layer with a thickness of about thirty microns. While thin, flexible steel works well in practice, it will be obvious to those of ordinary skill in the art having the benefit of this disclosure that other materials can be used for the flexible substrate as well. For instance, in another embodiment the flexible substrate is manufactured from a thin layer of thermoplastic material.

Another layer of pressure sensitive adhesive then couples the flexible substrate to a low-friction layer in one or more embodiments. In one or more embodiments, the low-friction layer comprises a substrate with Teflon.sup.™ attached thereto. In another embodiment, the low-friction layer comprises a layer of polytetrafluoroethylene, which is a synthetic fluoropolymer of tetrafluoroethylene. This material is best known for its non-stick properties and adds a lubricity to the low-friction dynamic bending laminate stack (128) that allows the overall assembly to slide smoothly. Moreover, the low-friction layer prevents the strain relief cutout pattern in the flexible substrate from snagging on surface imperfections and transitions on the device housing to which the assembly is attached. In short, the low-friction layer greatly improves the lubricity of the overall assembly.

FIGS. 15-20 illustrate the electronic device 100 of FIG. 1 as fully assembled in both the extended position 200 and retracted position 300. Embodiments of the disclosure contemplate that in addition to having distinctly unique utilitarian features, electronic devices configured in accordance with embodiments of the disclosure have distinctly unique ornamental features as well. Many of these ornamental features are visible in FIGS. 15-20.

FIG. 15 illustrates a front elevation view of the electronic device 100 in the extended position 200, while FIG. 16 illustrates a side elevation view of the electronic device 100 in the extended position 200. FIG. 17 then provides a rear elevation view of the electronic device 100 in the extended position 200 as well.

FIG. 18 illustrates a front elevation view of the electronic device 100 in the retracted position 300, while FIG. 19 illustrates a side elevation view of the electronic device 100 in the retracted position 300. FIG. 20 then provides a rear elevation view of the electronic device 100 in the retracted position 300.

As can be seen by comparing these figures, the blade assembly 102 is able to slide around the single device housing 101 such that the blade 126 slides away from the single device housing 101 to change the apparent overall length of the flexible display 104 as viewed from the front of the electronic device 100. The blade assembly 102 can also slide in an opposite direction around the single device housing 101 to the retracted position 300, where similar amounts of the flexible display 104 are visible on the front side of the electronic device 100 and the rear side of the electronic device 100. Graphics, images, user actuation targets, and other indicia can be presented anywhere on the flexible display 104, including on the front side of the electronic device 100, the rear side of the electronic device 100, or the lower end of the electronic device 100.

Figure 22:
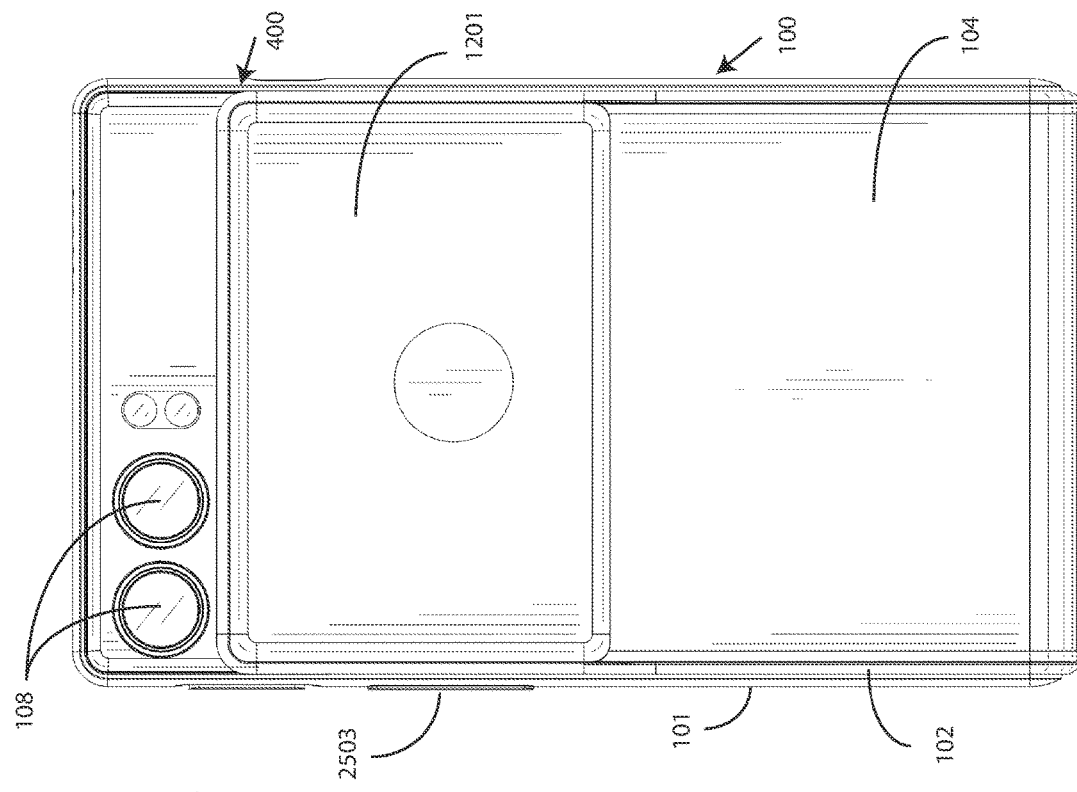
FIG. 22 illustrates a rear elevation view of one explanatory electronic device in accordance with one or more embodiments of the disclosure with the blade assembly in a peek position revealing a front facing image capture device.
Figure 21:
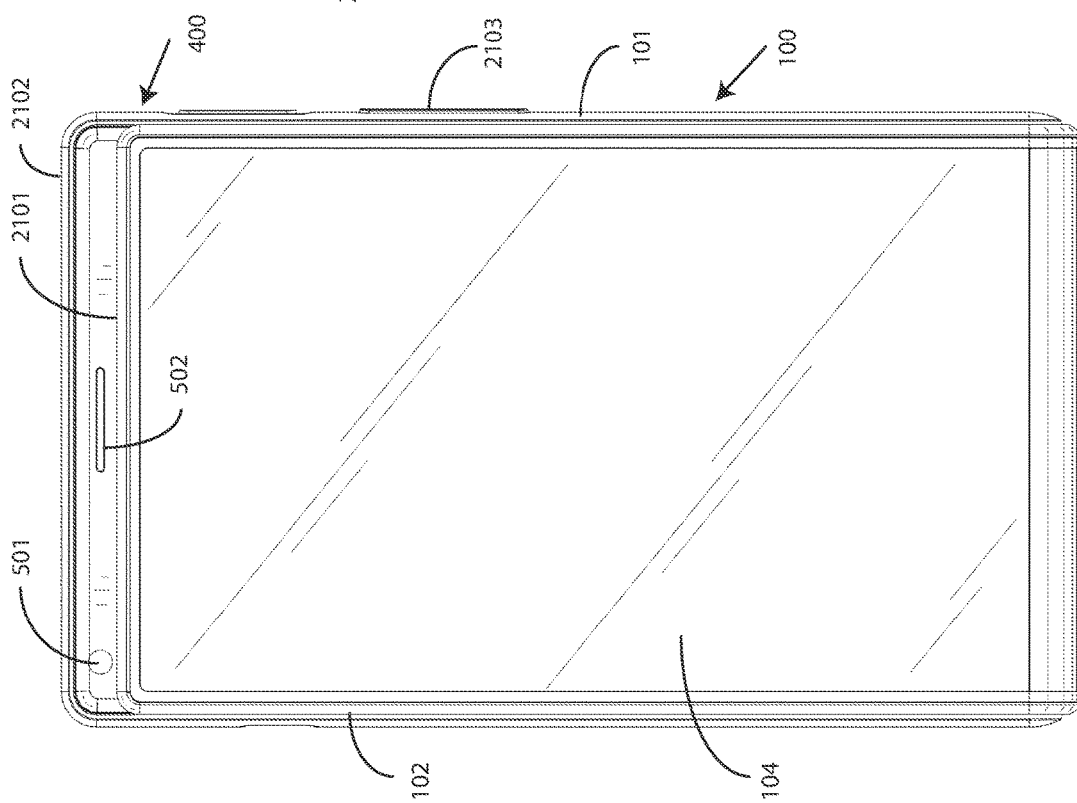
FIG. 21 illustrates a front elevation view of one explanatory electronic device in accordance with one or more embodiments of the disclosure with the blade assembly in a peek position revealing a front facing image capture device.

While much attention to this point has been paid to the unique translation of the blade assembly and flexible display between the extended position and the retracted position, one of the other truly unique features offered by embodiments of the disclosure occur when the blade assembly and flexible display transition to the peek position. Turning now to FIGS. 21-22, illustrated therein is the electronic device 100 in this peek position 400.

As shown in FIG. 21, in one or more embodiments when the blade assembly 102 and flexible display 104 transition to the peek position 500, the backpack 1201 moves toward beyond the retracted position (300) toward the rear-facing image capture devices 108. When this occurs, an upper edge 2101 of the blade assembly 102 moves below an upper edge 2102 of the single device housing 101. In one or more embodiments, this reveals a front-facing image capture device 501 or imager that situates beneath the blade assembly 102 when the blade assembly 102 is in the retracted position (300).

In one or more embodiments, the translation of the blade assembly 102 and flexible display 104 to the peek position 500 occurs automatically. Illustrating by example, in one or more embodiments when the front-facing image capture device 501 is actuated, the one or more processors (114) of the electronic device 100 cause the blade assembly 102 to translate to the peek position 500, thereby revealing this image capture device 501. (In the explanatory embodiment of FIGS. 21-22, a loudspeaker 502 is also revealed.) Once image capture operations utilizing the image capture device 501 are complete, the one or more processors (114) can cause the blade assembly 102 to transition back to the retracted position, which again covers and occludes the image capture device 501.

In other embodiments, the transition to the peek position 500 is manually initiated through actuation of a button or other user interface control. Illustrating by example, a single press of the button 2103 might cause the blade assembly 102 to transition to the extended position (200), while a double press of the button 2103 causes the blade assembly 102 to return to the retracted position (300). A long press of the button 2103 may cause the blade assembly 102 to transition to the peek position 500 of FIG. 5, and so forth. Other button operation schema will be obvious to those of ordinary skill in the art having the benefit of this disclosure. In other embodiments, delivery of user input to the flexible display 104 in the form of a swipe gesture can be used to cause the transition to the peek position 500 as well.

By positioning the front-facing image capture device 501 beneath the blade assembly 102 and its corresponding opaque blade (126) when in normal operation, embodiments of the disclosure provide a privacy guarantee to users of the electronic device 100. Said differently, by positioning the image capture device 501 beneath the blade assembly 102 and the flexible display 104 when these components are in either the retracted position (300) or the extended position (200), a user of the electronic device 100 is mechanically assured of privacy due to the fact that it is physically impossible for the image capture device 501 to perform image capture operations through the blade (126) of the blade assembly 102.

Accordingly, even if the electronic device 100 is accessed by a hacker or other nefarious actor, the user can be assured that the image capture device 501 cannot capture images or videos while the blade assembly 102 and flexible display 104 are in the retracted position (300), the extended position (200), or in positions therebetween. Only when the blade assembly 102 and the flexible display 104 transition to the peek position 500, thereby revealing the image capture device 501, can the image capture device 501 capture front-facing images or front-facing videos.

Now that various hardware components have been described, attention will be turned to methods of using electronic devices in accordance with one or more embodiments of the disclosure, operating steps performed by electronic devices in accordance with one or more embodiments of the disclosure, and advantages, features, and benefits provided by electronic devices configured in accordance with embodiments of the disclosure. Attention will now be turned to methods for using the electronic devices described above, and more particularly, to automatic movement of the flexible display 104 and blade assembly 102 in response imager invocation request and device orientation in accordance with one or more embodiments of the disclosure.

Figure 23:
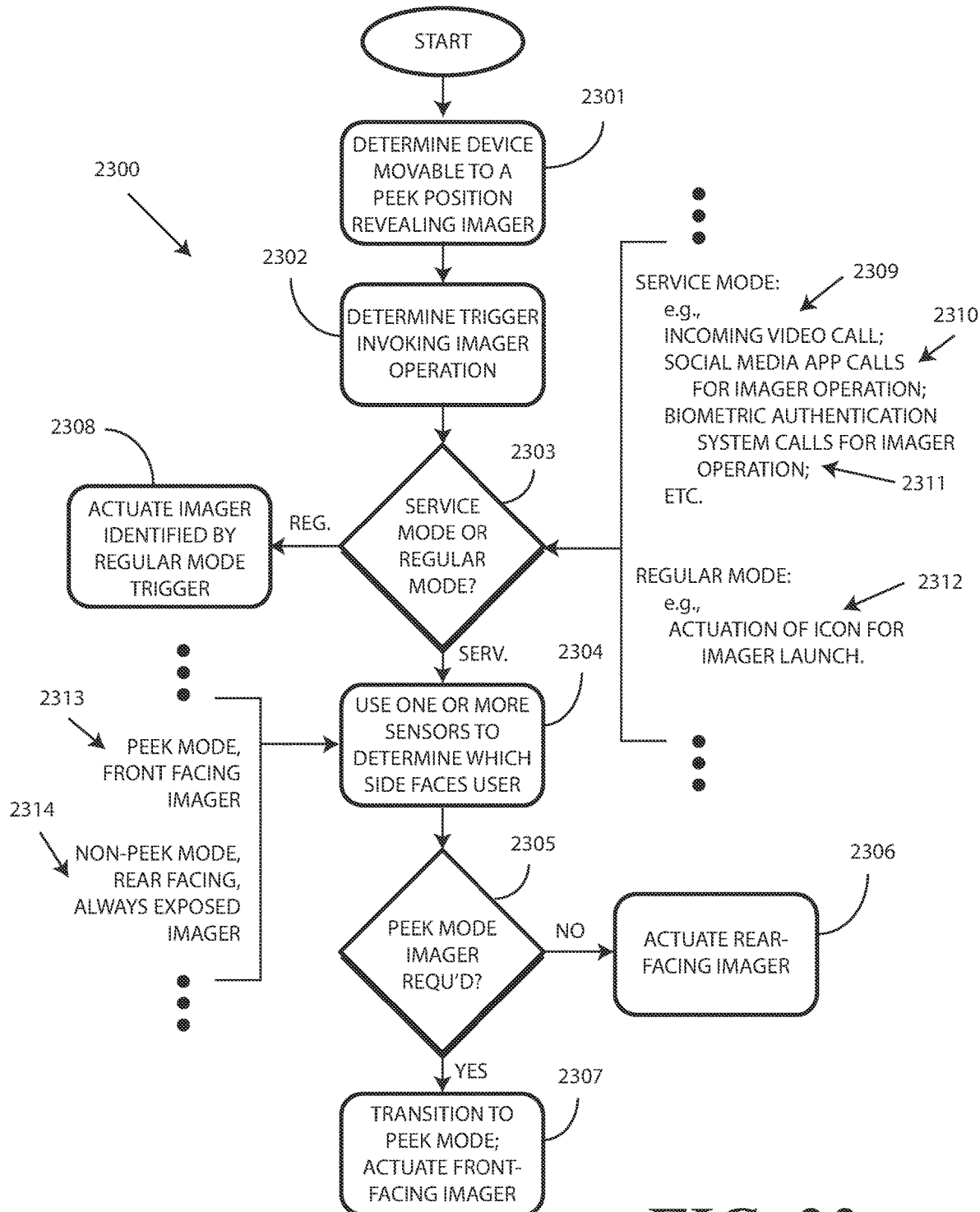
FIG. 23 illustrates one explanatory method in accordance with one or more embodiments of the disclosure.

Turning now to FIG. 23, illustrated therein is one explanatory method 2300 in accordance with one or more embodiments of the disclosure. The method 2300 of FIG. 23 is intended for use in an electronic device having a device housing, a blade assembly carrying a blade and a flexible display, with the blade assembly being slidably coupled to the device housing, a translation mechanism operable to slide the blade assembly relative to the device housing between at least an extended position, a retracted position, and a peek position, and one or more processors operable with the translation mechanism.

At step 2301, the method 2300 determines that an electronic device has an image capture device hidden beneath a blade assembly carrying a blade that is slidably coupled to a device housing and operable to slidably transition between an extended position where the blade extends beyond an edge of the device housing, a retracted position where a major surface of the blade abuts a major surface of the device housing, and a peek position in which the blade reveals a front-facing imager. At step 2302, the method 2300 determines a trigger causing an image capture device to be invoked.

Decision 2303 determines whether the image capture device invocation is a regular invocation or a service mode invocation. Examples of service mode invocation include instances when a videoconferencing application receives an incoming video call 2309, a social media application calls for imager operation 2310, or a biometric authentication system calls for image operation 2311. Other service mode invocations will be obvious to those of ordinary skill in the art having the benefit of this disclosure.

If the image capture device invocation is a regular invocation, e.g., the user-initiated actuation 2312 of an image capture device, embodiments of the disclosure presume that the user is aware of which major surface of the device housing of the electronic device is oriented toward the subject of the image capture operation. Accordingly, step 2308 actuates the image capture device identified in the regular invocation.

By contrast, if the image capture device invocation is a service mode invocation, step 2304 uses one or more sensors of the electronic device to determine whether a front-facing imager of the electronic device is oriented toward a user of the electronic device. This occurs because, assuming the electronic device (100) of FIG. 1 is being employed with the method 2300 of FIG. 23, there are two basic operating modes for the front-facing imager. The first is when the blade assembly is in the peek position with the front-facing imager exposed 2313. The other is when the blade assembly is in any other position, be it the retracted position, the extended position, or positions between the extended position and retracted position where the rear-facing imager is exposed 2314 but the front-facing imager is concealed.

Figure 24:
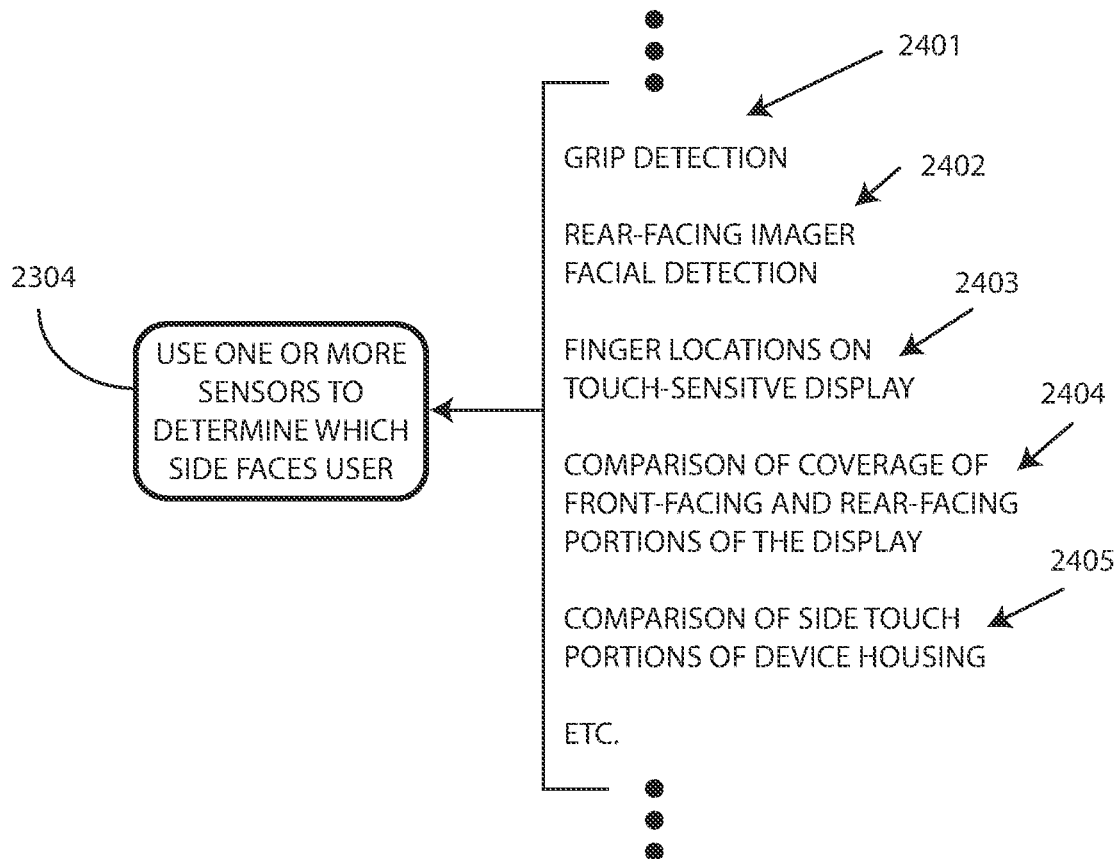
FIG. 24 illustrates one or more method steps in accordance with one or more embodiments of the disclosure.

Step 2304 can occur in a variety of ways. Turning briefly to FIG. 24, illustrated therein are some of the techniques, many of which will be described in more detail below with reference to FIGS. 25-28. Illustrating by example, grip detection 2401 can be used to determine how a user is holding the electronic device. If the user is a right-handed user, and if grip sensors determine that the thumb of the user is on the right side of the device, with the fingers on the left, this can be an indication that the user is holding the electronic device in their right hand with the front-facing portion of the flexible display facing the user, for instance.

Facial detection 2402 using the rear-facing imager can be used to determine which side of the electronic device the user is facing as well. If, for example, the rear-facing imager, which is always exposed regardless of blade assembly position, captures an image depicting the face of the user, it becomes clear that the user is facing the rear side of the electronic device. By contrast, if the rear-facing imager captures an image and the user is depicted nowhere in the image, there is a high probability that the user is facing the front side of the electronic device, and so forth.

Finger touch locations 2403 can be used to determine how a user is holding the electronic device. One example of this will be described below with reference to FIG. 26. A comparison 2405 of side touching portions can also be used, as will be described below with reference to FIG. 27.

A comparison of coverage 2404 of the front-facing portions and rear-facing portions of the flexible display can be used to determine which side of the electronic device is facing the user as well. If, for example, the rear-facing surface of the flexible display is substantially covered, and the front-facing portion of the flexible display is substantially uncovered, this can be a sign that the user's palm is wrapped around the electronic device supporting the rear surface. This can be an indication that the user is indeed facing the front-facing portion of the flexible display.

The list of techniques used to determine whether the user is facing the front side of the electronic device or the rear side of the electronic device shown in FIG. 24 is illustrative only. Other techniques will be described below with reference to FIGS. 25-28. Still others will be obvious to those of ordinary skill in the art having the benefit of this disclosure.

Turning now back to FIG. 23, in contrast to a user needing to manually select whether the display is transitioned peek position, such as by making a "long press" of a button to cause the translating display to transition to the peek position, the method 2300 advantageously automatically and pre-emptively moves the translating display to the optimal state based upon one or more sensed triggers detected at step 2302. Decision 2305 then determines whether the peek position is required. In one or more embodiments, this decision 2305 determines that the peek position is required when an application operating on one or more processors of the electronic device invokes an image capture operation and the one or more sensors of the electronic device determine that the front-facing imager of the electronic device is oriented toward the user of the electronic device.

If decision 2305 determines from the service mode invocation of the imager and the device orientation that the peek position is required, the one or more processors cause the translation mechanism to transition the blade assembly to the peek position at step 2307. In one or more embodiments, step 2307 further comprises actuating the front-facing imager.

By contrast, if decision 2305 determines that the service mode invocation of the imager and the device orientation that usage of the rear-facing imager is required, step 2306 comprises actuating the rear-facing imager. As noted above, in one or more embodiments the rear-facing imager is always exposed regardless of whether the blade assembly is in the retracted position, the extended position, or the peek position. Accordingly, in one or more embodiments step 2306 further comprises precluding transition of the blade assembly around the device housing since no transition walled interface required to actuate the rear-facing imager.

In other embodiments, step 2306 can comprise translating the blade assembly toward the extended position in addition to actuating the rear-facing imager. Illustrating by example, in one or more embodiments one or more processors of the electronic device can transition, at step 2306, the translating display to the extended position when one or more sensors of the electronic device detect, at step 2304, the orientation of the electronic device transitioning to the landscape orientation while a forefront application operating on the one or more processors enters a full-screen, immersive mode while capturing images with an image capture device.

In other embodiments, the one or more processors may cause, at step 2306, the translating display to transition to the extended position when a user opens an input method editor to, for example, create content such as writing a social media post comprising an image captured by the rear-facing imager.

Similarly, when decision 2305 determines that the operating condition would benefit from the peek position, such as when the user desires to accept an incoming video call 2309 using a videoconferencing application, the one or more processors of the electronic device can, at step 2307, cause the blade assembly and flexible display to transition to the peek position. Illustrating by example, if an imager invocation request is received from an application, as detected at step 2302, step 2307 can comprise one or more processors of the electronic device automatically transitioning the blade assembly and flexible display to the peek position, and so forth.

Figure 28:
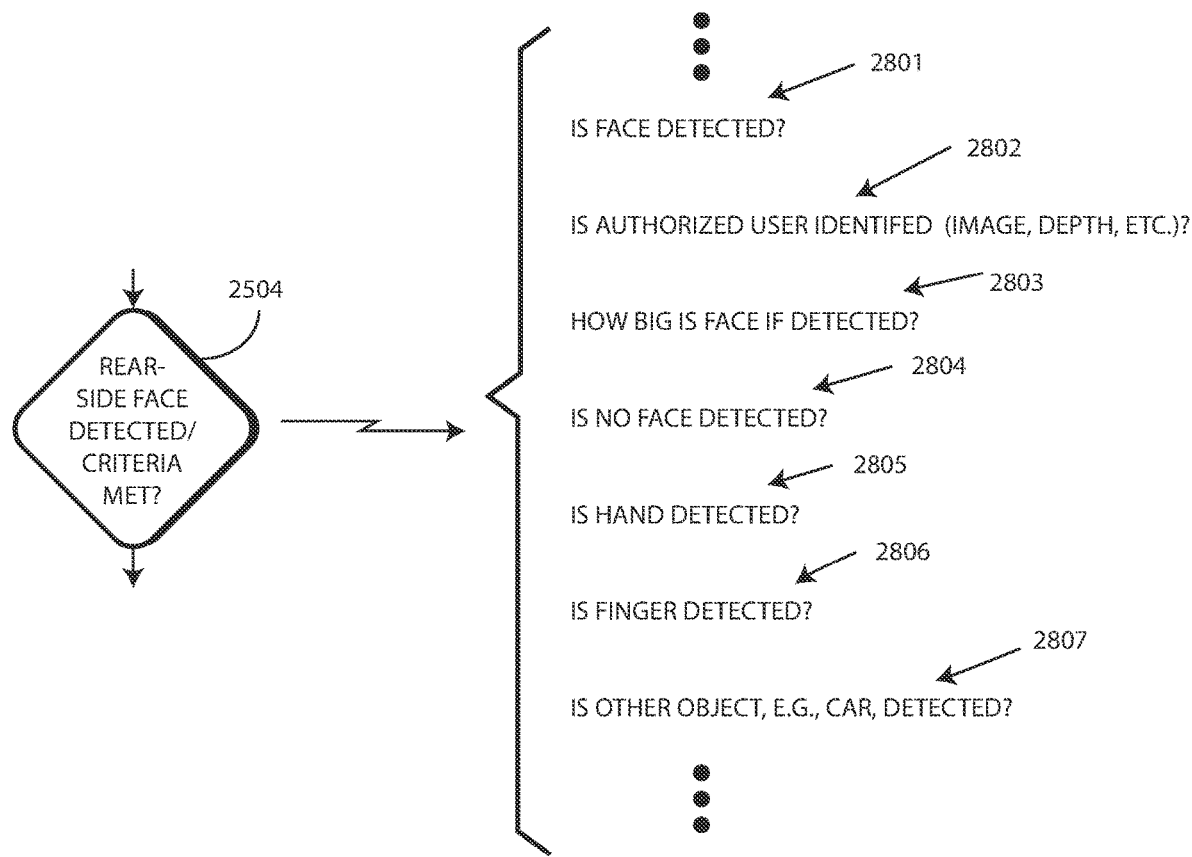
FIG. 28 illustrates one or more method steps in accordance with one or more embodiments of the disclosure.

Turning now to FIG. 28, illustrated therein are some operating conditions that would, as determined by decision 2504, benefit from either the peek position or the extended position. Beginning with the extended position, in one or more embodiments when one or more sensors detect a predefined criterion 2801 where the electronic device is oriented in landscape mode while an application operating on the one or more processors of the electronic device is entering a full-screen, immersive mode, decision 2504 will determine that the electronic device can benefit from being in the extended position.

While FIG. 23 illustrates several explanatory service mode invocations that would benefit from usage of the front-facing imager, embodiments of the disclosure are not so limited. With specific reference to the peek position, in one or more embodiments when one or more sensors detect a condition where an earpiece speaker is required, decision 2305 will determine that the electronic device can benefit from being in the peek position as well. If a condition exists where another component positioned under the blade assembly is required when the blade assembly is in the retracted position, decision 2305 will determine that the electronic device can benefit from being in the peek position as well.

These conditions are examples only, as others will be obvious to those of ordinary skill in the art having the benefit of this disclosure.

Figure 25:
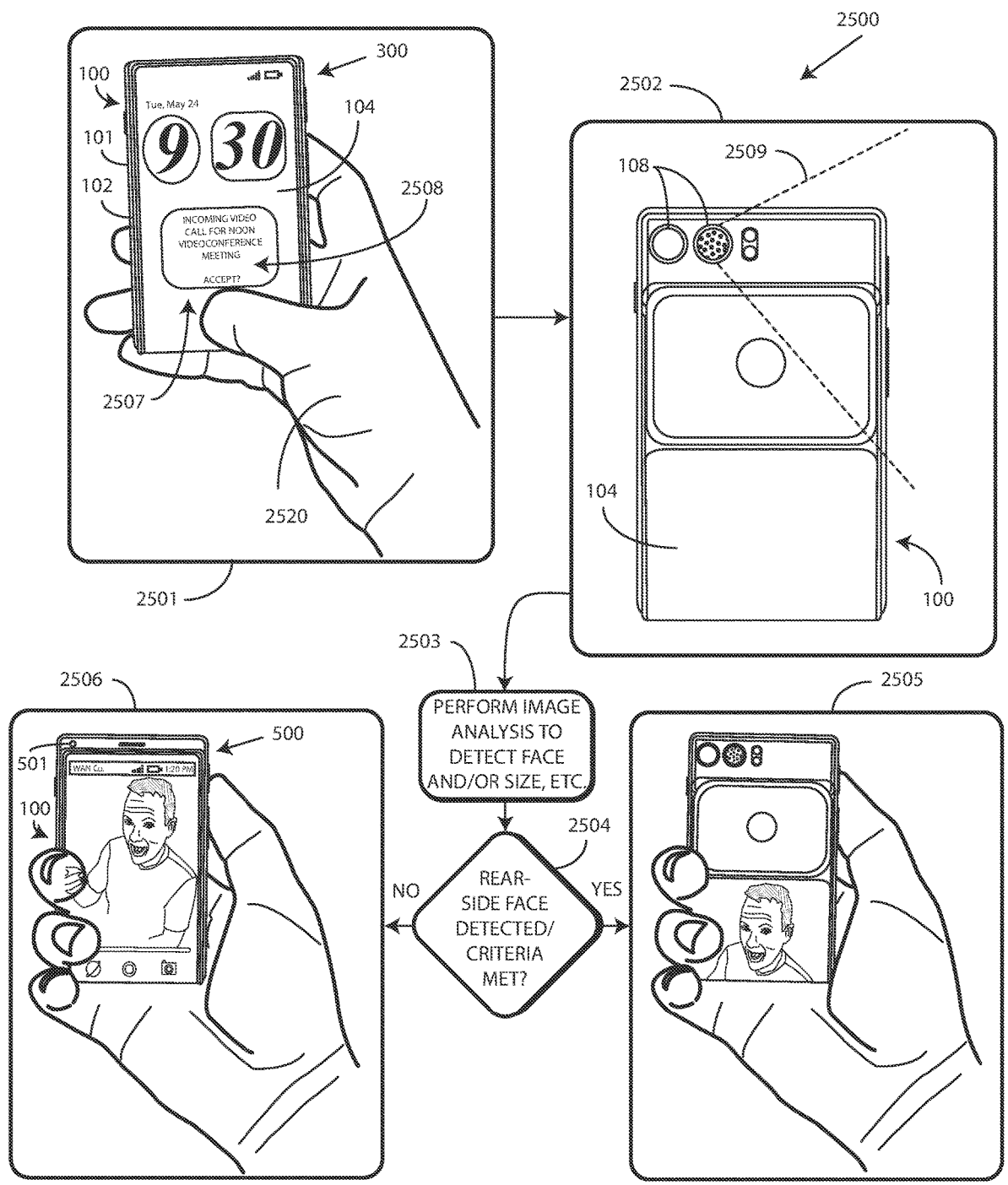
FIG. 25 illustrates another explanatory method in accordance with one or more embodiments of the disclosure.

Now that the general method is understood, attention will be turned to more specific method examples that more particularly illustrate and describe the many, many benefits offered by embodiments of the disclosure. Turning first to FIG. 25, illustrated therein is one explanatory method 2500 for using the electronic device 100 of FIG. 1 to quickly, easily, and simply ensure that the blade assembly 102 transitions to the peek position when a front-facing imager 501 is required. The method 2500 of FIG. 25 illustrates one explanatory electronic device 100 executing or more explanatory operating steps in accordance with one or more embodiments of the disclosure. Other methods will be described thereafter with reference to FIGS. 26-28.

Beginning at step 2501, a user 2520 is holding an electronic device 100 as described above with reference to FIG. 1. In one or more embodiments, the electronic device 100 includes a device housing 101, a front-facing imager 501 (shown at step 2506), one or more sensors (120,121), and one or more processors (114). The electronic device 100 also includes a blade assembly 102 carrying a blade (126). The blade assembly 102 is slidably coupled to the device housing and operable to slidably transition between the retracted position 300 of step 2501, the extended position (200) shown above in FIG. 2, and the peek position 500 shown at step 2506. In one or more embodiments, the extended position (200) occurs when the blade (126) extends beyond an edge of the device housing 101. The retracted position 300 occurs where a major surface of the blade abuts a major surface of the device housing 101. As shown at step 2506, the peek position 500 reveals the front-facing imager 501.

At step 2501, a videoconferencing application 2507 is operating on one or more processors (114) of the electronic device 100. As shown at step 2501, the videoconferencing application 2507 is invoking a service mode invocation 2508 of an imager by prompting the user 2520 regarding whether they want to accept an incoming video call (2309) This is a service mode invocation 2508 because it will be necessary of an image capture device to capture images of the user 2520 if the user 2520 wants to engage in the video call (2309). As shown at step 2501, the user 2520 confirms the service mode invocation 2508 by interacting with the prompt to accept the video call (2309).

In accordance with automatic embodiments of the disclosure, one or more sensors (120,121) of the electronic device 100 must now determine whether to invoke the front-facing imager 501 or the rear-facing imager 108. As shown at step 2502, the electronic device 100 also includes at least one rear-facing imager 108. As previously described, the rear-facing imager 108 is exposed regardless of whether the blade assembly 102 is in the retracted position 300, the extended position (200), or the peek position 500.

As noted above, the one or more sensors (120,121) of the electronic device 100 can determine whether the front-facing imager 501 is oriented toward the user in a variety of ways. These include grip detection, touch detection, display coverage, and image analysis, as described above with reference to FIG. 24. It is important to note that these techniques can be used in any combination. For simplicity, the method 2500 of FIG. 25 uses image analysis.

Specifically, at step 2502 the one or more processors (114) of the electronic device cause the rear-facing imager 108 to capture at least one image 2509 in response to the videoconferencing application 2507 operating on the one or more processors (114) invoking the image capture operation.

Once the at least one image 2509 has been captured, the one or more processors (114) perform image analysis on the image at step 2503. Decision 2504 then determines whether the at least one image 2509 fails to match a predefined criterion. If the at least one image 2509 fails to match the predefined criterion, as determined at decision 2504, in one or more embodiments this means the front-facing imager 501 is oriented toward the user 2520. Accordingly, as shown at step 2506, the one or more processors (114) of the electronic device 100 cause the blade assembly 102 to automatically transition to the peek position 500 to reveal the front-facing imager 501. The front-facing imager 501 can then capture images of the user 2520 for use in the video call (2309). Otherwise, the one or more processors (114) can cause the rear-facing imager 108 to capture the images of the user 2520 for the video call (2309) at step 2505.

In one or more embodiments, the predefined criterion comprises the at least one image 2509 depicting the user 2520 looking at the rear-facing imager 108. Where this is the case, as determined at decision 2504, the method 2500 moves to step 2505 where the rear-facing imager 108 can capture the images of the user 2520 for the video call (2309).

In one or more embodiments, step 2503 determines if a face with an associated close distance is depicted in the at least one image 2509. If so, the one or more processors (114) cause the rear-facing imager 108 to capture the images of the user 2520 for the video call (2309) at step 2505. By contrast, if the one or more processors (114) fail to detect a face depicted in the at least one image 2509 at step 2503, the one or more processors (114) cause the blade assembly 102 to move to the peek position 500 at step 2506, revealing the front-facing imager 501, and allowing the front-facing imager 501 to capture images of the user 2520 for the video call (2309).

Step 2506 can even confirm that the user 2520 is indeed facing the front surface of the electronic device 100. Illustrating by example, the one or more processors (114) can cause the front-facing imager 501 to capture at least one image. If the image captured by the front-facing imager 501 positioned on the front major surface of the electronic device 100 depicts a face of the user 2520, in one or more embodiments the one or more processors (114) confirm the peek position 500 is indeed required.

The one or more processors (114) can determine whether the user 2520 is looking at the front side of the electronic device 100 shown at step 2501 or the rear side of the electronic device 100 shown at step 2502 in other ways as well. Illustrating by example, if the at least one image 2509 captured at step 2502 depicts only inanimate objects such as a street or faraway cars are depicted in the image, as determined at step 2503, in one or more embodiments the one or more processors (114) conclude the user 2520 is looking at the front side of the electronic device 100 and transition the blade assembly 102 to the peek position 500 at step 2506. Similarly, if only a hand—rather than a face—is depicted in the at least one image 2509 captured at step 2502, the one or more processors (114) conclude the user 2520 is looking at the front side of the electronic device 100 and transition the blade assembly 102 to the peek position 500 at step 2506.

Embodiments of the disclosure contemplate that if a face is depicted in the at least one image 2509 captured at step 2502, the size of the face detected can also important. Illustrating by example, in one or more embodiments the one or more processors (114) can perform image analysis on the at least one image 2509 at step 2503, and in particular the size of the face depicted in the at least one image 2509, to determine whether that face is reasonably attached to a torso within a predefined distance, such as an average arm's reach, of the electronic device 100. Such a mechanism prevents a person who just happens to be situated in a field of view of the rear-facing imager 108 from being confused with the authorized user of the electronic device 100.

In one or more embodiments, a default mode of the one or more processors (114), which is editable using a menu and user settings, causes the blade assembly 102 to transition to the peek position 500 at step 2506 when no predefined event is detected. Illustrating by example, when authenticating the user 2520 as the authorized user of the electronic device, in one or more embodiments the one or more processors (114) of the electronic device 100 cause the rear-facing imager 108 to capture at least one image 2509 at step 2502. After performing image analysis on the at least one image 2509 at step 2503, when the one or more processors (114) detect a face being depicted in the image, the one or more processors (114) use the rear-facing imager 108 for authentication at step 2505. By contrast, where no face is detected as being depicted in the image, the one or more processors (114) conclude the user 2520 is looking at the front side of the electronic device 100 and transition the blade assembly 102 to the peek position 500 at step 2506 so that the front-facing imager 501 can be used for authentication.

This can be used to transition the electronic device 100 from a locked to an unlocked state in response to a service mode invocation of an image capture device. To illustrate this in further detail, in one or more embodiments step 2501 shows the flexible display 104 with a front-facing portion positioned on a first major surface of the device housing 101 of the electronic device 100. As shown at step 2502, the flexible display 104 also includes a rear-facing portion positioned on a second major surface of the electronic device 100. Additionally, a rear-facing imager 108 is positioned on the second major surface of the electronic device 100.

Presume that the user 2520, at step 2501, is interacting with the videoconferencing application 2507 while the electronic device 100 is in a locked state. To transition to the unlocked state, the user 2520 needs to use an authentication device to authenticate themself as an authorized user of the electronic device. Presume that the user 2520 is initiating the authentication procedure by delivering fingerprint data to a fingerprint sensor positioned beneath front-facing portion of the flexible display 104.

At step 2502, in response to the one or more processors (114) identifying the predefined event of the user 2520 delivering authentication input, the one or more processors (114) cause the rear-facing imager 108 to capture at least one image 2509. At step 2503, the one or more processors (114) of the electronic device 100 perform an image analysis operation upon the at least one image 2509. Decision 2504 then determines whether the at least one image 2509 matches a predefined criterion. When the at least one image 2509 matches a first predefined criterion, as determined at decision 2504, the one or more processors (114) of the electronic device 100 use the rear-facing imager 108 for the video call (2309) and cause a presentation of content to occur on the rear-facing portion of the electronic device 100 at step 2505. By contrast, when the at least one image 2509 matches a second predefined criterion, as determined at decision 2504, the one or more (114) of the electronic device 100 transition the blade assembly 102 to the peek position 500 and use the front-facing imager 501 to capture images in the video call (2309) while causing the presentation of the content to occur on front-facing portions of the flexible display 104.

The predefined criterion that the at least one image 2509 must meet can vary. Turning briefly to FIG. 28, illustrated therein are a few example criteria suitable for determination at decision 2504. The criteria set forth in FIG. 28 can be used for the first predefined criterion or the second predefined criterion. Moreover, the example criteria shown in FIG. 28 are illustrative only and are not intended to form an inclusive list. Numerous other criteria suitable for determination at decision 2504 will be obvious to those of ordinary skill in the art having the benefit of this disclosure.

In one or more embodiments, the predefined criterion 2801 comprises whether a face is depicted in the at least one image (2509). In one or more embodiments, when a face is depicted in the at least one image (2509), the one or more processors (114) of the electronic device 100 use the rear-facing imager (108) in response to service mode invocations of an image capture device. By contrast, when there is no face depicted in the at least one image (2509), in one or more embodiments the one or more processors (114) of the electronic device cause the blade assembly (102) to transition to the peek position (500), using the front-facing imager (501) for service mode invocations of an image capture device.

In another embodiment, the predefined criterion 2802 comprises whether the at least one image (2509) depicts an authorized user of the electronic device (100) looking at the rear major surface of the electronic device (100). In one or more embodiments, when the at least one image (2509) depict an authorized user looking at the rear major surface of the electronic device (100), the one or more processors (114) of the electronic device (100) use the rear-facing imager (108) in response to service mode invocations of an image capture device. By contrast, when the at least one image (2509) fails to depict the authorized user looking at the rear major surface, in one or more embodiments the one or more processors (114) of the electronic device (100) cause the blade assembly (102) to transition to the peek position (500), using the front-facing imager (501) for service mode invocations of an image capture device.

In another embodiment, the predefined criterion 2803 comprises the at least one image (2509) depicting a face having a size exceeding a predefined image area threshold. Embodiments of the disclosure contemplate that when the at least one image (2509) depicts a face, the size of the face can be important. Faces far away are likely not users using the electronic device (100). By contrast, faces filling the frame of the at least one image (2509) are likely users using the electronic device (100).

Thus, in one or more embodiments the predefined criterion 2803 comprises the depicted face exceeding a predefined image area threshold. This predefined image area threshold will vary as a function of field of view of the rear-facing imager (108), but in one or more embodiments the predefined image area threshold is at least twenty-five percent of the image. Thus, in one or more embodiments, when the at least one image (2509) depicts a face having a size exceeding a predefined image area threshold, the one or more processors (114) of the electronic device 100 use the rear-facing imager (108) in response to service mode invocations of an image capture device. By contrast, when the at least one image (2509) fails to depict a face having a size exceeding the predefined image area threshold, in one or more embodiments the one or more processors (114) of the electronic device 100 cause the blade assembly (102) to transition to the peek position (500), using the front-facing imager (501) for service mode invocations of an image capture device.

In still another embodiment, the predefined criterion 2804 comprises whether the at least one image (2509) fails to depict a face, optionally within a predefined distance from the electronic device (100). In one or more embodiments, when a face is depicted in the at least one image (2509), the one or more processors (114) of the electronic device 100 use the rear-facing imager (108) in response to service mode invocations of an image capture device. By contrast, when there is no face depicted in the at least one image (2509), in one or more embodiments the one or more processors (114) of the electronic device (100) cause the blade assembly (102) to transition to the peek position (500), using the front-facing imager (501) for service mode invocations of an image capture device.

In one or more embodiments, the predefined criterion 2805 comprises whether a hand is depicted in the at least one image (2509). In one or more embodiments, when a hand is depicted in the at least one image (2509), this is indicative of the imager being covered—or partially covered—by a user (2520) who is holding the electronic device (100) while looking at the other side of the flexible display (104), i.e., the front-facing portion of the flexible display (104). Accordingly, the one or more processors (114) of the electronic device 100 cause the blade assembly (102) to transition to the peek position (500), using the front-facing imager (501) for service mode invocations of an image capture device. By contrast, when there is no hand depicted in the at least one image (2509), in one or more embodiments the one or more processors (114) of the electronic device (100) use the rear-facing imager (108) in response to service mode invocations of an image capture device.

In one or more embodiments, the predefined criterion 2806 comprises whether a finger is depicted in the at least one image (2509). In one or more embodiments, when a finger is depicted in the at least one image (2509), this is indicative of the rear-facing imager (108) being covered—or partially covered—by a user (2520) who is holding the electronic device (100) while looking at the other side of the flexible display (104). Accordingly, the one or more processors (114) of the electronic device (100) cause the blade assembly (102) to transition to the peek position (500), using the front-facing imager (501) for service mode invocations of an image capture device. By contrast, when there is no finger depicted in the at least one image (2509), in one or more embodiments the one or more processors (114) of the electronic device (100) utilize the rear-facing imager (108) in response to service mode invocations of an image capture device.

In one or more embodiments, the predefined criterion 2807 comprises whether an inanimate object, such as a car, boat, street light, house, or other inanimate object, is depicted in the at least one image (2509). In one or more embodiments, when an inanimate object is depicted in the at least one image (2509), this is indicative of the rear-facing imager (108) being oriented away from a user (2520) who is holding the electronic device (100) while looking at the other side of the flexible display (104). Accordingly, the one or more processors (114) of the electronic device (100) cause the blade assembly (102) to transition to the peek position (500), using the front-facing imager (501) for service mode invocations of an image capture device. By contrast, when there is no inanimate object depicted in the at least one image (2509), in one or more embodiments the one or more processors (114) of the electronic device (100) use the rear-facing imager (108) in response to service mode invocations of an image capture device.

Turning now back to FIG. 25, in addition to determining whether the at least one image 2509 matches one or more criteria, decision 2504 can also determine whether one or more conditions are met when the at least one image 2509 is captured. In one or more embodiments, when decision 2504 determines that a first condition is met, the one or more processors (114) can cause the blade assembly 102 to transition to the peek position 500, using the front-facing imager 501 for service mode invocations of an image capture device, or alternatively use the rear-facing imager 108 for service mode invocations of an image capture device, depending upon whether the at least one image 2509 matches a first predefined criterion or a second predefined criterion. However, where decision 2504 determines that the first condition is not met, or alternatively that a second condition is met, the one or more processors (114) of the electronic device 100 can preclude usage of either the front-facing imager 501 or the rear-facing imager 108, even when an imager invocation request is received.

Accordingly, the method 2500 of FIG. 25 includes step 2501 where one or more processors (114) of the electronic device 100 detect an application operating on the one or more processors (114) requesting invocation of an imager for service mode use by the application. In this illustrative example, a videoconferencing application 2507 is requesting invocation of an image capture device for service mode use during a video call (2309).

One or more sensors (120,121) of the electronic device 100 then determine whether the front side of the electronic device 100, shown at step 2501, or the rear side of the electronic device 100, shown at step 2502, is facing the user 2520 of the electronic device 100. In this illustrative embodiment, the one or more sensors (120,121) of the electronic device 100 determine whether the front side of the device housing 101 of the electronic device 100 is facing the user 2520 of the electronic device 100 by causing the rear-facing imager 108 of the electronic device 100 to capture at least one image 2509 at step 2502.

One or more processors (114) of the electronic device 100 then perform image analysis on the at least one image 2509 at step 2503. In one or more embodiments, the one or more processors (114) determine at decision 2504 that the front side of the device housing 101 is facing the user 2520 of the electronic device when the at least one image 2509 depicts one or more of a finger, hand or inanimate object. By contrast, the one or more processors (114) can determine at decision 2504 that the rear side of the device housing 101 is facing the user 2520 of the electronic device 100 when the at least one image 2509 depicts the user 2520 of the electronic device 100.

When the latter occurs, the one or more processors (114) can cause a translation mechanism to translate the blade assembly 102 to the peek position 500 that reveals the front-facing imager 501 that is otherwise covered by the blade assembly 102 when in the retracted position 300 at step 2506. The one or more processors (114) can further actuate the front-facing imager 501 for the service mode use by the application after the blade assembly 102 is in the peek position 500 at step 2506 as well. By contrast, when the rear side of the device housing 101 is facing the user 2520 of the electronic device 100, step 2505 can comprise actuating the rear-facing imager 108 for the service mode use by the application. In one or more embodiments, step 2505 further comprises causing the translation mechanism to omit translation of the blade assembly 102 prior to actuating the rear-facing imager 108 since the rear-facing imager 108 is exposed regardless of where the blade assembly 102 is positioned.

Figure 26:
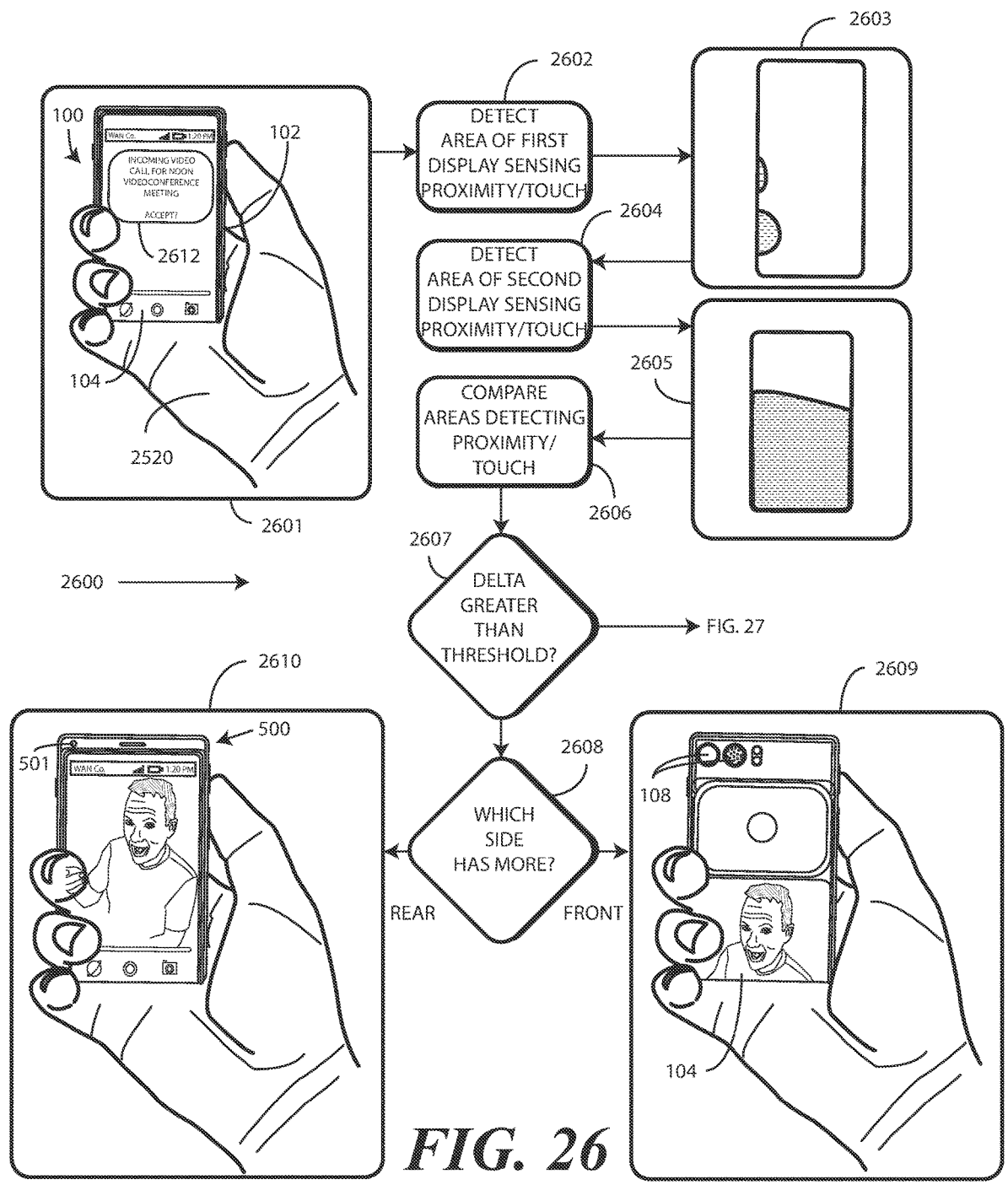
FIG. 26 illustrates still another explanatory method in accordance with one or more embodiments of the disclosure.

Turning now to FIG. 26, illustrated therein is another method 2600 configured in accordance with one or more embodiments of the disclosure. In the method 2600 of FIG. 26, the selection of whether to use the rear-facing imager 108 at step 2609 or to cause the blade assembly 102 to transition to the peek position 500, thereby revealing the front-facing imager 501 for use at step 2610, is made as a function of touch rather than whether a captured image matches a predefined condition. Embodiments of the disclosure contemplate that when a user 2520 is gripping the electronic device 100, their hand and/or fingers tend to cover more area along one major surface than another. Illustrating by example, at step 2601 the user 2520 is holding the electronic device 100 with the first major surface facing their face and the second major surface facing their palm.

Accordingly, in one or more embodiments the method 2600 of FIG. 26 measures a touch sensitive display portion receiving touch input from the user 2520. In one or more embodiments, the one or more processors (114) then select the rear-facing imager 108 or the front-facing imager 501 for use in response to a service mode invocation of an image capture device. Said differently, in one or more embodiments the one or more processors (114) cause the translation mechanism of the electronic device 100 to translate the blade assembly 102 to the peek position 500 of step 2610 when an imager invocation request is received from an application operating on the one or more processors (114) and the one or more processors (114) determine that the front-facing imager 501 is facing toward the user 2520.

As explained in more detail below, in one or more embodiments the method 2600 employs static touch to determine which image capture device will be used in response to the imager invocation request occurring at step 2601. This static touch is more continuous than momentary dynamic touch that occurs, for example, when a user 2520 is interacting with the flexible display 104. In one or more embodiments, the one or more processors (114) of the electronic device 100 employ an artificial intelligence engine to distinguish between static and dynamic touch.

Effectively, the method 2600 of FIG. 26 measures the total "back touch" area and compares it with total "front touch" area. If the back touch area is greater than the front touch area, in one or more embodiments the one or more processors (114) of the electronic device 100 transition the blade assembly 102 to the peek position 500 of step 2610 revealing the front-facing imager 501 and use the front-facing imager 501 in response to the imager invocation request. By contrast, if the back touch area is less than the front touch area, the one or more processors (114) use the rear-facing imager 108 at step 2609 in response to the imager invocation request.

In one or more embodiments, the method 2600 of FIG. 26 allows the touch sensors of the flexible display 104. Consider a cross sectional area of the electronic device 100. In a typical carry mode, one example of which is shown at step 2601, the user 2520 tends to touch less of the first major surface of the flexible display 104 (which is front-facing at step 2601) compared to the second major surface of the flexible display 104 (which is rear-facing at step 2609). The user 2520 does this so as not to block the view of the front-facing portion of the flexible display 104. The rear-facing portion of the flexible display 104 receives more contact because the hand connects the four fingers with the thumb, and the hand runs next to the rear-facing portion of the flexible display 104. The method 2600 of FIG. 26 advantageously utilizes an image capture device facing the user in response to an imager invocation request, rather than the image capture device facing the hand.

As shown at step 2601, a user 2520 is holding the electronic device 100 in their hand. As before, the electronic device 100 includes front-facing portion of the flexible display 104 positioned on the first major surface of the electronic device 100. In this example, the flexible display 104 comprises a touch sensor and is a touch sensitive display. As shown at step 2609, the electronic device 100 also includes a rear-facing portion of the flexible display 104 positioned on a second major surface of the electronic device 100.

As shown at step 2601, one or more processors (114) of the electronic device 100 are receiving an imager invocation request 2612 from an application operating on the one or more processors (114). In this explanatory example, the imager invocation request 2612 comprises a service mode invocation request since a videoconferencing application (2507) requesting usage of an image capture device for a video call (2309).

As shown at step 2601, the flexible display 104 is receiving user input. In this illustrative embodiment, the user input comprises touch input because the user 2520 is holding the electronic device 100 and touching portions of the flexible display 104. However, in other embodiments the user input can comprise proximity input, such as would occur when the user's fingers (or another object such as a stylus) were close enough to, but not touching, the flexible display 104. Such proximity input can be detected by imagers, the touch sensors of the flexible display 104, one or more proximity sensors, or by other sensors.

The user input could also comprise gesture input. Gesture input can comprise translating and/or rotating the electronic device 100 in three-dimensional space, or the electronic device 100 remaining stationary while the user 2520 moves their hand (or another object) nearby the electronic device 100. Such gesture input can be detected by imagers, the touch sensor of the first flexible display 2602, the one or more processors (114) of the electronic device 100 identify a first touch sensitive display portion of the front-facing portion of the flexible display 104 receiving the user input. For the illustrative embodiment of FIG. 26, the first touch sensitive display portion is shown at step 2603.

As also shown at step 2601, the rear-facing portion of the flexible display 104 is receiving a second user input. In this illustrative embodiment, as with the first user input the second user input comprises touch input. However, in other embodiments the second user input can comprise proximity input, gesture input, or other inputs. Imagers can detect such inputs, the touch sensor of the flexible display 104, one or more proximity sensors, or by other sensors.

At step 2604, the one or more processors (114) of the electronic device 100 identify a second touch sensitive display portion of the flexible display 104 along a rear-facing portion of the flexible display 104 receiving the second user input. For the illustrative embodiment of FIG. 26, the second touch sensitive display portion is shown at step 2605.

At step 2606, the one or more processors (114) of the electronic device 100 compare the sizes of the first touch sensitive display portion and the second touch sensitive display portion. In one or more embodiments, step 2606 comprises the one or more processors (114) comparing first touch sensitive display portion and the second touch sensitive display portion to determine which is greater. In another embodiment, step 2606 comprises the one or more processors (114) comparing the first touch sensitive display portion and the second touch sensitive display portion to determine whether the difference between the two exceeds a predefined threshold.

Embodiments of the disclosure contemplate that the first touch sensitive display portion can be greater than the second touch sensitive display portion, the first touch sensitive display portion can be less than the second touch sensitive display portion, or the first touch sensitive display portion and the second touch sensitive display portion can be roughly equal. In one or more embodiments, a predefined threshold, such as ten percent, is used to group the "about equal" determination to anything occurring when the first touch sensitive display portion and the second touch sensitive display portion are within ten percent of each other. In one or more embodiments, whether this occurs is determined at optional decision 2607. In one or more embodiments, if the first touch sensitive display portion and the second touch sensitive display portion are equal, or are within a predefined threshold, as determined at decision 2607, the method 2600 transitions to the method (2700) of FIG. 27 below. By contrast, where the first touch sensitive display portion and the second touch sensitive display portion, or have a difference exceeding the predefined threshold, the method 2600 moves to decision 2607.

Decision 2607 determines which of the first touch sensitive display portion or the second touch sensitive display portion is greater. In one or more embodiments, when the first touch sensitive display portion is greater than the second touch sensitive display portion, the one or more processors (114) of the electronic device 100 actuate the rear-facing imager 108 in response to the imager invocation request 2612 at step 2609. By contrast, when the second touch sensitive display portion is greater than the first touch sensitive display portion, the one or more processors (114) cause the blade assembly 102 to transition to the peek position 500 revealing the front-facing imager 501, with the front-facing imager 501 being used in response to the imager invocation request 2612 at step 2610. In the illustrative embodiment of FIG. 26, step 2601 includes the first touch sensitive display portion being less than the second touch sensitive display portion, which means the method 2600 would conclude at step 2609 or step 2610.

Where decision 2607 is omitted, decision 2608 will comprise a straight comparison of the areas of the first touch sensitive display portion and the second touch sensitive display portion. If they are equal, the method 2600 can transition to the method (2700) of FIG. 27. However, absolute equality is unlikely given the high resolution of modern displays. Accordingly, where decision 2607 is omitted step 2610 will occur when first touch sensitive display portion is less than the second touch sensitive display portion. Similarly, step 2609 would occur when the first touch sensitive display portion is greater the second touch sensitive display portion.

However, when decision 2607 is included, the one or more processors (114) cause step 2609 to occur only when the first touch sensitive display portion is greater than the second touch sensitive display portion by more than a predefined threshold. Similarly, the one or more processors (114) cause step 2610 to occur only when the second touch sensitive display portion is greater than the first touch sensitive display portion by more than the predefined threshold.

Figure 27:
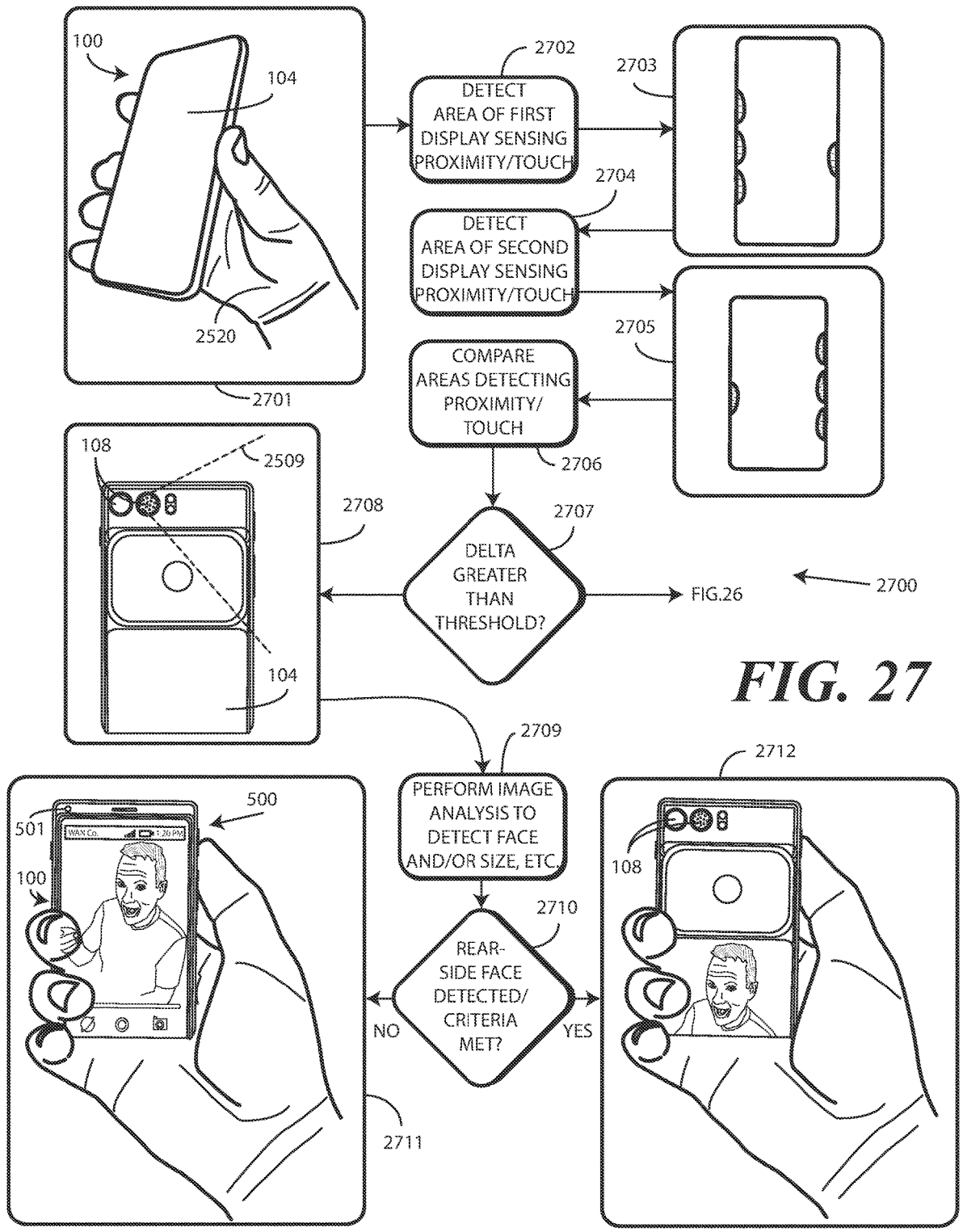
FIG. 27 illustrates still another explanatory method in accordance with one or more embodiments of the disclosure.

Turning now to FIG. 27, illustrated therein is a method 2700 accommodating situations where the first touch sensitive display portion and the second touch sensitive display portion are equal (where decision 2607 is omitted from the method 2600 of FIG. 26), or where the first touch sensitive display portion and the second touch sensitive display portion are within a predefined threshold (where decision 2607 is included in the method 2600 of FIG. 26).

Beginning at step 2701, a user 2520 is holding the electronic device 100 of FIG. 1. As previously described, the electronic device 100 includes a front-facing portion of the flexible display 104 positioned on a first major surface of the electronic device 100 and a rear-facing portion of the flexible display 104 positioned on a second major surface of the electronic device 100. In this example, the flexible display 104 comprises a touch sensor and is a touch sensitive display. As shown at step 2708, the electronic device 100 also includes a rear-facing portion of the flexible display 104 positioned on a second major surface of the electronic device 100.

As shown at step 2701, the front-facing portion of the flexible display 104 is receiving a first user input. In this illustrative embodiment, the first user input comprises touch input. However, in other embodiments the user input can comprise proximity input, gesture input, or other input.

At step 2702, the one or more processors (114) of the electronic device 100 identify a first touch sensitive display portion of the front-facing portion of the flexible display 104 receiving the first user input. For the illustrative embodiment of FIG. 27, the first touch sensitive display portion is shown at step 2703.

As also shown at step 2701, the rear-facing portion of the flexible display 104 is receiving a second user input. In this illustrative embodiment, as with the first user input the second user input comprises touch input. However, in other embodiments the second user input can comprise proximity input, gesture input, or other inputs. Imagers can detect such inputs, the touch sensor of the flexible display 104, one or more proximity sensors, or by other sensors.

At step 2704, the one or more processors (114) of the electronic device 100 identify a second touch sensitive display portion of the rear-facing portion of the flexible display 104. For the illustrative embodiment of FIG. 27, the second touch sensitive display portion is shown at step 2705.

At step 2706, the one or more processors (114) of the electronic device 100 compare the sizes of the first touch sensitive display portion and the second touch sensitive display portion. In one or more embodiments, step 2706 comprises the one or more processors (114) comparing first touch sensitive display portion and the second touch sensitive display portion to determine whether they are equal. In another embodiment, step 2706 comprises the one or more processors (114) comparing the first touch sensitive display portion and the second touch sensitive display portion to determine whether the difference therebetween is within a predefined threshold, as previously described.

Where the first touch sensitive display portion and the second touch sensitive display portion are not equal, or alternatively where the difference between the first touch sensitive display portion and the second touch sensitive display portion exceeds the predefined threshold, the method (2600) of FIG. 26 can be performed. However, when the first touch sensitive display portion and the second touch sensitive display portion are equal or within the predefined threshold, as determined at decision 2707, in one or more embodiments this constitutes a predefined event.

Accordingly, in one or more embodiments the one or more processors (114) cause the rear-facing imager 108 to capture at least one image 2509 at step 2708. Image analysis can then be performed at step 2709, with decision 2710 determining whether the at least one image 2509 matches a predefined criterion, which could be any of those described above with reference to FIG. 24 or FIG. 28.

As before, when the at least one image 2509 matches a first predefined criterion, in one or more embodiments the one or more processors (114) of the electronic device 100 use the rear-facing imager 108 in response to an imager invocation request at step 2712. By contrast, when the at least one image 2509 matches a second predefined criterion, the one or more processors (114) transition the electronic device 100 to the peek position 500 revealing the front-facing imager 501 and use the front-facing imager 501 in response to the imager invocation request at step 2711.

As illustrated and described above in the description of FIGS. 26 and 27, methods and systems described herein allow one or more processors (114) cause the translation mechanism to translate the blade assembly to the peek position when an imager invocation request is received from an application operating on the one or more processors and one or more sensors determine that the front-facing imager is oriented toward a user of the electronic device.

Figure 29:
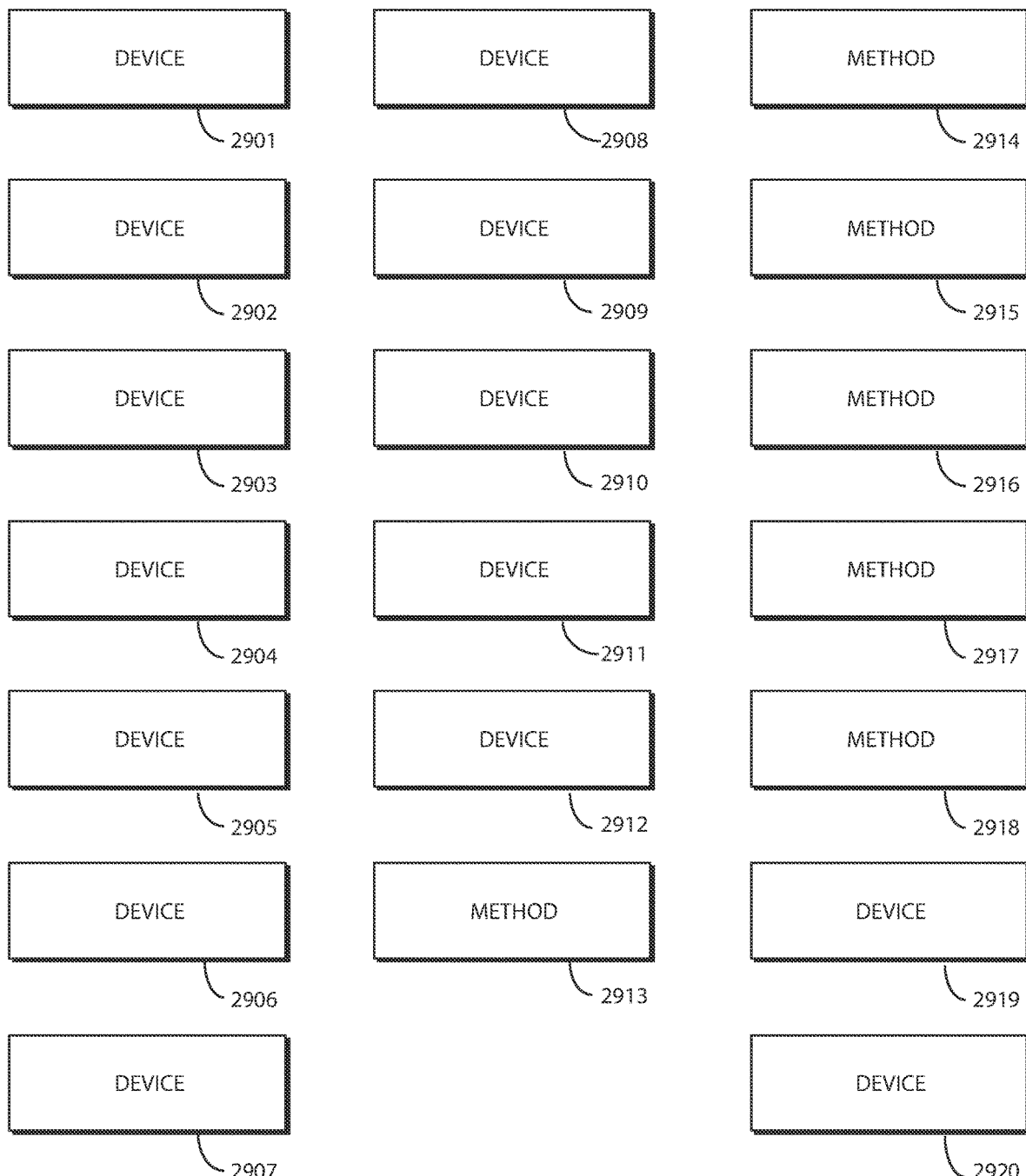
FIG. 29 illustrates various embodiments of the disclosure.

Turning now to FIG. 29, illustrated therein are various embodiments of the disclosure. The embodiments of FIG. 29 are shown as labeled boxes in FIG. 29 due to the fact that the individual components of these embodiments have been illustrated in detail in FIGS. 1-28, which precede FIG. 29. Accordingly, since these items have previously been illustrated and described, their repeated illustration is no longer essential for a proper understanding of these embodiments. Thus, the embodiments are shown as labeled boxes.

At 2901, an electronic device comprises a device housing, a front-facing imager, and one or more sensors. At 2901, the electronic device comprises a blade assembly carrying a blade and slidably coupled to the device housing and operable to slidably transition between an extended position where the blade extends beyond an edge of the device housing, a retracted position where a major surface of the blade abuts a major surface of the device housing, and a peek position in which the blade reveals the front-facing imager. At 2901, the electronic device comprises one or more processors. At 2901, the one or more processors cause the blade assembly to transition to the peek position in response to an application operating on the one or more processors invoking an image capture operation and the one or more sensors determining the front-facing imager is oriented toward a user of the electronic device.

At 2902, the one or more sensors of 2901 comprise a rear-facing imager. At 2903, the rear-facing imager of 2902 is exposed regardless of whether the blade assembly is in the extended position, the retracted position, or the peek position.

At 2904, the one or more sensors of 2902 determine the front-facing imager is oriented toward the user of the electronic device when one or more processors cause the rear-facing imager to capture at least one image in response to the application operating on the one or more processors invoking the image capture operation and the at least one image fails to match a predefined criterion. At 2905, the predefined criterion of 2904 comprises the at least one image depicting the user looking at the rear-facing imager. At 2906, the predefined criterion of 2904 comprises the at least one image depicting a face having a size exceeding a predefined image area threshold.

At 2907, the one or more sensors of 2902 determine the front-facing imager is oriented toward the user of the electronic device when one or more processors cause the rear-facing imager to capture at least one image in response to the application operating on the one or more processors invoking the image capture operation and the at least one image matches a predefined criterion. At 2908, the predefined criterion of 2907 comprises the at least one image depicting one or more of a hand, a finger, or an inanimate object.

At 2909, the electronic device of 2908 further comprises a flexible display that is touch sensitive and carried by the blade assembly. At 2909, the flexible display defines a front-facing portion, a rear-facing portion, and a curvilinear portion spanning an end of the device housing between the front-facing portion and the rear-facing portion. At 2909, the predefined criterion comprises the rear-facing portion receiving more touch input that the front-facing portion.

At 2910, the application of 2901 comprises a videoconferencing application. At 2911, the application of 2901 comprises a social medial application.

At 2912, a method in an electronic device comprises detecting, by one or more processors, an application operating on the one or more processors requesting invocation of an imager for service mode use by the application. At 2912, the method comprises determining, by one or more sensors of the electronic device, whether a front side or a rear side of a device housing of the electronic device is facing a user of the electronic device. At 2912, when the front side of the device housing is facing the user of the electronic device, the method comprises causing, by the one or more processors, a translation mechanism to translate a blade assembly slidably coupled to the electronic device from a retracted position to a peek position revealing a front-facing imager covered by the blade assembly in the retracted position.

At 2913, the method of 2912 further comprises actuating the front-facing imager for the service mode use by the application after the blade assembly is in the peek position. At 2914, the method of 2912 further comprises, when the rear side of the device housing is facing the user of the electronic device, actuating a rear-facing imager for the service mode use by the application.

At 2915, the method of 2914 further comprises causing, by the one or more processors when the rear side of the device housing is facing the user of the electronic device, the translation mechanism to omit translation of the blade assembly prior to actuating the rear-facing imager. At 2916, the one or more sensors of 2912 determine whether the front side or the rear side of a device housing of the electronic device is facing the user of the electronic device by determining whether a front-facing portion of a flexible display carried by the blade assembly or a rear-facing portion of the flexible display is receiving more touch input.

At 2917, the one or more sensors of 2912 determine whether the front side or the rear side of a device housing of the electronic device is facing the user of the electronic device by causing a rear-facing imager to capture at least one image. At 2918, the one or more sensors of 2917 determine that the front side of the device housing is facing the user of the electronic device when the at least one image depicts one or more of a finger, hand, or inanimate object and the one or more sensors determine that the rear side of the device housing is facing the user of the electronic device when the at least one image depicts the user of the electronic device.

At 2919, an electronic device comprises a device housing, a blade assembly slidably coupled to the device housing and slidable between an extended position, a retracted position, and a peek position, and a front-facing imager that is covered when the blade assembly is in the extended position and retracted position and revealed when the blade assembly is in the peek position. At 2919, the electronic device comprises one or more sensors and one or more processors operable with a translation mechanism to cause translation of the blade assembly around the device housing.

At 2919, the one or more processors cause the translation mechanism to translate the blade assembly to the peek position when an imager invocation request is received from an application operating on the one or more processors and the one or more sensors determine that the front-facing imager is oriented toward a user of the electronic device. At 2920, the imager invocation request of 2919 comprises a service mode invocation request.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims.

Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. An electronic device, comprising:
    a device housing;
    a front-facing imager;
    a rear-facing imager;
    one or more sensors;
    a blade assembly carrying a blade and slidably coupled to the device housing and operable to slidably transition between:
        an extended position where the blade extends beyond an edge of the device housing;
        a retracted position where a major surface of the blade abuts a major surface of the device housing; and
        a peek position in which the blade reveals the front-facing imager; and
    one or more processors;
    wherein the one or more processors cause the rear-facing imager to capture at least one image in response to an application operating on the one or more processors invoking an image capture operation and, thereafter, cause the blade assembly to transition to the peek position in response to the one or more processors predicting the front-facing imager is oriented toward a subject.

2. The electronic device of claim 1, further comprising a flexible display carried by the blade assembly, the one or more processors further presenting content on a front-facing portion of the flexible display in response to the one or more processors predicting the front-facing imager is oriented toward the subject.

3. The electronic device of claim 1, wherein the rear-facing imager is exposed regardless of whether the blade assembly is in the extended position, the retracted position, or the peek position.

4. The electronic device of claim 1, wherein the one or more sensors predict the front-facing imager is oriented toward the subject when
    the at least one image fails to match a predefined criterion.

5. The electronic device of claim 4, wherein the subject comprises a user of the electronic device and the predefined criterion comprises the at least one image depicting the user looking at the rear-facing imager.

6. The electronic device of claim 4, the predefined criterion comprising the at least one image depicting a face having a size exceeding a predefined image area threshold.

7. The electronic device of claim 1, wherein the one or more sensors predict the front-facing imager is oriented toward the subject when
    the at least one image matches a predefined criterion.

8. The electronic device of claim 7, wherein the predefined criterion comprises the at least one image depicting one or more of a hand, a finger, or an inanimate object.

9. The electronic device of claim 7, further comprising a flexible display that is touch sensitive and carried by the blade assembly, the flexible display defining a front-facing portion, a rear-facing portion, and a curvilinear portion spanning an end of the device housing between the front-facing portion and the rear-facing portion, wherein the predefined criterion comprises the rear-facing portion receiving more touch input that the front-facing portion.

10. The electronic device of claim 1, wherein the application comprises a videoconferencing application.

11. The electronic device of claim 1, wherein the application comprises a social media application.

12. A method in an electronic device, the method comprising:
    detecting, by one or more processors, an application operating on the one or more processors requesting invocation of an imager for use by the application;
    determining, by one or more sensors of the electronic device, whether a front side or a rear side of a device housing of the electronic device is facing a subject capable of being photographed by an imager of the electronic device using one or more of grip detection along the device housing, facial detection using a rear-facing imager of the electronic device, finger touch locations along the device housing, a comparison of coverage of front-facing portions and rear-facing portions of a display of the electronic device, and/or combinations thereof; and
    when the front side of the device housing is facing the subject, causing, by the one or more processors, a translation mechanism to translate a blade assembly slidably coupled to the electronic device from a retracted position to a peek position revealing a front-facing imager covered by the blade assembly in the retracted position.

13. The method of claim 12, further comprising actuating the front-facing imager for the use by the application after the blade assembly is in the peek position.

14. The method of claim 12, further comprising, when the rear side of the device housing is facing the subject, actuating the rear-facing imager for the use by the application.

15. The method of claim 14, further comprising causing, by the one or more processors when the rear side of the device housing is facing the subject, the translation mechanism to omit translation of the blade assembly prior to actuating the rear-facing imager.

16. The method of claim 12, wherein the one or more sensors determine whether the front side or the rear side of the device housing of the electronic device is facing the subject by determining whether a front-facing portion of a flexible display carried by the blade assembly or a rear-facing portion of the flexible display is receiving more touch input.

17. The method of claim 12, wherein the one or more sensors determine whether the front side or the rear side of a device housing of the electronic device is facing the subject by causing the rear-facing imager to capture at least one image.

18. The method of claim 17, wherein:
the one or more sensors determine that the front side of the device housing is facing the subject when the at least one image depicts one or more of a finger, hand, or inanimate object; and
the one or more sensors determine that the rear side of the device housing is facing the subject when the at least one image depicts a user of the electronic device.

19. An electronic device, comprising:
a device housing;
a blade assembly slidably coupled to the device housing and slidable between an extended position, a retracted position, and a peek position; and
a front-facing imager that is covered when the blade assembly is in the extended position and retracted position and revealed when the blade assembly is in the peek position;
a rear-facing imager;
one or more sensors; and
one or more processors operable with a translation mechanism to cause translation of the blade assembly around the device housing;
wherein the one or more processors cause the translation mechanism to translate the blade assembly to the peek position when:
an imager invocation request is received from an application operating on the one or more processors; and
the one or more sensors determine that the front-facing imager is oriented toward a subject by determining that one or more images captured by the rear-facing imager fail to depict the subject situated within a field of view of the rear-facing imager.

20. The electronic device of claim 19, wherein the imager invocation request comprises a service mode invocation request.

* * * * *